(12) United States Patent
Zimmerman et al.

(10) Patent No.: US 10,025,404 B2
(45) Date of Patent: Jul. 17, 2018

(54) STYLUS FOR ELECTRONIC DEVICES

(71) Applicant: Apple Inc., Cupertinno, CA (US)

(72) Inventors: Aidan N. Zimmerman, Cupertinno, CA (US); Wingshan Wong, Cupertino, CA (US); Kevin Armendariz, Cupertino, CA (US); Nathan Bohney, Cupertino, CA (US); Christopher Pasma, Cupertino, CA (US); Mahmoud Amini, Cupertino, CA (US); Brenton A. Baugh, Cupertino, CA (US); Ryan P. Brooks, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/259,861

(22) Filed: Sep. 8, 2016

(65) Prior Publication Data

US 2017/0068341 A1    Mar. 9, 2017

Related U.S. Application Data

(60) Provisional application No. 62/215,620, filed on Sep. 8, 2015, provisional application No. 62/309,816, filed on Mar. 17, 2016.

(51) Int. Cl.
*G06F 3/0354* (2013.01)
*G06F 3/038* (2013.01)
*G06F 3/041* (2006.01)

(52) U.S. Cl.
CPC ........ *G06F 3/0383* (2013.01); *G06F 3/03545* (2013.01); *G06F 3/0414* (2013.01); *G06F 3/0416* (2013.01); *G06F 2203/04105* (2013.01); *G06F 2203/04107* (2013.01)

(58) Field of Classification Search
CPC ... G06F 3/03545; G06F 3/0383; G06F 3/0414
See application file for complete search history.

(56) References Cited

U.S. PATENT DOCUMENTS

| 4,503,529 A | 3/1985 | Wada et al. |
| 4,883,926 A | 11/1989 | Baldwin |

(Continued)

FOREIGN PATENT DOCUMENTS

| CN | 201247453 Y | 5/2009 |
| CN | 101477410 A | 7/2009 |

(Continued)

OTHER PUBLICATIONS

International Search Report and Written Opinion, PCT/US2016/050430, 11 pages, dated Nov. 25, 2016.

(Continued)

*Primary Examiner* — Xuemei Zheng
(74) *Attorney, Agent, or Firm* — McDermott Will & Emery LLP

(57) ABSTRACT

A user input system including a stylus and an electronic device. A user may manipulate the stylus across an input surface of the electronic device and the movement may be detected using axially-aligned electric fields generated by the stylus. The stylus may also include a force-sensitive structure that can be used to estimate a force applied to the electronic device by the stylus.

20 Claims, 51 Drawing Sheets

(56) References Cited

U.S. PATENT DOCUMENTS

| | | | |
|---|---|---|---|
| 5,251,123 A * | 10/1993 | Reiffel | G06F 3/0346 178/18.03 |
| 5,414,227 A | 5/1995 | Schubert et al. | |
| 5,981,883 A | 11/1999 | Shriver et al. | |
| 8,638,320 B2 | 1/2014 | Harley et al. | |
| 8,878,824 B2 | 11/2014 | Besperstov | |
| 9,176,604 B2 * | 11/2015 | Krah | G06F 3/041 |
| 9,239,639 B1 | 1/2016 | Vanderet et al. | |
| 9,483,127 B2 | 11/2016 | Obata | |
| 2005/0156912 A1 | 7/2005 | Taylor et al. | |
| 2008/0128180 A1 | 6/2008 | Perski et al. | |
| 2008/0309645 A1 | 12/2008 | Wang | |
| 2013/0088465 A1 * | 4/2013 | Geller | G06F 3/03545 345/179 |
| 2013/0106718 A1 | 5/2013 | Sundara-Rajan | |
| 2013/0314370 A1 | 11/2013 | Chang et al. | |
| 2014/0028577 A1 | 1/2014 | Krah et al. | |
| 2014/0028634 A1 * | 1/2014 | Krah | G06F 3/041 345/179 |
| 2015/0123923 A1 | 5/2015 | Stern | |
| 2015/0324018 A1 * | 11/2015 | Hinson | G06F 3/03545 345/179 |
| 2015/0378456 A1 | 12/2015 | Ho et al. | |
| 2016/0054811 A1 * | 2/2016 | Geller | G06F 3/03545 345/179 |
| 2016/0188013 A1 | 6/2016 | Yoneoka et al. | |
| 2017/0068339 A1 | 3/2017 | Zimmerman et al. | |
| 2017/0068340 A1 | 3/2017 | Zimmerman et al. | |
| 2017/0068342 A1 | 3/2017 | Zimmerman et al. | |

FOREIGN PATENT DOCUMENTS

| | | |
|---|---|---|
| CN | 103688237 A | 3/2014 |
| CN | 203720795 U | 7/2014 |
| CN | 203812196 U | 9/2014 |
| EP | 0182144 | 5/1986 |

OTHER PUBLICATIONS

U.S. Appl. No. 15/253,836, filed Aug. 31, 2016, pending.
U.S. Appl. No. 15/259,822, filed Sep. 8, 2016, pending.
U.S. Appl. No. 15/259,898, filed Sep. 8, 2016, pending.
Chinese Office Action from Chinese Patent Application No. ZL201621044883.7, dated Sep. 19, 2017, 15 pages.

* cited by examiner

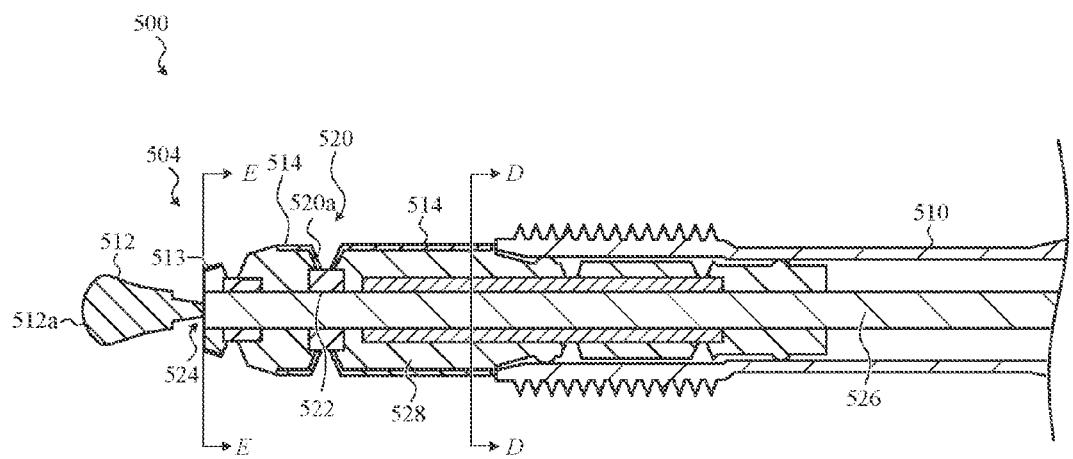
FIG. 5D
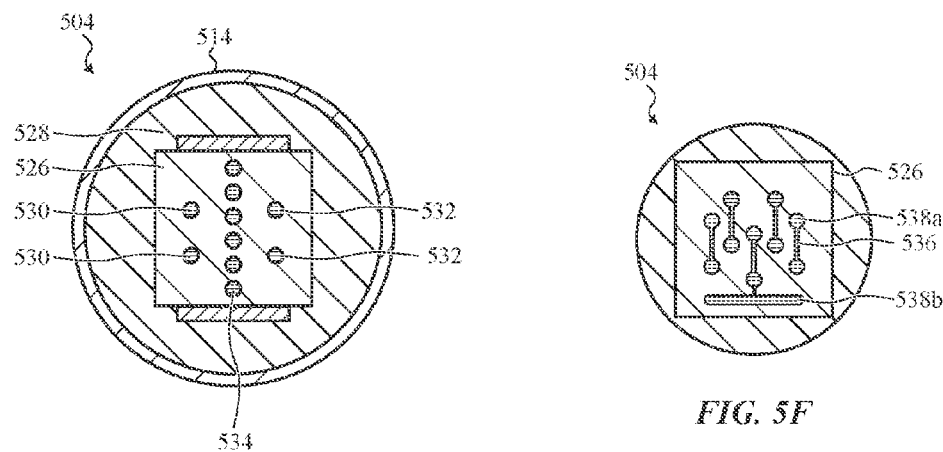
FIG. 5E
FIG. 5F

STYLUS FOR ELECTRONIC DEVICES

CROSS-REFERENCE TO RELATED APPLICATIONS

This application is a nonprovisional patent application of, and claims the benefit to, U.S. Provisional Patent Application No. 62/215,620, filed Sep. 8, 2015 and titled "Stylus For Electronic Devices," and to U.S. Provisional Patent Application No. 62/309,816, filed Mar. 17, 2016 and titled "Stylus For Electronic Devices," the disclosures of which are hereby incorporated herein in their entirety.

FIELD

Embodiments described herein are directed to user input systems for electronic devices, and, more particularly, to a high-precision stylus operable with a touch screen of an electronic device.

BACKGROUND

An electronic device can integrate a touch sensor into a display to facilitate a user's interaction with elements shown on the display. When the user touches the display with one or more fingers, the touch sensor provides the location of each touch to the electronic device which, in turn, can cause elements shown on the display (such as icons, buttons, keys, toolbars, menus, pictures, sprites, applications, documents, canvases, maps, and so on) to change. In some instances, a user may prefer to interact with the display using an instrument that is more precise than the user's finger, such as a stylus.

However, a conventional stylus often provides only marginally enhanced precision to the user because conventional touch-sensitive electronic devices are configured, primarily, to detect the presence and location of the user's finger. For example, many conventional touch-sensitive electronic devices may be unable to reliably distinguish between input from the stylus and intentional or accidental input from the user's palm, wrist, or fingers.

In other cases, to accommodate stylus input, some conventional electronic devices may incorporate a separate input sensor, such as an electromagnetic digitizer, specifically dedicated to receiving input from a stylus that generates a magnetic field. However, these additional components often increase the cost and complexity of manufacturing of the electronic device, in addition to increasing the thickness and power consumption of the electronic device.

SUMMARY

Embodiments described herein generally reference a stylus, including at least a body and a tip. The tip can be disposed at a first end of the body. The tip can be configured to emit an electric field to be detected by an electronic device. Additionally, the tip is configured to receive a force when the tip touches the electronic device. Control circuitry may be positioned within the body. The control circuitry is configured to produce an electrical signal used to generate the electric field. A force-sensitive structure is positioned also within the body and is configured to produce a non-binary output in response to the force. Lastly, a rigid conduit within the body electrically couples the control circuitry to the tip and mechanically transfers the force to the force-sensitive structure.

Some embodiments may include a configuration in which the external device may be configured to detect a location of the tip based on the location of the electric field. Some embodiments may reference the electric field as a first electric field and may also include at least a ring-shaped element disposed about the rigid conduit. The ring-shaped element may be configured to emit a second electric field. Some embodiments may include a configuration in which the external device is configured to detect an angular position of the stylus using the second electric field.

Some embodiments may also include a flexible circuit electrically coupling circuitry within or coupled to the force-sensitive structure to circuitry positioned within the body and circuitry behind the force-sensitive structure. The flexible circuit includes an articulated region configured to flex in response to movement of the force-sensitive structure. Some embodiments may include a configuration in which either or both of the circuits can include two or more substrates attached by a folded flexible connection.

Some embodiments may also include at least a cylindrical chassis positioned within the body of the stylus and having a round inner volume. A battery can be attached to the chassis and positioned within the round inner volume. The battery can include at least one folded electrode pair.

Some embodiments may include a configuration in which the rigid conduit includes an array of conducting traces formed along a length of the rigid conduit. For example, the array of conducting traces can be formed in alternatingly offset rows. In these and related embodiments, the rigid conduit includes a notched via that extends from an outer surface thereof to one or more conducting traces of the array of conducting traces.

Some embodiments may include a configuration in which the rigid conduit includes a first set of conductors configured to transmit a tip signal, a second set of conductors configured to transmit a ring signal, and a set of ground conductors positioned between the first and second sets.

Embodiments described herein generally reference a stylus, including at least a body and a tip disposed at a first end of the body, and including at least a bulb configured to emit an electric field to be detected by an electronic device, and a coating formed around the bulb having a hardness that may be less than the bulb. In other cases, the stylus can include a coating formed around the bulb having a hardness that is less than an input surface of the electronic device.

Some embodiments may include a configuration in which the electric field may be a first electric field having a half-power point at a first radius, and the stylus further includes a conductive ring positioned behind the bulb and configured to emit a second electric field having a half-power point at a second radius that may be different than the first radius. Some embodiments may include a configuration in which either the first electric field or the second electric field may be substantially spherical for a portion of the field that may be configured to intersect the electronic device. Some embodiments may include a configuration in which the tip may be removable from the body by a threaded connection.

Some embodiments may include a configuration in which the bulb has a root portion that extends toward the body and may be in electrical communication with a signal generator. Some embodiments may include a configuration in which the coating may be formed from a polymer material that may be formed using an over-molding process.

Some embodiments may include a configuration in which the coating includes a first inner shot formed from a first polymer material, and a second outer shot formed from a second polymer material. Some embodiments may include a configuration in which the second polymer material may be softer than the first polymer material. In some embodiments, the first inner shot includes a fiber-reinforced polymer material, and the second polymer material of the second outer shot may be substantially free of fibers.

Some embodiments may include a configuration in which the body may be formed from a hollow tube. A signal generator may be disposed within the tube and operatively coupled to the bulb. In these cases, the tip and the bulb are configured to be removed from the body and the driver circuit via a threaded connection.

Embodiments described herein generally reference a hand-held user input device, including at least: a body; a tip disposed at a first end of the body and configured to receive a force; and a force-sensitive structure disposed within the body and including at least: a first cantilevered leg having a first edge fixed with respect to the body, a second cantilevered leg approximately parallel to the first cantilevered leg and having a second edge fixed with respect to the body, and a lateral bed extending between and connecting the first cantilevered leg and the second cantilevered leg. A strain-sensitive element can be attached to the first cantilevered leg. The first cantilevered leg may be configured to deflect in response to the force received by the tip.

Some embodiments may include a configuration in which the tip may be mechanically coupled to the lateral bed. In some cases, the mechanical coupling is provided by a rigid signal conduit disposed between the tip and the lateral bed. Some embodiments may include a configuration in which the second cantilevered leg may be configured to deflect in response to the force received by the tip. Some embodiments may include a configuration in which the first cantilevered leg may be configured to deflect along a serpentine curve in response to the force received by the tip. Some embodiments may also include at least two or more strain-sensitive elements attached to a surface of the first cantilevered leg, wherein one or more strain-sensitive elements are placed in a tensile strain in response to the force, and one or more other strain-sensitive elements are placed in compressive strain in response to the force.

Some embodiments may also include at least sensor circuitry operatively coupled to the two or more strain-sensitive elements and configured to produce an output based on a difference between the tensile strain and the compressive strain resulting from the force on the tip.

Some embodiments may include a configuration in which at least a portion of the sensor circuitry may be disposed between the first and lateral bed, and the sensor circuitry may be fixed with respect to the second cantilevered leg. Some embodiments may include a configuration in which the tip transmits the force to the body through the force-sensitive structure. Some embodiments may include a configuration in which a first edge of the first cantilevered leg may be welded to a tube member, a third edge of the lateral bed may be welded to the tube member, and the tube member may be disposed within and attached to the body.

Embodiments described herein generally reference a stylus, including at least a body, a tip disposed at a first end of the body and configured to receive a force, an intermediate member positioned within the body and operatively coupled to the tip to transfer the force received at the tip, and a force-sensitive structure disposed within the body and including at least two legs having respective edges fixed with respect to the body, a lateral member extending between the two legs and operatively coupled to the intermediate member, and a strain-sensitive element attached to a first leg of the two legs, wherein the first leg may be configured to deflect in response to the force received at the tip.

Some embodiments may also include at least a sleeve disposed within the body, and wherein the two legs are welded to an interior surface of the sleeve. Some embodiments may include a configuration in which the two legs extend from opposite sides of the lateral member.

Some embodiments may also include at least two or more strain-sensitive elements attached to a surface of the first leg, wherein one or more strain-sensitive elements are placed in a tensile strain in response to the force, and one or more other strain-sensitive elements are placed in compressive strain in response to the force. Embodiments described herein generally reference a stylus including at least: a body; a tip positioned at a first end of the body but not fixed with respect to the first end of the body and configured to receive a force; a force-sensitive structure positioned within the body, the force-sensitive structure including at least: a box structure including at least a first and lateral bed positioned transverse to an axis of the body, a second cantilevered leg extending between the first and second cantilevered leg. In these embodiments, the second cantilevered leg may be configured to shift with respect to the body in response to the force.

Some embodiments may include a configuration in which the box structure further includes a side formed by a portion of a sleeve positioned within the body, which may be fixed with respect to the body, and the second side may be configured to shift with respect to the side along the axis of the body in response to the force. Some embodiments may include a configuration in which the first and second sides are configured to deflect in response to the force. In many cases, the second side deflects into a serpentine-shaped profile.

Some embodiments are directed to a stylus as substantially described herein. Some embodiments are directed to an electronic device as substantially described herein. Some embodiments are directed to a method of operating the stylus and the electronic device as described herein. Some embodiments are directed to a method of communication between the stylus and the electronic device. Some embodiments are directed to a method of locating the stylus on an input surface of the electronic device. Some embodiments are directed to a method of estimating whether to enter or exit a low power state performed by the stylus. Some embodiments are directed to a method of estimating the angular position of the stylus relative to an input surface of the electronic device.

Some embodiments are directed to a method of measuring the force applied by the stylus to an input surface of the electronic device. Some embodiments are directed to a method of measuring, performed by the stylus, the force applied by the stylus to an input surface of the electronic device. Some embodiments are directed to a method of measuring, performed by the electronic device, the force applied by the stylus to an input surface of the electronic device. Some embodiments are directed to a nosepiece for the stylus that is removable via a threaded connection. Some embodiments are directed to a nosepiece for the stylus that includes a bulb-shaped electric field generator at the tip of the nosepiece. Some embodiments are directed to a nosepiece, wherein the bulb-shaped electric field generator is a pogo pin. Some embodiments are directed to a main control board for the stylus that is formed by folding two or more circuit boards over one another such as described herein. Some embodiments are directed to a blind cap for the stylus.

Some embodiments are directed to the blind cap, further comprising a pressure release vent. Some embodiments are directed to the blind cap, further comprising a permanent magnet that is configured to attract a plug extending from the stylus.

BRIEF DESCRIPTION OF THE FIGURES

Reference will now be made to representative embodiments illustrated in the accompanying figures. It should be understood that the following descriptions are not intended to limit the embodiments to one preferred embodiment. To the contrary, it is intended to cover alternatives, modifications, and equivalents as may be included within the spirit and scope of the described embodiments as defined by the appended claims.

FIG. 5D depicts a cross-section view of the coordination engine of FIG. 5B, taken through line C-C, particularly illustrating the signal conduit disposed within the hollow portion of the tubular and rigid electromagnetic shield.

FIG. 5E depicts a cross-section view of the signal conduit of FIG. 5D, taken along line D-D, showing a circuit board and signal lines disposed within the signal conduit.

FIG. 5F depicts a cross-section view of the signal conduit of FIG. 5D, viewed along line E-E, showing a circuit board and signal lines disposed within the signal conduit.

The use of the same or similar reference numerals in different figures indicates similar, related, or identical items.

Figure 1A:
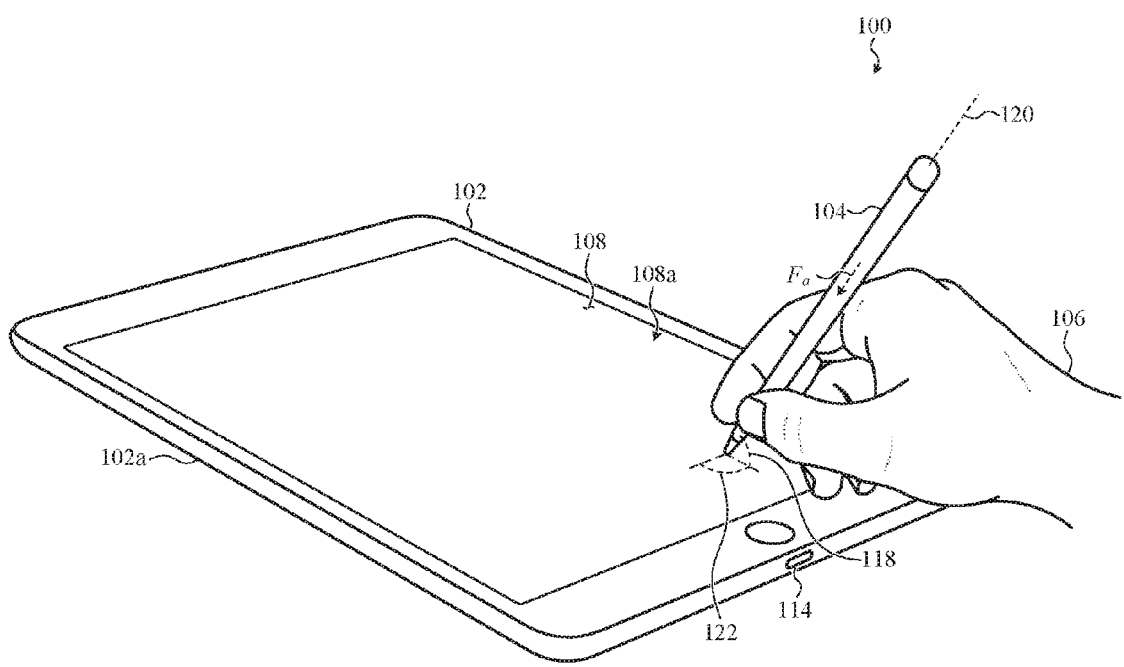
FIG. 1A depicts an electronic device with a touch-sensitive display (an "input surface") that is configured to receive input from a stylus.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalties of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein generally reference a stylus (e.g., a marking tool, smart pen, smart brush, wand, chisel, user-manipulated electronic input device, hand-held input device, and the like) that is configured to provide input to an electronic device (e.g., tablet computer, laptop computer, desktop computer, and the like). The user manipulates the orientation and position of the stylus relative to an input surface of the electronic device to convey information to the electronic device such as, but not limited to, writing, sketching, scrolling, gaming, selecting user interface elements, moving user interface elements, and so on. In many embodiments, the input surface of the electronic device is a multi-touch display screen, but this is not required; in other embodiments, the input surface can be a non-display input surface such as a trackpad or drawing tablet. Collectively, the stylus and the electronic device are referred to herein as a "user input system."

The user input system described herein may be used to capture free-form user input from the stylus. For example, the user can slide, move, draw, or drag a tip of the stylus across the input surface of the electronic device which, in response, may render a line using a display positioned below the input surface. In this example, the rendered line follows or corresponds to the path of the stylus across the input surface. The thickness of the rendered line may vary based at least in part on a force or speed with which the user moves the stylus across the input surface. In other cases, the thickness of the rendered line may vary based, at least in part, on an angle of the stylus relative to the input surface, such as, but not limited to, the inclination of the stylus relative to the plane of the input surface, a writing angle of the stylus relative to a horizontal writing line traversing the input surface, and so on. In other examples, the stylus and electronic device may be used together for any other suitable input purpose.

Broadly and generally, the user input system described herein determines and/or estimates one or more outputs of the stylus (and/or changes therein over time as a scalar or vector quantity), to interpret the user's manipulation thereof as input to the electronic device. For example, the user input system can estimate: the magnitude of force applied by a user's grip to the stylus (e.g., non-binary estimate of magnitude as a scalar or vector quantity); a magnitude (e.g., non-binary estimate of magnitude as a scalar or vector quantity) of force applied by the stylus to the input surface of the electronic device; the location at which or the area over which the tip of the stylus touches the input surface of the electronic device; a distance between a location of the stylus tip and a user's palm, wrist, or other fingers also in contact with the input surface; a polar angle of the stylus relative to the plane of the input surface (e.g., inclination of the stylus); an azimuthal angle of the stylus relative to an axis of the input surface; a vector or scalar representation of the angular position of the stylus relative to the plane of the input surface; three-dimensional coordinates (e.g., spherical, Cartesian, and so on) of one or more points along the length of the stylus relative to the input surface; and so on. In many embodiments, the user input system monitors such variables over time to estimate rates of change therein as either scalar or vector quantities (e.g., velocity, acceleration, and so on).

The operation of estimating or determining the two-dimensional position coordinates of the stylus as a point (or area) within or parallel to the plane of the input surface, whether such operation is performed by the electronic device, performed by the stylus, and/or performed, at least in part, as a result of cooperation therebetween (or with one or more other electronic devices), is generally referred to herein as "locating" the stylus. In many embodiments, this operation involves estimating Cartesian coordinates of the stylus tip relative to an origin point of plane of the input surface of the electronic device, such as the lower left-hand corner of the external surface of a cover glass disposed over a touch-sensitive display of the electronic device. In other examples, this operation involves estimating a two-dimensional area or region of the input surface that the tip of the stylus touches. The Cartesian coordinates (and/or set of coordinates associated with an area) can be relative to an origin point defined by a plane parallel to, or associated with, the input surface itself (e.g., a local Cartesian coordinate system). In one example, the origin point can be in an upper right-hand corner of a rectangular input surface. The location of the stylus can be represented in any suitable manner or format, such as with vector or scalar quantities.

The operation of estimating the orientation of the stylus relative to the plane of the input surface, whether such operation is performed by the electronic device, performed by the stylus, and/or performed, at least in part, as a result of cooperation therebetween (or with one or more other electronic devices), is generally referred to herein as estimating the "angular position" of the stylus. In many embodiments, the operation of estimating the angular position of the stylus involves estimating spherical coordinates that describe the orientation of the longitudinal axis of the stylus relative to the plane of the input surface. In other cases, estimating the angular position of the stylus involves estimating the three-dimensional Cartesian coordinate(s) of one or more reference points along the longitudinal axis of the stylus. It may be appreciated that any number of implementation-specific and suitable methods for determining the angular position of the stylus relative to the plane of the input surface can be employed in other embodiments and, as with the location of the stylus, the angular position of the stylus can be represented in any suitable manner or format, such as with one or more vector or scalar quantities.

In some embodiments, a polar angle and an azimuthal angle of the stylus relative to the plane and zenith of the input surface may be estimated. The polar angle may be calculated as the angle of the stylus relative to a vector normal to the plane of the input surface (e.g., zenith) and the azimuthal angle may be calculated as the angle of the stylus relative to a vector parallel to the plane of the input surface (e.g., an axis). In these examples, the location of the tip of the stylus on the input surface can be considered the origin of a local spherical coordinate system defining the angular position of the stylus.

Although the operations of locating and estimating the angular position of the stylus are generally referenced herein with respect to a locally-defined Cartesian coordinate system and a locally-defined spherical coordinate system, one of skill in the art will appreciate that such coordinate systems are not required for any particular embodiment, and other coordinate systems, or cooperation of multiple coordinate systems, can be used in the performance of various calculations and operations such as described herein. In some examples, affine transformations or similar computations or translations may be performed by either or both of the electronic device or stylus in order to shift from one coordinate system to another.

As noted above, the electronic device and/or the stylus can be configured to estimate and/or monitor the location and angular position of the stylus over time and compute differential or integral quantities such as, but not limited to, acceleration, velocity, total force applied, path length, and so on. For example, the operation of estimating the velocity and/or acceleration of the stylus relative to the input surface as the stylus is moved across that surface, whether such operation is performed by the electronic device, performed by the stylus, and/or performed, at least in part, as a result of cooperation therebetween (or with one or more other electronic devices) is generally referred to herein as estimating the "planar motion" of the stylus. In many embodiments, this operation involves estimating a relative movement of the stylus over time and, more particularly, a change in the location of the stylus over time. A change in the location of the stylus over a particular time period may be used to estimate the velocity of the stylus during that time period. Similarly, a change in the velocity of the stylus in a particular time period may be used to estimate the acceleration of the stylus during that time period.

The operation of estimating the angular velocity and/or acceleration of the stylus relative to the plane of the input surface as it is moved thereacross, whether performed by the electronic device, performed by the stylus, and/or performed, at least in part, as a result of cooperation therebetween, is generally referred to herein as estimating the "angular motion" of the stylus. In many embodiments, this operation involves estimating changes in the polar and azimuthal angle of the stylus over time. A change in the polar angle of the stylus in a particular time period is the polar angular velocity of the stylus during that time period. A change in the azimuthal angle of the stylus in a particular time period is the azimuthal angular velocity of the stylus during that time period. In these embodiments, changes in the polar angular velocity or the azimuthal angular velocity in a particular time period are referred to herein, generally, as the polar angular acceleration and azimuthal angular acceleration, respectively.

In many embodiments, the force applied by the stylus to the input surface can be estimated, measured, calculated or otherwise computed exactly or approximately. As used herein, the term "force" refers to force estimates, determinations, and/or calculations, which may correspond to properties or characteristics such as pressure, deformation, stress, strain, force density, force-area relationships, thrust, torque, and other effects that include force or related quantities.

The operation of estimating the force applied by the stylus to the input surface, whether performed by the electronic device, performed by the stylus, and/or performed, at least in part, as a result of cooperation therebetween (or with one or more other electronic devices), is generally referred to herein as estimating the "applied force." More broadly, the operation involves estimating the magnitude of force applied by and between a tip of the stylus and the input surface, dependent or independent of the orientation or direction of that force. In many embodiments, the force applied by the tip of the stylus to the input surface is estimated by the stylus itself. For example, a force-sensitive structure within the stylus can estimate the applied force by resolving or measuring a "reaction force" experienced by the stylus when the stylus applies a force to the input surface. The reaction force is equal to and opposite of the force applied by the stylus to the input surface, and thus a measurement of the reaction force by the stylus corresponds to a measurement of the applied force to the input surface.

In other cases, the electronic device can directly measure the applied force. In such an example, it may not be required for the stylus to determine or estimate the reaction force.

In still further embodiments, both an applied force and a reaction force can be estimated and/or determined. For example, a user input system may obtain an estimate of the applied force in addition to an estimation of the reaction force. The user input system may select and use one or both of the two measurements or, in other cases, the user input system can combine the two measurements in an appropriate manner (e.g., average).

These and other embodiments are discussed below with reference to FIGS. 1A-24. However, those skilled in the art will readily appreciate that the detailed description given herein with respect to these figures is for explanatory purposes only and should not be construed as limiting. The section headings which appear throughout the description are provided for convenience and organizational purposes only and are not intended to restrict or limit the disclosure within any particular section to the embodiments, modifications, alternatives, details, features, and/or characteristics described in that section.

User Input Systems Incorporating a Stylus

Generally and broadly, FIGS. 1A-1D reference a user input system 100 including an electronic device 102 and a stylus 104. A user 106 manipulates the orientation and position of the stylus 104 relative to an input surface 108 of the electronic device 102 in order to convey information to the electronic device 102. The user input system 100 may be configured to perform or coordinate multiple operations such as, but not limited to, locating the stylus 104, estimating the angular position of the stylus 104, estimating the magnitude of force by the stylus 104 to the input surface 108, and so on.

The user input system 100 can perform these and other operations at the same time or at different times. In one non-limiting example, the operation of determining the location of the stylus 104 can be performed simultaneously with the operation of determining the angular position of the stylus 104 while the operation of estimating the magnitude of force by the stylus 104 to the input surface 108 is performed only periodically and/or based on whether the electronic device 102 is configured to accept force input from the stylus given a particular operational mode of the electronic device 102 (or the stylus 104) at a particular time. It is with respect to these and other embodiments that FIGS. 1A-1D are provided.

FIG. 1A depicts a user input system 100 including an electronic device 102 and a stylus 104. A user 106 slides a tip of the stylus 104 across an input surface 108 of the electronic device 102 to interact with a user interface presented or rendered on a display of the electronic device 102 positioned below the input surface 108 or integrated with the input surface 108.

In other cases, the electronic device 102 may not include a display. For example, the electronic device 102 is presented in FIGS. 1A-1D as a tablet computing device as an example only; other electronic devices (with or without displays positioned below the input surface 108) are envisioned. For example, the electronic device of the user input system 100 can be implemented as a peripheral input device, a trackpad, a drawing tablet, and the like.

Figure 1B:
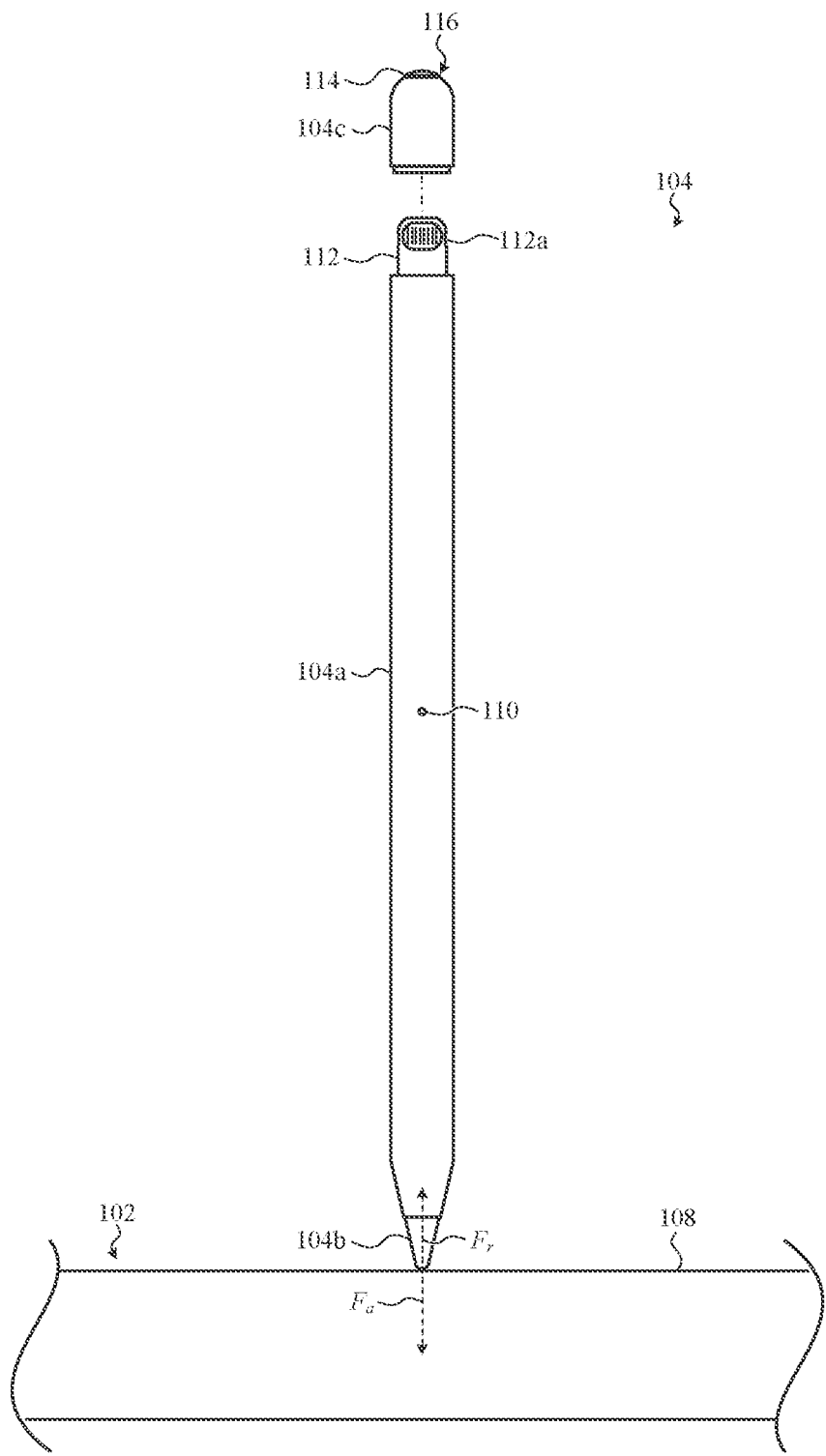
FIG. 1B depicts the stylus of FIG. 1A, oriented normal to the input surface of the electronic device.

Initially, reference is made to certain physical and operational characteristics of the stylus 104, for example as shown in FIGS. 1A-1B. The stylus 104 may take various forms to facilitate use and manipulation by the user 106. In the illustrated example, the stylus 104 has the general form of a writing instrument such as a pen or a pencil. In the illustrated embodiment, the stylus 104 includes a cylindrical body with two ends. In this example, the two ends of the body are terminated respectively with a tapered tip and a rounded cap. Either or both of the tapered tip and rounded cap can be removable, affixed to the body, or an integral part of the body. The user 106 slides the tapered tip of the stylus 104 across the input surface 108 to convey information to the electronic device 102. The electronic device 102 can interpret the user's manipulation of the stylus 104 in any implementation-specific and suitable manner.

The cylindrical body of the stylus 104, or more generally, the "body" or the "barrel" can be formed from any number of suitable materials. The barrel is identified in FIG. 1B as the barrel 104a. The barrel 104a can be formed from plastics, metals, ceramics, laminates, glass, sapphire, wood, leather, synthetic materials, or any other material or combination of materials. The barrel 104a can form an outer surface (or partial outer surface) and protective case for one or more internal components of the stylus 104. The barrel 104a can be formed of one or more components operably connected together, such as a front piece and a back piece or a top clamshell and a bottom clamshell. Alternatively, the barrel 104a can be formed of a single piece (e.g., uniform body or unibody). In many embodiments, the barrel 104a is formed from a dielectric material.

In some embodiments, the barrel 104a may be configured, partially or entirely, as an optical signal diffuser to diffuse an infrared signal or another optical signal such as the light emitted from a multi-color light-emitting diode. In other cases, the barrel 104a may be configured, entirely or partially, as an antenna window, allowing for wireless communications and/or electric fields to pass therethrough.

The barrel 104a can be formed from a material doped with an agent configured to provide the barrel 104a with a selected color, hardness, elasticity, stiffness, reflectivity, refractive pattern, texture, and so on. In other examples, the doping agent can confer other properties to the barrel 104a including, but not necessarily limited to, electrical conductivity and/or insulating properties, magnetic and/or diamagnetic properties, chemical resistance and/or reactivity properties, infrared and/or ultraviolet light absorption and/or reflectivity properties, visible light absorption and/or reflectivity properties, antimicrobial and/or antiviral properties, oleophobic and/or hydrophobic properties, thermal absorption properties, pest repellant properties, colorfast and/or anti-fade properties, antistatic properties, liquid exposure reactivity properties, and so on.

The barrel 104a can exhibit a constant or a variable diameter cross-section; as illustrated, the cylindrical cross-section view of the barrel 104a maintains a substantially constant diameter from the tapered tip to the rounded cap. The tapered tip is identified in FIG. 1B as the tip 104b. The rounded cap is identified in FIG. 1B as the blind cap 104c.

In other embodiments, the barrel 104a can include a variable cross-section (e.g., a "profile" of the barrel 104a can change across the length of the barrel 104a). In one example, the diameter of the barrel 104a may be smaller near the tip 104b than at the blind cap 104c. In some examples, the diameter of the barrel 104a may bulge outward in the middle of the barrel 104a, between the tip 104b and the blind cap 104c. In some cases, the profile of the barrel 104a can follow a mathematical function such as a bump function, a Gaussian function, or a step function. The barrel 104a can include one or more grip features (not shown) such as embossments or impressions, closely-spaced channels, protrusions, projections and/or the like. In some cases, a grip feature can be formed from a different material than the barrel 104a; the grip feature(s) may be formed from a polymer material exhibiting high friction.

Although illustrated as a cylinder, the barrel 104a need not take a cylindrical shape in all embodiments. Accordingly, as used herein, the term "diameter" refers to the linear distance that can connect two points of a two-dimensional shape, whether the shape is circular or otherwise. For example, the stylus 104 can include a barrel 104a with an n-sided polygonal cross-section (e.g., a vesica piscis cross-section, a triangular cross-section, a square cross-section, a pentagonal cross-section, and so on) that either varies in diameter or is constant in diameter.

In some examples, a cross-section view of the barrel 104a is axially symmetric, although this is not required; certain styluses in accordance with embodiments described herein include a barrel 104a with a cross-section that is reflectionally symmetric along one axis while being reflectionally asymmetric along another. In still further examples, the barrel 104a of the stylus 104 can be formed into an ergonomic shape, including grooves, indents, and/or protrusions configured to enhance the comfort of the user 106. In some cases, the barrel 104a includes a tapered section that decreases in diameter, linearly or non-linearly, toward the tip 104b.

In many cases, the diameter of the barrel 104a at the interface of the barrel 104a and the tip 104b may be substantially similar to the diameter of the tip 104b at that location. In this manner, the external surfaces of the tapered top and the barrel 104a form a substantially continuous external surface of the stylus 104.

In some cases, the barrel 104a can define one or more apertures in which one or more input/output components such as a button, a dial, a slide, a force pad, a touch pad, audio component, haptic component, and the like may at least partially reside. The apertures (and, correspondingly, the input/output components associated therewith) can be defined at a lower end of the barrel 104a nearby the tip 104b. In this manner, the input/output components may be conveniently located near where the user 106 may rest the user's forefinger on the barrel 104a when grasping the stylus 104.

As shown in FIG. 1B, an indicator 110 can be disposed in another aperture defined by the barrel 104a. In one example, the indicator 110 includes a variable-brightness single or multi-color light-emitting diode that is illuminated to convey information to the user 106, such as (but not limited to) a current operational mode of the stylus 104, a current operational mode of the electronic device 102, and/or the remaining battery life of the stylus 104. In other examples, a status or an operational mode of a program or application operating on the electronic device 102 is conveyed to the user 106 by the indicator 110. The indicator 110 can be illuminated in any number of suitable and implementation-specific ways. The indicator 110 can be positioned behind a diffuser or a lens. In other examples, more than one indicator can be included.

The blind cap 104c of the stylus 104, or more generally, the "cap," may be configured to provide a cosmetic end to the barrel 104a of the stylus 104. In some cases, the blind cap 104c can be formed integrally with the barrel 104a, although this is not required of all embodiments. For example, in some embodiments, the blind cap 104c can be removable. In one such example, the blind cap 104c can be configured to conceal a data and/or power connector 112 of the stylus 104. The data and/or power connector 112 that may be concealed by the blind cap 104c can be configured to couple to a power and/or data port 114 of the electronic device 102 (and/or another electronic device) to facilitate recharging of a battery contained within the stylus 104. In other cases, the data and/or power connector 112 can be used to exchange data between the stylus 104 and the electronic device 102 via the power and/or data port 114. The data and/or power connector 112 can be configured to be flexible so that when connected to the power and/or data port 114, the stylus 104 can resist and withstand certain forces that may otherwise damage the stylus 104 and/or the electronic device 102.

Although the data and/or power connector 112 is illustrated as a multi-pin, reversible, and standardized data and/or power connector, it is appreciated that such a connector is not required. Particularly, in some embodiments a Lightning connector, Universal Serial Bus connector, Firewire connector, serial connector, Thunderbolt connector, headphone connector, or any other suitable connector can be used.

As illustrated, the data and/or power connector 112 may extend outwardly from the end of the barrel 104a. However, this may not be required of all embodiments. For example, the data and/or power connector 112 may be implemented as a series of electrical contacts disposed on a surface of the barrel 104a. In one example, the series of electrical contacts are disposed on a flat tip surface of the barrel 104a (e.g., a circular endcap of a cylindrical shape). In this embodiment, the data and/or power connector 112 can retract, either manually or automatically, into the barrel 104a when not in use. In some examples, the data and/or power connector 112 can be connected to a push-push mechanism. In these embodiments, the blind cap 104c may not be required. In these embodiments, the data and/or power connector 112 is a male connector configured to mate with a female receptacle such as the power and/or data port 114. In other cases, the data and/or power connector 112 can be a female receptacle configured to mate with a male connector. In these embodiments, the blind cap 104c can include an extension portion that is configured to fit within the data and/or power connector 112. The extension portion can include one or more magnets to attract to one or more portions of the data and/or power connector 112.

The data and/or power connector 112 can include one or more detents, collectively labeled as a detent 112a, that can help facilitate retention of the data and/or power connector 112 within the power and/or data port 114 of the electronic device 102. Additionally, the detent 112a can help facilitate retention of the blind cap 104c, such as described below with reference to FIGS. 9A-9D. In other embodiments, detents may not be required.

In some cases, the blind cap 104c includes a clip (not shown) for attaching the stylus 104 to a user's pocket, or any other suitable storage location. The blind cap 104c can include a through-hole configured to couple to a lanyard or tether. The lanyard or tether may also be configured to couple to the electronic device 102.

The blind cap 104c may be formed from any suitable material, such as, but not limited to, metal, plastic, glass, ceramic, sapphire, and the like or combinations thereof. In many cases, the blind cap 104c is formed from the same material as the barrel 104a, although this is not required. In some embodiments, the blind cap 104c may be configured, entirely or partially, as a signal diffuser to diffuse an infrared signal or another optical signal, such as a multi-color light-emitting diode. In other cases, the blind cap 104c may be configured, entirely or partially, as an antenna window, allowing for wireless communications and/or electric fields to pass therethrough.

In some examples, the blind cap 104c can include one or more pressure vents, generally labeled as the pressure vent 116. The pressure vents 116 can provide a pressure normalization path when the blind cap 104c is applied over the data and/or power connector 112 of the stylus 104. In other cases, the pressure vent 116 can be configured to prevent and/or mitigate the development of a pressure differential that may, in some cases, eject the blind cap 104c from the barrel 104a of the stylus 104. The pressure vent 116 can include a valve that regulates and/or otherwise controls the airflow.

As illustrated, the blind cap 104c terminates in a rounded end, although this is not required of all embodiments. In some embodiments, the blind cap 104c terminates as a plane. In other embodiments, the blind cap 104c terminates in another suitable shape.

The blind cap 104c can exhibit a constant or a variable diameter cross-section. In many embodiments, such as illustrated, the cross-section view of the blind cap 104c matches that of the barrel 104a where the barrel 104a and the blind cap 104c interface.

In other embodiments, the blind cap 104c can include a variable cross-section. In one example, the diameter of the blind cap 104c may be smaller near the end of the blind cap 104c than at the portion of the blind cap 104c configured to connect to the barrel 104a. In some examples, the diameter of the blind cap 104c may resemble an eraser of a pencil. In some cases, the profile of the blind cap 104c can follow a mathematical function such as a bump function, a Gaussian function, or a step function. The blind cap 104c can include grip features, such as embossments or impressions, closely-spaced channels, protrusions, projections, and/or the like. In some cases, a grip feature can be formed from a different material than the blind cap 104c; the grip may be formed from a polymer material exhibiting high friction.

The blind cap 104c can be configured to be removably attached to the barrel 104a. In one embodiment, the blind cap 104c is threaded such that the blind cap 104c screws into corresponding threads within the barrel 104a. In other cases, the blind cap 104c includes one or more detents and/or recesses that are configured to align with one or more corresponding recesses and/or detents within the barrel 104a and/or the connector that the blind cap 104c may conceal. In other cases, the blind cap 104c is interference-fit with or snap-fit to the barrel 104a. In still further cases, the blind cap 104c is magnetically attracted to a portion of the barrel 104a and/or the connector that the blind cap 104c may conceal.

In some cases, the blind cap 104c can be configured as an input component. For example, the stylus 104 may operate in a first mode when the blind cap 104c is attached and a second mode when the blind cap 104c is removed. Similarly, the stylus 104 operates in a first mode when the blind cap 104c is rotated to a first angle whereas the stylus 104 operates in a second mode when the blind cap 104c is rotated to a second angle. The electronic device 102 can also be configured to operate in a mode that is related to the angular position of the blind cap 104c of the stylus 104. In other cases, the stylus 104 and/or the electronic device 102 can monitor the angle of rotation of the blind cap 104c as a rotational input. In other cases, the blind cap 104c can be mechanically coupled to a switch such that pressing the blind cap 104c issues a command or an instruction to the stylus 104 and/or the electronic device 102.

The tip 104b of the stylus 104, or more generally the "tip" may be configured to contact the input surface 108 of the electronic device 102 in order to facilitate interaction between the user 106 and the electronic device 102. The tip 104b may taper to a point, similar to a pen, so that the user 106 may control the stylus 104 with precision in a familiar form factor. In some examples, the tip 104b may be blunt or rounded, as opposed to pointed, or may take the form of a rotatable or fixed ball.

In many embodiments, tip 104b is formed from a softer material than the input surface 108. For example, the tip 104b can be formed from a silicone, a rubber, a fluoroelastomer, a plastic, a nylon, conductive or dielectric foam, or any other suitable material or combination of materials. In this manner, drawing of the tip 104b across the input surface 108 may not cause damage to the input surface 108 or layers applied to the input surface 108 such as, but not limited to, anti-reflective coatings, oleophobic coatings, hydrophobic coatings, cosmetic coatings, ink layers, and the like.

As with the barrel 104a, the tip 104b can be formed from a material doped with an agent configured to provide the tip 104b with a selected color, hardness, elasticity, stiffness, reflectivity, refractive pattern, texture and so on. In other examples, the doping agent can confer other properties to the tip 104b including, but not necessarily limited to, electrical conductivity and/or insulating properties, magnetic and/or diamagnetic properties, chemical resistance and/or reactivity properties, infrared and/or ultraviolet light absorption and/or reflectivity properties, visible light absorption and/or reflectivity properties, antimicrobial and/or antiviral properties, oleophobic and/or hydrophobic properties, thermal absorption properties, pest repellant properties, colorfast and/or anti-fade properties, antistatic properties, liquid exposure reactivity properties, and so on.

In many cases, the tip 104b is formed from the same material as the barrel 104a, although this is not required. In some embodiments, the tip 104b may be configured, entirely or partially, as a signal diffuser to diffuse an infrared signal or another optical signal such as a multi-color light-emitting diode. In other cases, the tip 104b may be configured, entirely or partially, as an antenna window, allowing for wireless communications and/or electric fields to pass therethrough.

The tip 104b can have a diameter that linearly decreases. In many embodiments, such as illustrated, the cross-section view of the tip 104b matches that of the barrel 104a where the barrel 104a and tip 104b interface, linearly decreasing until a termination point. In other examples, the cross-section view of the tip 104b may decrease and/or increase before terminating at the termination point. In some cases, the profile of the tip 104b can follow a mathematical function, such as a bump function, a Gaussian function, or a step function. The tip 104b can include grip features, such as embossments or impressions, closely-spaced channels, protrusions, projections and/or the like. In some cases, a grip feature can be formed from a different material than the tip 104b; the grip may be formed from a polymer material exhibiting high friction.

The tip 104b can be configured to be removably attached to the barrel 104a. In one embodiment, the tip 104b is threaded such that the tip 104b screws into corresponding threads within the barrel 104a. In other cases, the tip 104b includes one or more detents and/or recesses that are configured to align with one or more corresponding recesses and/or detents within the barrel 104a. In other cases, the tip 104b is interference-fit or snap-fit to the barrel 104a. In still further cases, the tip 104b is magnetically attracted to a portion of the barrel 104a.

Electronic Devices Configured to Receive Input from a Stylus

Next, returning to FIG. 1A, reference is made to certain physical and operational characteristics of the electronic device 102 and its interoperation with the stylus 104 depicted in FIGS. 1A-1B.

In some embodiments, the electronic device 102 locates and estimates the angular position of the stylus 104 substantially in real time. The electronic device 102 can perform these operations with and/or without communications from the stylus 104.

In the illustrated embodiment, the electronic device 102 is depicted as a tablet computing device, although this form-factor is not required of all embodiments (as noted above). For example, the electronic device 102 can be any suitable device, such as a desktop computer, laptop computer, cellular phone, an industrial or commercial computing terminal, a medical device, a peripheral or integrated input device, a hand-held or battery powered portable electronic device, a navigation device, a wearable device, and so on. For simplicity of illustration, many of the components of the electronic device 102 of FIG. 1A described below are either not labeled in FIGS. 1A-1D or are not depicted in FIGS. 1A-1D.

The electronic device 102 includes an enclosure (e.g., a "housing"). The housing 102a can form an outer surface (or partial outer surface) and protective case for one or more internal components of the electronic device 102. In the illustrated embodiment, the housing 102a is formed in a substantially rectangular shape, although this configuration is not required. The housing 102a can be formed of one or more components operably connected together, such as a front piece and a back piece or a top clamshell and a bottom clamshell. Alternatively, the housing 102a can be formed of a single piece (e.g., uniform body or unibody).

The housing 102a may be configured to enclose, support, and retain the internal components of the electronic device 102. Components of the electronic device 102 can include, but are not necessarily limited to, one or more of a processor, a memory, a power supply, one or more sensors, one or more communication interfaces, one or more data connectors, one or more power connectors, one or more input/output devices, such as a speaker, a rotary input device, a microphone, an on/off button, a mute button, a biometric sensor, a camera, a force and/or touch sensitive trackpad, and so on.

The electronic device 102 can include a display 108a. The display 108a may be positioned below the input surface 108. In other examples, the display 108a is integrated with the input surface 108. The display 108a can be implemented with any suitable technology, including, but not limited to, a multi-touch and/or multi-force sensing touchscreen that uses liquid crystal display technology, light-emitting diode technology, organic light-emitting display technology, organic electroluminescence technology, electronic ink, or another type of display technology or combination of display technology types.

In some embodiments, the communication interfaces of the electronic device 102 facilitate electronic communications between the electronic device 102 and the stylus. 104. For example, in one embodiment, the electronic device 102 may be configured to communicate with the stylus 104 via a low-energy Bluetooth communication interface or a Near-Field Communication interface. In other examples, the communication interfaces facilitate electronic communications between the electronic device 102 and an external communication network, device or platform.

The communication interfaces, whether between the electronic device 102 and the stylus 104 or otherwise, can be implemented as wireless interfaces, Bluetooth interfaces, Near Field Communication interfaces, magnetic interfaces, universal serial bus interfaces, inductive interfaces, resonant interfaces, capacitive coupling interfaces, Wi-Fi interfaces, TCP/IP interfaces, network communications interfaces, optical interfaces, acoustic interfaces, or any conventional communication interfaces.

The electronic device 102 may provide information related to externally connected or communicating devices and/or software executing on such devices, messages, video, operating commands, and so forth (and may receive any of the foregoing from an external device), in addition to communications. As noted above, for simplicity of illustration, the electronic device 102 is depicted in FIGS. 1A-1D without many of these elements, each of which may be included partially, optionally, or entirely, within the housing 102a of the electronic device 102.

As noted above, the electronic device 102 includes an input surface 108. The input surface 108 cooperates with the housing 102a of the electronic device 102 to form an external surface thereof. In some cases, a top surface of the input surface 108 can be flush with an external surface of the housing 102a, although this is not required of all embodiments. In some examples, the input surface 108 stands proud of at least a portion of the housing 102a.

In many examples, the input surface 108 is formed from glass or another suitable material, such as plastic, sapphire, metal, ceramic, ion-implanted glass, and so on. In some cases, the input surface 108 is a solid material, whereas in other cases, the input surface 108 is formed by laminating or adhering several materials together. In some cases, the input surface 108 is optically transparent, whereas in others, the input surface 108 is opaque.

The input surface 108 can include one or more cosmetic or functional layers disposed on an outer surface thereof. For example, an anti-reflective coating may be applied to an outer (or inner) surface of the input surface 108. In another example, an oleophobic coating is applied to the input surface 108. In other examples, a tactile layer is applied to the input surface 108. The tactile layer can be configured to exhibit a specific kinetic or static friction when the stylus 104 is moved thereacross.

The electronic device 102 can also include a display positioned below, or integrated with, the input surface 108. The electronic device 102 utilizes the display to render images to convey information to the user. The display can be configured to show text, colors, line drawings, photographs, animations, video, and the like.

The display can be adhered to, laminated with, or positioned to contact a bottom surface of the input surface 108. The display can include a stack of multiple elements that facilitate the rendering of images including, for example, a transparent circuit layer, a color filter layer, a polarizer layer, and other elements or layers. The display may be implemented with any suitable display technology including, but not limited to, liquid-crystal display technology, organic light-emitting diode technology, electroluminescent technology, and the like. The display may also include other layers for improving its structural or optical performance, including, for example, glass sheets, polymer sheets, polarizer sheets, color masks, rigid or resilient frames, and the like.

The electronic device 102 can also include a sensor layer positioned below, or integrated with, the input surface 108 and/or the display of the electronic device 102. The electronic device 102 utilizes the sensor layer to, among other purposes, detect the presence and/or location of the stylus 104 on the input surface 108. In other examples, the electronic device 102 utilizes the sensor layer to detect the presence of another object on the input surface 108, such as a finger of the user. In still further examples, the electronic device 102 utilizes the sensor layer to detect the force with which an object, such as the stylus 104, presses on the input surface 108.

The sensor layer can be optically transparent or opaque. If the sensor layer of a particular embodiment is disposed within the display, the sensor layer may be optically transparent so as to not impact the clarity of the display. In another example, the sensor layer may be disposed around the perimeter of the display, positioned below a bezel surrounding the display. In this embodiment, the sensor layer need not be optically transparent.

Locating the Stylus

Next, reference is made to the operation of locating the stylus 104 on the input surface 108 of the electronic device 102, using the sensor layer of the electronic device 102. The electronic device 102 can locate the tip of stylus 104, and estimate the Cartesian coordinates thereof, in a number of suitable ways.

In typical embodiments, the stylus 104 is located as a result of cooperation between the stylus 104 and the electronic device 102. Generally and broadly, the stylus 104 may generate an electric field having a small effective diameter. This field intersects the input surface when the stylus is placed on it. The electronic device 102 detects the field and estimates the location of the stylus based on the location (and/or area) at which the field is detected. The field that may be generated by the stylus 104 is described in greater detail below with specific reference to FIGS. 5A-5M.

More specifically, as noted above, the electronic device 102 can include a sensor layer that may be configured to detect electric fields generated by the stylus 104. In one embodiment, a sensor layer includes a number of capacitance sensing nodes. The capacitive sensing nodes can be located on or between any suitable layer on or within the display and/or on or within the input surface 108.

In some examples, the capacitive sensing nodes may be formed, at least in part, from an optically transparent conductor such as, but not limited to: metal oxides such as indium-tin oxide and antimony-tin oxide; nanowire patterns formed from silver nanowire, carbon nanotubes, platinum nanowire, gold nanowire, and so on; thin deposits of metal; and the like. The capacitive sensing nodes may be configured to operate in a self, mutual, or other capacitance mode, capacitively coupling to the stylus 104 and detecting signals and fields generated thereby.

In these embodiments, the stylus 104 may create a substantially-spherical electric field to be generated from its tip. This field affects the mutual capacitance of each capacitive sensing node nearby the tip. The electronic device 102 locates the stylus 104 on the input surface 108 by monitoring each capacitive sensing node for these capacitive changes and estimating the location at which such changes (if any) have occurred.

As used herein, the term "tip signal" generally refers to an electrical signal applied by the stylus 104 to the tip 104b. As used herein, the term "tip field" generally refers to the electric field generated by the tip 104b of the stylus 104 in response to the tip signal. As noted above, the tip field may take any suitable shape, but in many embodiments, the tip field takes a substantially spherical shape and may be modeled as a point source monopole electric field. The area of the input surface 108 (or a plane parallel to the input surface 108) intersected by the tip field is generally referred to herein as the "tip field intersection area."

The perimeter of the tip field intersection area may be defined as the boundary after which the power density (e.g., magnitude) of the tip field received by the electronic device 102 is below a selected threshold. In one example, the circumference of the tip field intersection area is defined at the half-power point of the tip field (e.g., 3 dB point). In other words, in this example the tip field intersection area is defined as a portion of the input surface 108 intersected by the tip field with a magnitude at least greater than the half of the power at which that field was generated. Example structures which may be configured to generate and/or emit the tip field are described in detail below, in particular with reference to FIGS. 3A and 5A-5N.

Because the tip field is generated from the tip of the stylus 104, the tip field intersection area shifts substantially only based on the location of the stylus 104; the tip field intersection area may not, in typical embodiments, shift in a substantial manner based on the angular position of the stylus 104. Thus, in order to determine the location of the stylus 104, the electronic device determines the geometric center of the tip field intersection area. However, as may be appreciated, the sensor layer of the electronic device 102 may be disposed a distance below the outermost surface of the input surface 108. In these examples, the tip field intersection area may depend upon the angular position of the stylus 104 (e.g., foreshortening/parallax effects).

In other embodiments, the location of the stylus 104 can be determined by the electronic device 102, the stylus 104, or a combination thereof, in another manner. For example, the electronic device 102 can determine a tip field perimeter shape, a location of a maximum of the tip field, a location of a minimum of the tip field, and so on. In other words, it may be appreciated that although certain techniques are described herein, other suitable techniques may be employed by an electronic device 102 or stylus 104 to determine the location of the stylus.

In many cases, the same sensor layer can also be used to detect one or more fingers of the user 106 while simultaneously detecting the tip field. In these cases, the electronic device 102 can accept both touch input and stylus input. In particular, the capacitive sensing nodes may be operated in a touch input mode to detect a finger touch and operated in a tool input mode to detect a stylus input. The two modes may be switched at a rate that enables simultaneous or near simultaneous detection of both finger touches (multi-touch or single touch) and stylus input.

Angular Position of the Stylus

Figure 1C:
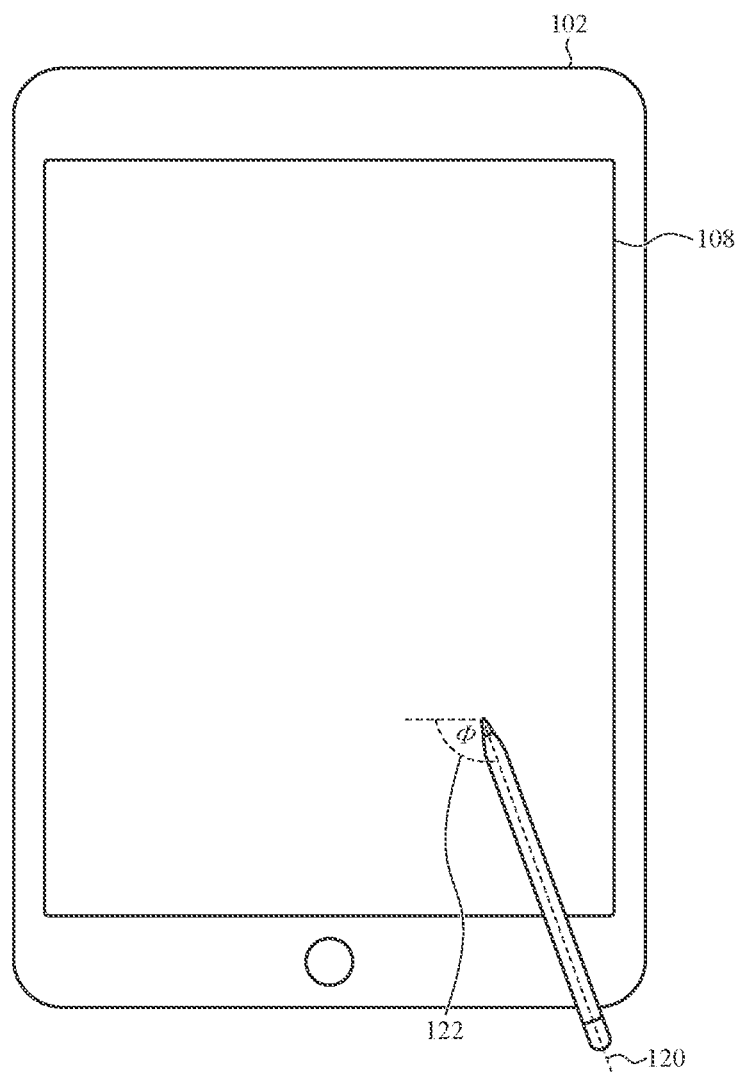
FIG. 1C depicts a top view of the electronic device and stylus of FIG. 1A, specifically showing the stylus oriented at an angle relative to the plane of the input surface and, in particular, an azimuthal angle of the stylus relative to a horizontal axis of the plane of the input surface.
Figure 1D:
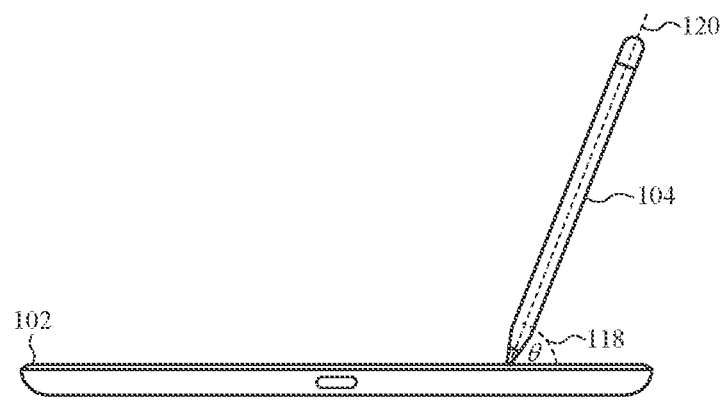
FIG. 1D depicts a side view of the electronic device and stylus of FIGS. 1A and 1C, specifically showing a polar angle of the stylus relative to the plane of the input surface of the electronic device.

Referring next to FIGS. 1B-1D, reference is made to the operation of estimating the angular position of the stylus 104 with respect to the input surface 108. In these embodiments, the stylus 104 may generate a second electric field that is separate and offset from the tip field. The second electric field is coaxially aligned with the tip field, and both fields are axially symmetric along the longitudinal axis of the stylus 104, thereby allowing the stylus 104 to be grip-agnostic.

In order to ensure that the tip field and the second electric field are axially symmetric, many embodiments generate the second electric field with an electrically-conductive ring or tube having a small diameter. In some embodiments, the diameter of the electrically-conductive ring is approximately equal to the width of the electrical conductor that generates the tip field (e.g., within one millimeter). A signal line responsible for conveying the tip signal to the tip 104b passes through the electrically-conductive ring. In this manner, the field generated by the electrically-conductive ring can be axially symmetric; the field is not affected by the presence of signal lines responsible for conveying the tip signal to the tip 104b.

As used herein, the term "ring signal" generally refers to the electrical signal applied by the stylus 104 to generate the second electric field. In many embodiments, the second electric field is also a substantially spherical electric field due to the small diameter of the ring-shaped electrical conductor. In other words, although the source of the field is a ring-shaped conductor and not a point source, the radius of the conductor is small enough in comparison to the distance separating the conductor from the tip (and thus the input surface 108 of the electronic device 102) that the ring field appears to the electronic device 102 as having originated from a point-source monopole.

In some embodiments, the ring-shaped electrical conductor is a tube or cylinder. In these embodiments, the electric field generated may take a capsule shape (e.g., a cylinder capped with hemi-spherical ends). In these embodiments, the ring-shaped conductor has a longitudinal axis that is aligned along the longitudinal axis of the stylus 104. In this manner, one hemi-spherical end of the capsule-shaped electric field generated from the tube-shaped electrical conductor is oriented toward the tip 104b of the stylus 104.

As with the tip field, as used herein, the term "ring field" generally refers to an electric field generated by the stylus 104 in response to the ring signal. The area of the input surface 108 (or a plane parallel to the input surface 108) intersected by the ring field is generally referred to herein as the "ring field intersection area."

In other embodiments, the angular position of the stylus 104 can be determined by the electronic device 102, the stylus 104, or a combination thereof, in another manner. For example, the electronic device 102 can determine a ring field perimeter shape, a location of a maximum of the ring field, a location of a minimum of the ring field, and so on. In other words, it may be appreciated that although certain techniques are described herein, other suitable techniques may be employed by an electronic device 102 or stylus 104 to determine the angular position of the stylus.

Thus, generally and broadly, a stylus such as described herein (e.g., the stylus 104) generates two different electric fields, the origins of which are offset from one another by a certain distance. The electric fields are aligned with one another along the longitudinal axis of the stylus so that the fields are axially symmetric. The first field originates proximate to the tip of the stylus and is referred to as the tip field. The second field originates a small distance offset from the tip field and is referred to as the ring field. Both the tip field and the ring field are substantially spherical (or hemispherical) in the direction of the tip of the stylus. When in use, the tip field and the ring field respectively intersect an input surface (e.g., the input surface 108) of an electronic device (e.g., the electronic device 102) over a tip field intersection area and a ring field intersection area. In many cases, the intersection areas may be substantially circular.

As with the tip field intersection area, the perimeter of the ring field intersection area may be defined as the boundary after which the power density (e.g., magnitude) of the ring signal received by the electronic device 102 is below a selected threshold. In one example, the circumference of the ring field intersection area is defined at the half-power point of the ring field (e.g., 3 dB point). In other words, in this example the ring field intersection area is defined as a portion of the input surface 108 intersected by the ring field with a magnitude at least greater than half of the power at which that field was generated. Example structures which may be configured to generate and/or emit the ring field are described in detail below, in particular with reference to FIGS. 3A and 5A-5N.

The tip signal and the ring signal can each have at least one alternating current component that, via capacitive coupling or another suitable sensing technique, is received by the sensor layer of the electronic device. In many embodiments, the frequency of the tip signal is different from the frequency or modulation pattern of the ring signal (e.g., frequency multiplexing). In other cases, the tip signal and the ring signal can be time-multiplexed.

However, unlike the tip field, the ring field intersection area may shift based on the angular position of the stylus 104 specifically because the origin of the ring field (e.g., the ring-shaped electrical conductor) is separated from the tip 104b. Thus, tilting the stylus 104 in one direction or another causes the ring field intersection area to change in area and/or location, while the tip field intersection area remains substantially fixed.

In these embodiments, the relative positions of the tip field intersection area and the ring field intersection area can be used to estimate the polar angle and the azimuthal angle of the stylus 104. More particularly, the farther apart the geometric centers of the tip field intersection area and the ring field intersection are from one another, the smaller the polar angle (e.g., the closer the stylus 104 is to parallel with the input surface 108) of the stylus 104 relative to the input surface 108. Similarly, the angle of the vector defined between the geometric centers of the tip field intersection area and the ring field intersection area can be used to estimate the azimuthal angle of the stylus 104 relative to the input surface 108.

In another non-limiting phrasing, in many embodiments, the electronic device 102 uses the known spherical diameter of the tip and ring field, diameter of the ring field intersection area, and/or the distance between the tip and the ring in order to estimate a polar angle 118 (defined between a vector normal to the plane of the input surface 108 and a longitudinal axis 120 of the stylus 104, such as a zenith) and an azimuthal angle 122 (defined between the polar angle 118 and a reference vector within the plane of the input surface 108, such as an axis).

To facilitate an understanding of the relative relationship between the polar angle 118 and the azimuthal angle 122, FIGS. 1C and 1D are provided depicting additional views of the electronic device 102 and the stylus 104 as shown in FIG. 1A, omitting the hand of the user 106 for clarity. FIG. 1C depicts a top view of the electronic device 102 of FIG. 1A, specifically illustrating the azimuthal angle 122 of the stylus 104 relative to the plane of the input surface 108. Similarly, FIG. 1D depicts a bottom side view of the electronic device of 102, specifically illustrating the polar angle 118 of the stylus 104 relative to the plane of the input surface of the electronic device.

Many embodiments are described herein with reference to a sensor layer of the electronic device 102 that may be configured to detect the tip signal and the ring signal by monitoring mutual capacitance. However, it may be appreciated that the electronic device 102 can be appropriately configured in any implementation-specific manner to detect both the ring field and the tip field. For example, electronic devices can include a sensor layer configured to monitor for changes in the self-capacitance of one or more capacitive sensor nodes. In other examples, an electronic device can be configured to operate in both a self-capacitance mode and a mutual capacitance mode. In other embodiments, other sensing techniques can be used to determine the location and relative position of the tip field and the ring field.

As noted above, the sensor layer can also be used to detect one or more fingers of the user 106 while simultaneously detecting the ring field. In these cases, the electronic device 102 can accept both touch input and stylus input.

Detection of Force Applied by the Stylus

Returning to FIG. 1B, reference is made to the operation of estimating the force applied $F_a$ by the stylus 104 to the input surface 108. As with other embodiments described herein, the force applied by the stylus 104 can be estimated, measured, approximated, or otherwise obtained in a number of ways.

In some examples, the force is estimated by the electronic device 102. In other examples, the force is estimated by the stylus 104, after which the stylus 104 communicates the estimated force to the electronic device 102 (e.g., via a wireless communication interface) as a vector or scalar quantity using any suitable encoded or not-encoded format. In still further embodiments, a force estimate obtained by the electronic device 102 and a force estimate obtained by the stylus 104 can be combined, averaged, or otherwise used together to estimate the magnitude of force applied by the stylus 104.

Initially, reference is made to embodiments in which the electronic device 102 estimates the force applied $F_a$ by the stylus 104. In these embodiments, the electronic device 102 can include one or more components configured to estimate and/or approximate force applied to the input surface 108. Upon estimating that the tip of the stylus 104 is contacting the input surface 108, the electronic device 102 estimates the force applied $F_a$ thereby. In these embodiments, the force estimated by the electronic device 102 can be obtained as a force vector normal to the input surface 108. In these cases, the electronic device 102 may resolve the force vector (e.g., using the law of cosines) into a vector component parallel to the longitudinal axis 120 and a component parallel to the input surface 108 using the polar angle 118 and the azimuthal angle 122 (e.g., computed in accordance with techniques presented above). The electronic device 102 can interpret the magnitudes or directions of either or both of the component parallel to the input surface 108 and the component parallel to the angular position of the stylus 104 as a user input.

Next, reference is made to embodiments in which the stylus 104 estimates the force applied $F_a$ to the input surface 108. In these examples, the stylus 104 estimates the reaction force $F_r$ experienced by the stylus itself; the reaction force $F_r$ is equal in magnitude and opposite in sign of the force applied $F_a$ by the stylus 104 to the input surface 108.

In one embodiment, the tip 104b of the stylus 104 is formed, at least partially, from a force-sensitive material, such as piezoelectric material. A circuit within the stylus 104 estimates an electrical property of the force-sensitive material in order to estimate whether the tip 104b of the stylus 104 is experiencing a reaction force $F_r$. After obtaining an estimate of the reaction force $F_r$, the stylus 104 can communicate the force applied $F_a$ by the tip 104b to the electronic device 102.

In another embodiment, a force-sensitive structure can be integrated between the tip 104b and the barrel 104a of the stylus 104. The force-sensitive structure can include a number of independent force sensors, disposed within a gasket seal positioned between the tip 104b and the barrel 104a. A circuit within the stylus 104 estimates an electrical property of the gasket seal in order to estimate whether the tip 104b is experiencing a reaction force. Thereafter, the stylus 104 can communicate the force applied $F_a$ by the tip 104b to the electronic device 102.

In another embodiment, a force-sensitive structure can be integrated within the barrel 104a of the stylus 104. The force-sensitive structure can include a number of independent strain or force-responsive elements disposed at various locations along the barrel 104a. Upon detecting one or more forces (e.g., from one or more of the fingers of the user 106), the stylus 104 can resolve and/or combine such forces into a single vector parallel to the longitudinal axis 120. More particularly, in these embodiments, the stylus 104 designates that the tip 104b is the fulcrum of a second class lever. In this manner, if the various forces detected by the force-sensitive structure at various locations across the barrel 104a of the stylus 104 sum to zero, the stylus 104 can estimate that the tip 104b of the stylus 104 is not in contact with the input surface 108. Conversely, if the various forces detected by the force-sensitive structure at various locations across the body of the stylus 104 do not sum to zero, the stylus 104 can infer that remaining force must be applied through the tip 104b to the input surface 108. Thereafter, the stylus 104 can communicate the force applied $F_a$ by the tip 104b to the electronic device 102.

In other embodiments, the tip 104b of the stylus 104 can be movable, generally along the longitudinal axis 120. In this manner, when the tip 104b of the stylus 104 touches the input surface 108 (or any other surface), and applies a force, it withdraws at least partially into the barrel 104a of the stylus 104 as a direct result of the reaction force $F_r$. The amount of withdrawal can vary from embodiment to embodiment. In one non-limiting example, the tip 104b can withdraw into the body of the stylus 104 by less than 1.0 mm. In other embodiments, the tip 104b can withdraw into the body of the stylus 104 by less than 0.1 mm. In still further embodiments, the tip 104b can withdraw by a different (e.g., greater or less) amount.

In these examples, a force-sensitive structure within the body of the stylus 104 may be coupled to the tip 104b. The force-sensitive structure can serve several purposes. For example, the force-sensitive structure can provide support to the tip 104b. In another example, the force-sensitive structure can guide the withdrawal of the tip 104b into the barrel 104a. In another example the force-sensitive structure can restore the tip 104b of the stylus 104 to a neutral position when force $F_a$ is no longer applied thereby.

In one embodiment, the force-sensitive structure includes a basing mechanism that biases the tip 104b of the stylus 104 outwardly, providing resistance against the withdrawal of the tip 104b into the body of the stylus 104. In some cases, the biasing mechanism is a helical spring or a leaf spring.

The force-sensitive structure can be formed, at least in part, from metal. The force-sensitive structure can include a lateral bed with two cantilevered legs extending from each end of the lateral bed. The cantilevered legs can be formed from the same material as the lateral bed. In some embodiments, the lateral bed and the cantilevered legs are formed as a single, integral part. In other examples, the cantilevered legs are attached to the lateral bed via adhesive, welding, or any other suitable method.

Each of the cantilevered legs can be fixed relative to an internal frame of the stylus 104, suspending the lateral bed of the force-sensitive structure within the body of the stylus 104. As noted above, the tip 104b of the stylus 104 may be mechanically coupled to a portion of the force-sensitive structure. For example, the tip 104b can be coupled to at least one of the cantilevered legs and/or the lateral bed. In this manner, when the tip 104b of the stylus 104 moves inwardly with respect to the body (e.g., in response to the tip touching the input surface 108 and applying a force), the cantilevered legs may deflect in a predictable manner. The deflection of one or both of the cantilevered legs may be measured using a strain sensor or other sensing apparatus which, in turn, can be used to estimate the force applied by the stylus 104.

Upon removing the stylus 104 from the input surface 108, one or both of the cantilevered legs of the force-sensitive structure may exhibit a restoring force that returns the tip of the stylus 104 to its neutral position.

In many embodiments, the cantilevered legs are substantially orthogonal to the lateral bed when in a neutral position (e.g., when the tip is not applying a force and the stylus 100 is in the ready state). In other cases, the cantilevered legs extend from the lateral bed at an oblique angle. In some cases, both cantilevered legs connect to the same side of the lateral bed; a profile of the force-sensitive structure takes a widened U-shape. In other cases, the cantilevered legs connect to opposite sides of the lateral bed; a profile of the force-sensitive structure takes an elongated S-shape or Z-shape.

In these embodiments, the strain sensor (or other sensing apparatus) may exhibit an electrically-measurable property that changes as a function of the magnitude of force applied. In one example, a strain sensor may be coupled to a cantilevered leg of the force-sensitive structure. The strain sensor can be coupled to an electrical circuit within the stylus 104. The electrical circuit can be configured to monitor one or more electrical properties (e.g., resistance, capacitance, accumulated charge, inductance, and so on) of the strain sensor for changes.

When the tip 104b of the stylus 104 applies a force to the input surface 108, the tip 104b moves inwardly with respect to the body of the stylus 104, which in turn causes at least one of the cantilevered legs of the force-sensitive structure to deflect, which in turn causes one or more electrical properties of the strain sensor to change. The electrical circuit then quantifies these changes and, in turn, reports that a force is estimated. Thereafter, the stylus 104 can communicate the force applied by the tip 104b to the electronic device 102.

The foregoing description of the embodiments depicted in FIGS. 1A-1D, and various alternatives and variations, are presented, generally, for purposes of explanation, and to facilitate a thorough understanding of the detailed embodiments presented below. However, it will be apparent to one skilled in the art that some of the specific details presented herein may not be required in order to practice a particular described embodiment, or an equivalent thereof. Thus, the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings. Particularly, it may be understood that the user input system depicted in FIGS. 1A-1D including an electronic device and a stylus can be implemented in a number of suitable and implementation-specific ways.

However, broadly and generally, the electronic device determines and/or estimates characteristics of the stylus and/or changes therein over time, to interpret the user's manipulation thereof as input. The electronic device obtains, through its own estimate or by communication with the stylus, the location of the stylus, the angular position of the stylus, the force applied by the stylus to the electronic device, the velocity of the stylus, the acceleration of the stylus, the polar angular velocity or acceleration of the stylus, the azimuthal angular velocity or acceleration of the stylus, and so on. Any of these operations, or portions of these operations, may be performed by the electronic device, by the stylus, and/or performed, at least in part, as a result of cooperation and communication therebetween.

General Operation of a User Input System

FIGS. 2A-2F generally depict simplified system diagrams of a user input system 200 including an electronic device 202 and a stylus 204, and various sub-portions thereof. For simplicity of illustration, many of these simplified system diagrams may be presented without signal and/or interconnection paths between system elements that may be required or desirable for a particular embodiment. Accordingly, it may be understood that one or more of the various system elements depicted in the simplified block diagrams of FIGS. 2A-2F may be electrically or communicably configured, in an implementation-specific and appropriate manner, to be in communication with any other appropriate system element. Particularly, one or more of the various system elements can be configured to exchange data, power, analog or digital signals, or the like, via one or more circuit traces, jumpers, cables, wired or wireless communication interfaces, data buses, and so on with any other appropriate system element. Similarly, it may be understood that one or more of the various system elements depicted in the simplified block diagrams of FIGS. 2A-2F may be mechanically configured, in an implementation-specific and appropriate manner, to be coupled to (or to be mechanically isolated from) any other appropriate system element.

Accordingly, the absence or presence of a signal path and/or an interconnection path between various system elements of the simplified system diagrams depicted in FIGS. 2A-2F is not to be construed as a preference or requirement for the presence or absence of any particular electrical or mechanical relationship between the various system elements.

Figure 2A:
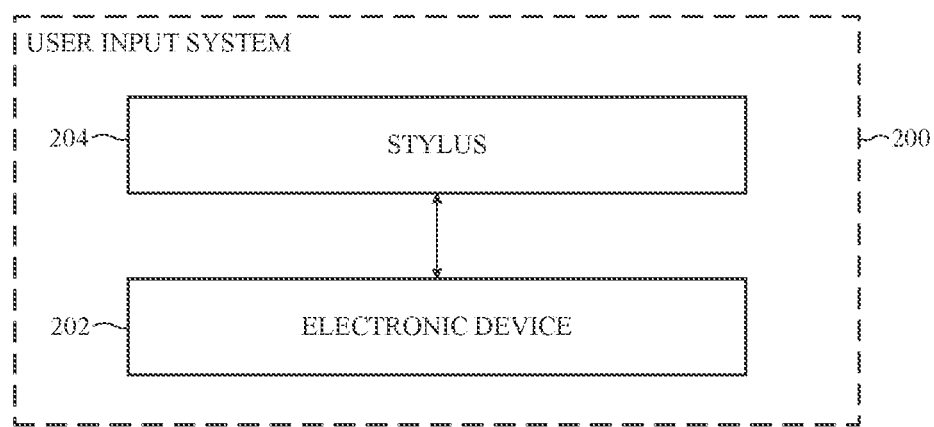
FIG. 2A depicts a simplified block diagram of a user input system including a stylus and an electronic device.

Initially, reference is made to certain operational components of the user input system 200 depicted in FIG. 2A. As with other embodiments described herein, the user input system 200 includes an electronic device 202 and a stylus 204. The electronic device 202 can be implemented as any suitable electronic device including, but not limited to: a desktop computer, laptop computer, cellular phone, an industrial or commercial computing terminal, a medical device, a peripheral or integrated input device, a hand-held or battery powered portable electronic device, a navigation device, a wearable device, and so on. The user input system 200 of FIG. 2A may correspond to the user input system 100 discussed above with respect to FIGS. 1A-1D.

The stylus 204 can be formed to take substantially any shape that can be manipulated with one hand of a user. For example, in many embodiments, the stylus 204 takes the shape of a stylus, a pen, a smart brush, a wand, a chisel, and so on.

As noted with respect to other embodiments described herein, a user manipulates the orientation and position of the stylus 204 relative to an input surface of the electronic device 202 to convey information to the electronic device 202. In many embodiments, the input surface of the electronic device 202 is a display screen, but this is not required; in other embodiments, the input surface can be a non-display input surface, such as a trackpad or drawing tablet.

General Operation of a Stylus of a User Input System

Figure 2B:
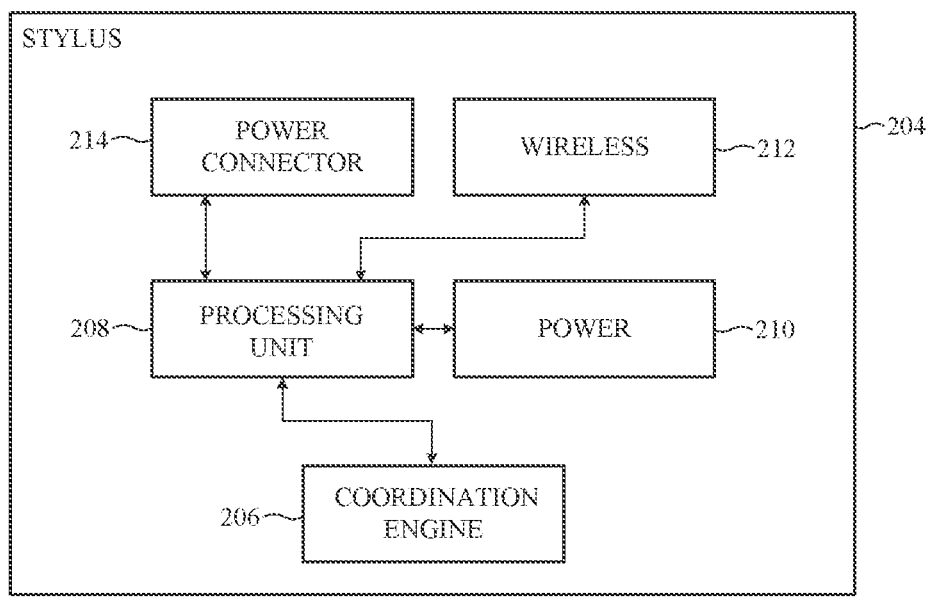
FIG. 2B depicts a simplified block diagram of the stylus of the user input system of FIG. 2A.

Next, reference is made to certain operational components of an example stylus 204, such as depicted in FIG. 2B. The stylus 204 can include several subsystems that cooperate to perform, coordinate, or monitor one or more operations or functions of the stylus 204 or, more generally, the user input system 200. Particularly, as shown in FIG. 2B, the stylus 204 includes a coordination engine 206, a processing unit 208, a power subsystem 210, a wireless interface 212, and a power connector 214.

Generally and broadly, the coordination engine 206 of the stylus 204 may be tasked with generating the tip field and the ring field as described above. These fields facilitate discovery of the coordinates, both Cartesian and spherical, of the stylus 204 by the electronic device 202. In some embodiments, the coordination engine 206 may also be tasked with measuring the force applied by the stylus 204, such as the reaction force $F_r$ described with respect to FIGS. 1A-1D.

In many embodiments, one or more components of the coordination engine 206 can include or can be communicably coupled to circuitry and/or logic components, such as a processor and a memory. The circuitry can control or coordinate some or all of the operations of the coordination engine 206 including, but not limited to: communicating with and/or transacting data with other subsystems of the stylus 204; receiving parameters used to generate the tip signal and the ring signal; conveying the tip signal and the ring signal to a tip-field generator and ring-field generator respectively; receiving the tip signal and the ring signal from another subsystem of the stylus 204; measuring and/or obtaining the output of one or more analog or digital sensors, such as a strain sensor or accelerometer; and so on. The coordination engine 206 is described in detail below with reference to FIG. 2D.

The processor of the coordination engine 206 can be implemented as any electronic device capable of processing, receiving, or transmitting data or instructions. For example, the processor can be a microprocessor, a central processing unit, an application-specific integrated circuit, a field-programmable gate array, a digital signal processor, an analog circuit, a digital circuit, or combination of such devices. The processor may be a single-thread or multi-thread processor. The processor may be a single-core or multi-core processor.

Accordingly, as described herein, the phrase "processing unit" or, more generally, "processor" refers to a hardware-implemented data processing device or circuit physically structured to execute specific transformations of data including data operations represented as code and/or instructions included in a program that can be stored within and accessed from a memory. The term is meant to encompass a single processor or processing unit, multiple processors, multiple processing units, analog or digital circuits, or other suitably configured computing element or combination of elements.

The coordination engine 206 may be coupled to the processing unit 208 and may be configured to provide the tip signal and ring signal to the coordination engine 206. The processing unit 208 may also be configured to facilitate communication with the electronic device 202, for example, via the wireless interface 212. The processing unit 208 is described in detail below with reference to FIG. 2E.

The processing unit 208, in many embodiments, can include or can be communicably coupled to circuitry and/or logic components, such as a processor and a memory. The circuitry of the processing unit 208 can perform, coordinate, and/or monitor one or more of the functions or operations of the processing unit 208 including, but not limited to: communicating with and/or transacting data with other subsystems of the stylus 204; communicating with and/or transacting data with the electronic device 202; generating the tip signal and/or ring signal; measuring and/or obtaining the output of one or more analog or digital sensors such as a strain sensor or accelerometer; changing a power state of the stylus 204 from a normal power state to a standby power state or a low power state; modulating information and/or data onto either or both the tip signal and ring signal; and so on.

The stylus 204 may be powered by an internal battery. The power subsystem 210 may include one or more rechargeable batteries and a power controller. The power controller of the power subsystem 210 may be configured to facilitate rapid charging of the batteries when the power connector 214 is coupled to a power source. In some cases, the power source to which the power connector 214 may be configured to connect to is a data and/or power port of the electronic device 202. In other cases, the power connector 214 includes one or more magnets that are configured to attract to a surface or channel of an electronic device.

The power controller of the power subsystem 210, in many embodiments, can include or can be communicably coupled to circuitry and/or logic components, such as a processor and a memory. The circuitry of the power controller can perform, coordinate, and/or monitor one or more of the functions or operations of the power subsystem 210 including, but not limited to: communicating with and/or transacting data with the electronic device 202; controlling a charging rate of a battery; estimating and reporting a capacity of a battery at a particular time; reporting that a capacity of a battery has dropped below a minimum threshold; reporting that a battery is charged; and so on. The power subsystem 210 is described in detail below with reference to FIG. 2F.

It will be apparent to one skilled in the art that some of the specific details presented above with respect to the stylus 204 may not be required in order to practice a particular described embodiment, or an equivalent thereof. Similarly, other styluses may include a greater number of subsystems, modules, components, and the like. Some submodules may be implemented as software or firmware when appropriate. Accordingly, it is appreciated that the description presented above is not meant to be exhaustive or to limit the disclosure to the precise forms recited herein. To the contrary, it will be apparent to one of ordinary skill in the art that many modifications and variations are possible in view of the above teachings.

General Operation of an Electronic Device of a User Input System

Figure 2C:
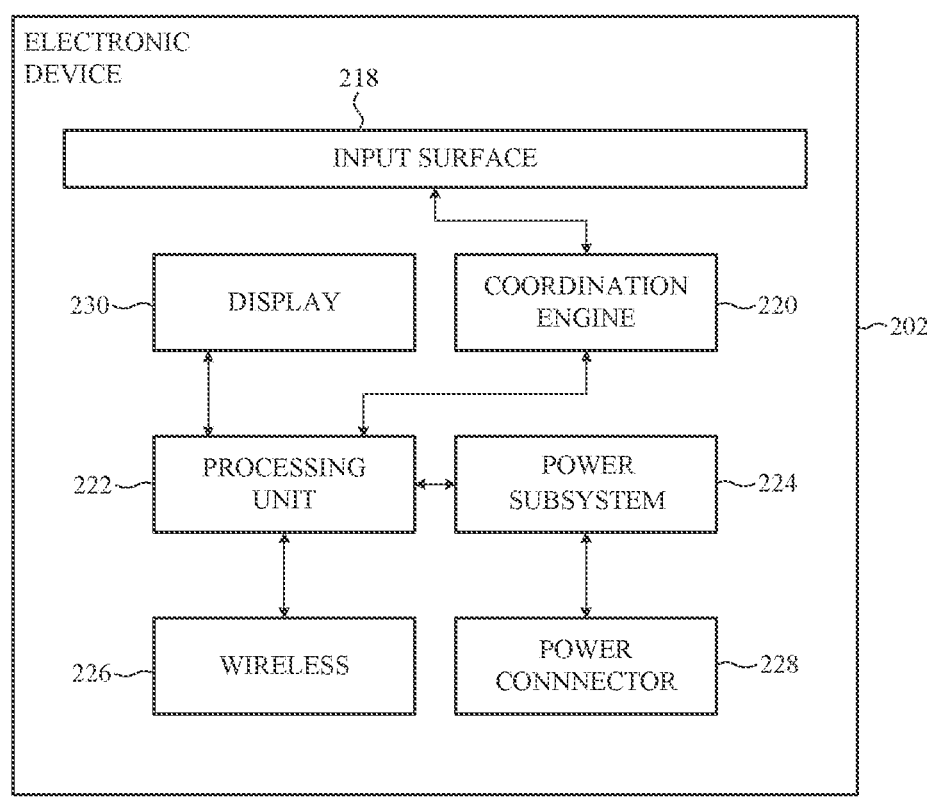
FIG. 2C depicts a simplified block diagram of the electronic device of the user input system of FIG. 2A and may be configured to receive input from the stylus of FIG. 2B.

Next, reference is made to FIG. 2C in which various subsystems of an example electronic device 202 are shown. As with the stylus 204 depicted in FIG. 2B, the electronic device 202 can include several subsystems that cooperate to perform, coordinate, or monitor one or more operations or functions of the electronic device 202 or, more generally, the user input system 200. The electronic device 202 includes an input surface 218, a coordination engine 220, a processing unit 222, a power subsystem 224, a wireless interface 226, a power connector 228, and a display 230.

The coordination engine 220, in many embodiments, can include or can be communicably coupled to circuitry and/or logic components, such as a processor and a memory. The circuitry of the coordination engine 220 can perform, coordinate, and/or monitor one or more of the functions or operations of the coordination engine 220 including, but not limited to: communicating with and/or transacting data with other subsystems of the electronic device 202; communicating with and/or transacting data with the stylus 204;

measuring and/or obtaining the output of one or more analog or digital sensors such as a touch sensor; measuring and/or obtaining the output of one or more sensor nodes of an array of sensor nodes, such as an array of capacitive sensing nodes; receiving and locating a tip signal and ring signal from the stylus 204; locating the stylus 204 based on the location of the tip signal intersection area and the ring signal intersection area; and so on.

The coordination engine 220 of the electronic device 202 includes or is otherwise communicably coupled to a sensor layer positioned below, or integrated with, the input surface 218. The coordination engine 220 utilizes the sensor layer to locate the stylus 204 on the input surface 218 and to estimate the angular position of the stylus 204 relative to the plane of the input surface 218 using techniques described herein.

In one embodiment, the sensor layer of the coordination engine 220 of the electronic device 202 is a grid of capacitive sensing nodes arranged as columns and rows. More specifically, an array of column traces is disposed to be perpendicular to an array of row traces. A dielectric material, such as a substrate, separates the column traces from the row traces such that at least one capacitive sensing node is formed at each "overlap" point where one column trace crosses over or below one row trace. Some embodiments dispose column traces and row traces on opposite sides of a substrate whereas others dispose column traces and row traces on the same side of a substrate. Some embodiments may only include row traces, whereas other may only include column traces. The sensor layer can be separate from other layers of the electronic device, or the sensor layer can be disposed directly on another layer such as, but not limited to: a display stack layer; a force sensor layer; a digitizer layer; a polarizer layer; a battery layer; a structural or cosmetic housing layer; and so on.

The sensor layer can be operated in a number of modes. If operated in a mutual capacitance mode, a column trace and a row trace form a single capacitive sensing node at each overlap point (e.g., "vertical" mutual capacitance). If operated in a self-capacitance mode, a column trace and a row trace form two (vertically aligned) capacitive sensing nodes at each overlap point. In another embodiment, if operated in a mutual capacitance mode, adjacent column traces and/or adjacent row traces can each form single capacitive sensing nodes (e.g., "horizontal" mutual capacitance.

In many embodiments, the sensor layer can operate in multiple modes simultaneously. In other embodiments, the sensor layer may rapidly shift from one mode to another. In still further embodiments, the sensor layer can use a first mode to detect the presence or proximity of an object (e.g., a stylus, a user's finger, and so on) and then use a second mode to obtain an estimation of that object. For example, the sensor layer may operate in a self-capacitance mode until an object is detected nearby the input surface, after which the sensor layer transitions into a mutual capacitance mode (either or both vertical or horizontal). In other cases, capacitive sensing nodes can be disposed in another implementation-specific and suitable manner.

Independent of the configuration of the sensor layer, the capacitive sensing nodes included therein may be configured to detect the presence and absence of the tip field, the ring field, and/or the touch of a user's finger. The sensor layer can be optically transparent, although this may not be required for all embodiments.

As noted above, the sensor layer can detect the presence of the tip field, the presence of the ring field, and/or the touch of a user's finger by monitoring for changes in capacitance (e.g., mutual capacitance or self-capacitance) exhibited at each of the capacitive sensing nodes. In many cases, the coordination engine 220 may be configured to detect the tip signal and the ring signal received through the sensor layer from the stylus 204 via capacitive coupling.

In some cases, the coordination engine 220 may be configured to demodulate, decode, or otherwise filter one or more raw signals received from the sensor layer in order to obtain the tip signal, the ring signal, and/or data that may be modulated therewith. The operation of obtaining the tip signal and the ring signal, as performed by the coordination engine 220 (or another component communicably coupled to the sensor layer or to the coordination engine 220), can be accomplished in a number of implementation-specific ways, suitable for any number of embodiments described herein or reasonable equivalents thereof.

In other embodiments, the sensor layer can be configured to operate in both a self-capacitance mode and a mutual capacitance mode. In these cases, the coordination engine 220 can monitor for changes in self-capacitance of one or more portions of each capacitive sensing node in order to detect the tip field and/or ring field (and, correspondingly, obtain the tip signal and the ring signal), while monitoring for changes in mutual capacitance to detect the touch (or more than one touch) of a user. In still further examples, the sensor layer can be configured to operate in a self-capacitance mode exclusively.

The coordination engine 220 performs (or assists with the performance of) the operation of locating and/or estimating the angular position of the stylus 204 on the input surface 218 employing techniques described herein once the tip signal and the ring signal are obtained by the coordination engine 220, and the tip field intersection area and the ring field intersection area are determined. The coordination engine 220 can forward such information to the processing unit 222 for further processing and interpretation once the location of the stylus 204 and the angular position of the stylus 204 are estimated.

In many embodiments, the coordination engine 220 may be used to obtain estimations of the location of the stylus 204 within certain statistical bounds. For example, the coordination engine 220 may be configured to estimate the location of the stylus 204 on the input surface 218 within an error of 100 micrometers. In other embodiments, the coordination engine 220 can be configured to estimate the location of the stylus 204 on the input surface 218 within 50 micrometers. In still further embodiments, the coordination engine 220 can be configured to estimate the location of the stylus 204 within 10 micrometers or less.

One may appreciate that the accuracy and/or precision of the operation of locating the stylus 204 by the coordination engine 220 may differ from embodiment to embodiment. In some cases, the accuracy and/or precision of the operation may be substantially fixed, whereas in other cases, the accuracy and/or precision of the operation may be variable depending upon, among other variables: a user setting, a user preference, a speed of the stylus; an acceleration of the stylus; a setting of a program operating on the electronic device; a setting of the electronic device; an operational mode of the electronic device; a power state of the electronic device; a power state of the stylus; and so on.

The coordination engine 220 may also be configured to obtain estimations of the angular position of the stylus 204 within certain statistical bounds. For example, the coordination engine 220 may be configured to estimate the angular position of the stylus 204 relative to the plane of the input surface 218 within an error of 0.2 radians (e.g., approximately 11.5 degrees). In other embodiments, the coordination engine 220 can be configured to estimate the angular position of the stylus 204 on the input surface 218 within 0.1 radians (e.g., approximately 5 degrees). In still further embodiments, the coordination engine 220 can be configured to estimate the angular position of the stylus 204 within 0.05 radians (e.g., approximately 3 degrees).

The accuracy and/or precision of the operation of estimating the angular position of the stylus 204 by the coordination engine 220 may differ from embodiment to embodiment. In some cases, the accuracy and/or precision of the operation may be substantially fixed, whereas in other cases, the accuracy and/or precision of the operation may be variable depending upon, among other variables: a user setting, a user preference, a speed of the stylus; an acceleration of the stylus; a setting of a program operating on the electronic device; a setting of the electronic device; an operational mode of the electronic device; a power state of the electronic device; a power state of the stylus; and so on.

As noted above, the tip signal and/or the ring signal can include certain information and/or data that may be configured to identify the stylus 204 to the electronic device 202. Such information is generally referred to herein as "stylus identity" information. This information and/or data may be received by the sensor layer and interpreted, decoded, and/or demodulated by the coordination engine 220.

For example, the coordination engine 220 can forward stylus identity information (if detected and/or recoverable) to the processing unit 222. If stylus identity information is not recoverable from the tip signal and/or the ring signal, the coordination engine 220 can optionally indicate to the processing unit 222 that stylus identity information is not available. The electronic device 202 can utilize the stylus identity information (or an absence thereof) in any suitable manner including, but not limited to: accepting or rejecting input from a particular stylus; accepting input from multiple styluses; permitting or denying access to a particular functionality of the electronic device; applying a particular stylus profile; restoring one or more settings of the electronic device; notifying a third party that the stylus is in use; and so on.

The processing unit 222 can use stylus identity information to receive input from more than one stylus at the same time. Particularly, the coordination engine 220 can be configured to convey to the processing unit 222 the location and/or angular position of each of several styluses detected by the coordination engine 220. In other cases, the coordination engine 220 can also convey to the processing unit 222 information related to the relative location and/or relative angular position of the several styluses detected by the coordination engine 220. For example, the coordination engine 220 can inform the processing unit 222 that a first detected stylus is positioned 3 centimeters away from a second detected stylus.

In other cases, and as noted with respect to other embodiments described herein, the tip signal and/or the ring signal can also include certain information and/or data that serve to identify a particular user to the electronic device 202. Such information is generally referred to herein as "user identity" information.

The coordination engine 220 can forward user identity information (if detected and/or recoverable) to the processing unit 222. If user identity information is not recoverable from the tip signal and/or the ring signal, the coordination engine 220 can optionally indicate to the processing unit 222 that user identity information is not available. The processing unit 222 can utilize the user identity information (or an absence thereof) in any suitable manner including, but not limited to: accepting or rejecting input from a particular user; permitting or denying access to a particular functionality of the electronic device; greeting a particular user; applying a particular user profile; restoring settings of the electronic device; locking the electronic device, thereby preventing access to any feature of the electronic device; notifying a third party that the user is identified or not identified; and so on. The processing unit 222 can use user identity information to receive input from more than one user at the same time.

In still further other cases, the tip signal and/or the ring signal can include certain information and/or data that may be configured to identify a setting or preference of the user or the stylus 104 to the electronic device 202. Such information is generally referred to herein as "stylus setting" information.

The coordination engine 220 can forward stylus setting information (if detected and/or recoverable) to the processing unit 222. If stylus setting information is not recoverable from the tip signal and/or the ring signal, the coordination engine 220 can optionally indicate to the processing unit 222 that stylus setting information is not available. The electronic device 202 can utilize the stylus setting information (or an absence thereof) in any suitable manner including, but not limited to: applying a setting to the electronic device; applying a setting to a program operating on the electronic device; changing a line thickness, color, pattern, and so on of a line rendered by a graphics program of the electronic device; changing a setting of a video game operating on the electronic device; and so on.

Thus, generally and broadly, the coordination engine 220 facilitates distinction between many types of input that can all be used, separately or cooperatively, by the electronic device 202 in many different implementation-specific ways. For example, the electronic device 202 can use any of the following as input: location of one or more styluses; polar angle of one or more styluses; azimuthal angle of one or more styluses; angular or planar velocity or acceleration of one or more styluses; gesture paths of one or more styluses; relative location and/or angular position of one or more styluses; touch input provided by a user; multi-touch input provided by a user; gestures paths of touch input; simultaneous touch and stylus input; and so on.

Generally and broadly, the processing unit 222 may be configured to perform, coordinate, and/or manage the functions of the electronic device 202. Such functions can include, but are not limited to: communicating with and/or transacting data with other subsystems of the electronic device 202; communicating with and/or transacting data with the stylus 204; communicating with and/or transacting data over a wireless interface; communicating with and/or transacting data over a wired interface; facilitating power exchange over a wireless (e.g., inductive, resonant, and so on) or wired interface; receiving the location(s) and angular position(s) of one or more styluses; and so on.

In many embodiments, the processing unit 222 can include or can be communicably coupled to circuitry and/or logic components such as a processor and a memory. The circuitry of the processing unit 222 can control or coordinate some or all of the operations of the electronic device by communicating, either directly or indirectly, with substantially all of the subsystems of the electronic device 202. For example, a system bus or signal line or other communication mechanism can facilitate communication between the processing unit 222 and other subsystems of the electronic device 202.

The processing unit 222 can be implemented as any electronic device capable of processing, receiving, or transmitting data or instructions. For example, the processor can be a microprocessor, a central processing unit, an application-specific integrated circuit, a field-programmable gate array, a digital signal processor, an analog circuit, a digital circuit, or combination of such devices. The processor may be a single-thread or multi-thread processor. The processor may be a single-core or multi-core processor.

During use, the processing unit 222 may be configured to access the memory, which has instructions stored therein. The instructions may be configured to cause the processor to perform, coordinate, or monitor one or more of the operations or functions of the electronic device 202.

The instructions stored in the memory may be configured to control or coordinate the operation of other components of the electronic device 202 such as, but not limited to: another processor, an analog or digital circuit, a volatile or non-volatile memory module, a display, a speaker, a microphone, a rotational input device, a button or other physical input device, a biometric authentication sensor and/or system, a force or touch input/output component, a communication module (such as either of the wireless interface and/or the power connector), and/or a haptic or tactile feedback device. For simplicity of illustration and to reduce duplication of elements between figures, many of these (and other) components are omitted from FIG. 2C.

The memory can also store electronic data that can be used by the stylus or the processor. For example, the memory can store electrical data or content such as media files, documents and applications, device settings and preferences, timing and control signals or data for various modules, data structures or databases, files or configurations related to the detection of the tip signal and/or the ring signal, and so on. The memory can be configured as any type of memory. By way of example, the memory can be implemented as random access memory, read-only memory, flash memory, removable memory, or other types of storage elements, or combinations of such devices.

The electronic device 202 also includes a power subsystem 224. The power subsystem 224 can include a battery or other power source. The power subsystem 224 may be configured to provide power to the electronic device 202. The power subsystem 224 can also be coupled to a power connector 228. The power connector 228 can be any suitable connector or port that may be configured to receive power from an external power source and/or configured to provide power to an external load. For example, in some embodiments the power connector 228 can be used to recharge a battery within the power subsystem 224. In another embodiment, the power connector 228 can be used to transfer power stored within (or available to) the power subsystem 224 to the stylus 204.

The electronic device 202 also includes a wireless interface 226 to facilitate electronic communications between the electronic device 202 and the stylus 204. In one embodiment, the electronic device 202 may be configured to communicate with the stylus 204 via a low-energy Bluetooth communication interface or a Near-Field Communication interface. In other examples, the communication interfaces facilitate electronic communications between the electronic device 202 and an external communication network, device or platform.

The wireless interface 226, whether between the electronic device 202 and the stylus 204 or otherwise, can be implemented as one or more wireless interfaces, Bluetooth interfaces, Near Field Communication interfaces, magnetic interfaces, universal serial bus interfaces, inductive interfaces, resonant interfaces, capacitive coupling interfaces, Wi-Fi interfaces, TCP/IP interfaces, network communications interfaces, optical interfaces, acoustic interfaces, or any conventional communication interfaces.

In many embodiments, the wireless interface 226 may be configured to communicate directly with the stylus 204 to obtain information therefrom. In typical embodiments, the wireless interface 226 can obtain data related to the force applied by the stylus 204 to the input surface 218.

The electronic device 202 also includes a display 230. The display 230 can be positioned behind the input surface 218, or can be integrated therewith. The display 230 can be communicably coupled to the processing unit 222. The processing unit 222 can use the display 230 to present information to a user. In many cases, the processing unit 222 uses the display 230 to present an interface with which the user can interact. In many cases, the user manipulates the stylus 204 to interact with the interface.

It will be apparent to one skilled in the art that some of the specific details presented above with respect to the electronic device 202 may not be required in order to practice a particular described embodiment, or an equivalent thereof. Similarly, other electronic devices may include a greater number of subsystems, modules, components, and the like. Some submodules may be implemented as software or firmware when appropriate. Accordingly, it is appreciated that the description presented above is not meant to be exhaustive or to limit the disclosure to the precise forms recited herein. To the contrary, it will be apparent to one of ordinary skill in the art that many modifications and variations are possible in view of the above teachings.

Coordination Between the Stylus and the Electronic Device

As noted above, the user input system 200 depicted in FIG. 2A may be configured to locate the stylus 204 and to estimate the angular position of the stylus 204. These operations are facilitated by cooperation between the coordination engine 206 of the stylus 204 and the coordination engine 220 of the electronic device 202. The generalized interoperation of these two coordination engines is described above; however, to facilitate a more detailed understanding of the coordination engine 206 of the stylus 204, FIG. 2D is provided.

Figure 2D:
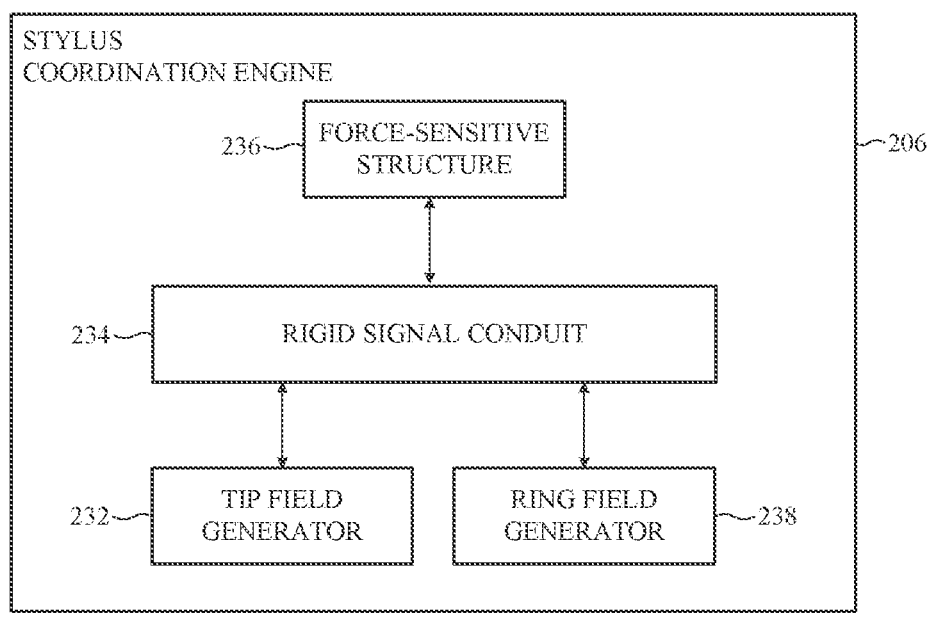
FIG. 2D depicts a simplified block diagram of a coordination engine of the stylus of FIG. 2B.

FIG. 2D depicts an example system diagram of a coordination engine 206 that may be incorporated by a stylus, such as the stylus 204 described with reference to FIGS. 2A-2C. As noted with respect to other embodiments described herein, the coordination engine 206 may be used to generate electric fields (e.g., the tip field and/or the ring field) which allow the electronic device 202 to locate and estimate the angular position of the stylus 204.

Additionally, the coordination engine 206 may be configured to estimate force applied by the stylus 204 to the input surface 218. More specifically, the coordination engine 206 may be configured to generate a tip field (not shown), generate and/or emit the ring field (not shown), and to detect the force applied by the tip of the stylus 204 to the input surface 218. While this is provided as one example, the field generation and force sensing may, in some embodiments, be performed by separate aspects of the stylus 204.

In many embodiments, the coordination engine 206 receives the tip signal from the processing unit 208 (see, e.g., FIG. 2B) and conveys the tip signal to a tip-field generator 232. Similarly, the coordination engine 206 receives the ring signal from the processing unit 208, and conveys the ring signal to a ring-field generator 238. In still further embodiments, additional electric fields can be generated by additional field generators in response to receiving additional field signals.

The tip signal and/or the ring signal can be modulated with other information or data related to the user, the stylus, and/or to the electronic device. For example, the tip signal and/or the ring signal can include stylus identity information, user identity information, stylus setting information, force information, or any other information suitable for a particular embodiment.

The coordination engine 206 includes a tip-field generator 232. The tip-field generator 232 can be formed from any number of suitable electrically conductive materials. The tip-field generator 232 may be connected to a rigid signal conduit 234. The rigid signal conduit 234 can include a rigid portion configured to provide a mechanical coupling between components connected to the rigid signal conduit 234. Additionally, the rigid signal conduit 234 can include a core member through which one or more shielded signal lines pass. Example tip-field generators and rigid signal conduits are described in detail below in reference to FIGS. 3A-6G.

The rigid signal conduit 234 electrically couples the tip-field generator 232 to a processor, circuit, or electrical trace within the coordination engine 206. In this manner, the coordination engine 206 conveys the tip signal to the tip-field generator 232 via the rigid signal conduit 234. Additionally, the rigid signal conduit 234 mechanically couples the tip-field generator 232 to a force-sensitive structure 236, described in detail below.

The shape of the rigid signal conduit 234 can be selected so as to provide electromagnetic shielding to the tip-field generator 232. More particularly, the length of the rigid signal conduit 234 can be selected so as to separate the tip-field generator 232 by a particular minimum distance from other electronic components with the stylus 204. As a result, the tip signal generated by the tip-field generator 232 is affected as little as possible by the operation of the various subsystems of the stylus 204, such as the processing unit 208, the power subsystem 210, the wireless interface 212, and/or the power connector 214, or any other system or subsystem of the stylus 204.

The tip-field generator 232 and the rigid signal conduit 234 can be enclosed entirely within the housing of the stylus 204. In these embodiments, the tip-field generator 232 can be insert-molded within the housing material so that the tip-field generator 232 is positioned as close to the external surface of the stylus 204 as possible. The relative position of the tip-field generator 232 and housing of the stylus 204 are described below in reference to FIGS. 6A-6G.

In many embodiments, the tip-field generator 232 is formed with a rounded shape oriented toward the end of the tip of the stylus 204 that may be configured to engage the input surface 218. As a result of this shape, the tip-field generator 232 may generate an electric field (e.g., the tip field) that is substantially spherical in nature, at least in the direction along which the rounded shape of the tip-field generator 232 is oriented. In other words, the tip-field generator 232 may function, substantially, as an electric field point source; the electric field may approach radial uniformity. The tip field generated by the tip-field generator 232 may be axially symmetric.

In some cases, the center of the tip-field generator 232 may be treated as the origin of the spherical tip field. The input surface 218 may be mathematically modeled as a plane that intersects the spherical tip field. The tip field intersection area, therefore, takes the shape of the intersection of a plane and a sphere, which, regardless of orientation, is a circle. However, although the tip field, the input surface, and the tip field intersection area can be mathematically modeled as a sphere, a plane, and a circle respectively, it may be appreciated that the actual geometric shapes generated in a particular implementation may only approximate a sphere, a plane, and/or a circle.

When the tip field is substantially spherical, the tip field intersection area is a circular area (or section) within the plane of the input surface 218, the center of which may be nearly or precisely equal to the location of the tip-field generator 232. The radius of the circular area may be influenced by the amplitude of the tip signal applied to the tip-field generator 232.

Next, the ring-field generator 238 of the coordination engine 206 is referenced. As with the tip-field generator 232, the ring-field generator 238 may be connected, at least partially, to the rigid signal conduit 234. In many examples, the ring-field generator 238 is formed within or around the rigid signal conduit 234. For example, the ring-field generator 238 can be formed on an external surface of the rigid signal conduit 234.

The ring-field generator 238 is coaxially aligned with the tip-field generator 232 so that the tip field and the ring field are also coaxially aligned. In many cases, the ring-field generator 238 is separated from the tip-field generator 232 by a certain distance. The relative position of the tip-field generator 232 and the ring-field generator 238 are described below in reference to FIGS. 5A-5N.

As with the tip-field generator 232, the rigid signal conduit 234 electrically couples the ring-field generator 238 to a processor, circuit, or electrical trace within the coordination engine 206. In this manner, the coordination engine 206 conveys the ring signal to the ring-field generator 238 via the rigid signal conduit 234. The rigid signal conduit 234 also mechanically couples the ring-field generator 238 to the force-sensitive structure 236.

The ring-field generator 238 may, in some embodiments, be implemented as an electrically-conductive ring disposed around an external surface of the rigid signal conduit 234. The ring-field generator 238 may be separated from the tip-field generator 232 and may have generally greater surface area than the tip-field generator 232, although this is not required of all embodiments. The ring-field generator 238 may be shaped like a ring so as to permit the rigid signal conduit 234 to convey the tip signal to the tip-field generator 232 in a manner that does not impact the axial symmetry of the ring field. In these embodiments, the ring field generated by the ring-field generator 238 may be axially symmetric.

In these embodiments, the rigid signal conduit 234 includes at least one via that defines an electrical connection therethrough. In some cases, the via may be formed prior to forming the ring-field generator. The electrical connection of the rigid signal conduit 234 electrically couples a trace disposed within the rigid signal conduit 234 to the ring-field generator 238. In many cases, the trace is shielded. As a result of the shielding, the rigid signal conduit 234 can convey a shielded ring signal to the ring-field generator 238.

The ring-field generator 238 can be formed from any number of suitable electrically conductive materials. In some examples, the ring-field generator 238 is formed from metal. In other cases, the ring-field generator 238 is formed from a deposited electrically conductive material, such as a metal-oxide or a metal powder. Example ring-field generators are described in detail below with reference to FIGS. 5A-5N.

Because the ring-field generator 238 is separated from the tip of the stylus 204, the angular position of the stylus 204 (rotated from the tip) affects the distance between the input surface 218 and the ring-field generator 238. For example, if the stylus 204 touches the input surface 218 at a very acute angle (e.g., the stylus lying substantially flat on the input surface), the ring-field generator 238 may be a small distance from the input surface. Conversely, if the stylus 204 is normal to the input surface 218 (e.g., ninety degree angle), the ring-field generator 238 is positioned a large distance from the input surface 218. In this manner, the ring-field generator 238 traverses an arc above the input surface 218 when the polar angle of the stylus 204 changes; the apex of the arc occurs when the stylus 204 is normal to the input surface 218.

As may be appreciated, the foregoing generalized description references the coordination engine 206 of the stylus 204 as it relates to the generation of a tip field and a ring field that can be detected by the coordination engine 220 of electronic device 202. As noted above, the coordination engine 220 of the electronic device 202 can be configured to detect the tip field and the ring field and, correspondingly, the tip field intersection area and the ring field intersection area. The electronic device 202 thereafter compares the relative positions of the tip field intersection area and the ring field intersection area in order to estimate the location of the stylus and the angular position of the stylus. In this manner, the coordination engine 206 and the coordination engine 220 cooperate to determine, with high accuracy, the location and angular position of the stylus 204 relative to the plane of the input surface 218 of the electronic device 202.

In many examples, the cooperation of the coordination engines 206, 220 permit the user input system 200 to operate in a more power-efficient manner than conventional stylus input systems that include a separate electromagnetic digitizer that serves a dual purpose of powering the stylus (e.g., inductive power, resonant inductive coupling, and so on) and receiving and interpreting input therefrom. Further, the processing power required of the coordination engine 220 may be less than the processing power required by the conventional stylus input system that includes an electromagnetic digitizer. Thus, the user input system embodiments described herein can operate with reduced latency over conventional stylus input systems.

The coordination engine 206 can also estimate a magnitude of force applied by the tip of the stylus 204 to the input surface 218. One example method of detecting a magnitude of force applied by the stylus 204 to the input surface 218 is described below; however, it may be appreciated that this is merely one example and that other embodiments can detect the force applied by the stylus 204 in another implementation-specific and suitable manner.

As noted above with respect to other embodiments, the tip of the stylus 204 can be movable with respect to the body of the stylus 204, generally along the longitudinal axis (e.g., the longitudinal axis 120 as shown in FIG. 1A). More particularly, the tip-field generator 232, the ring-field generator 238, and/or the rigid signal conduit 234 may be configured to at least partially shift, translate, withdraw, or otherwise change position along an axial direction with respect to the housing of the stylus 204 in response to a force applied by the tip of the stylus 204 to the input surface 218.

The rigid signal conduit 234 can couple the tip of the stylus 204 to the force-sensitive structure 236 of the coordination engine 206. In this manner, when the tip of the stylus 204 touches the input surface 218 (or any other surface), and applies a force, the tip of the stylus 204 experiences a reaction force which, in turn, is transferred via the rigid signal conduit 234 to the force-sensitive structure 236.

In these embodiments, the force-sensitive structure 236 also includes a sensor that exhibits an electrically-measurable property that changes as a function of the magnitude of force applied to the force-sensitive structure. In one example, the sensor is sensitive to strain and may be coupled to the rear cantilevered leg of the force-sensitive structure 236. In this manner the strain sensor is physically separated from both of the tip-field generator 232 and the ring-field generator 238 by a distance that reduces any parasitic coupling, electromagnetic interference, or any other interference between the strain sensor and the tip-field generator 232 and the ring-field generator 238.

In one embodiment, the strain sensor operates as a resistive sensor formed from a material that exhibits a change in electrical resistance (e.g., conductance) in response to a dimensional change such as compression, tension, or force. The strain sensor can be a compliant material that exhibits at least one electrical property that is variable in response to deformation, deflection, or shearing of the electrode. The strain sensor may be formed from a piezoelectric, piezoresistive, resistive, or other strain-sensitive materials.

The force-sensitive structure 236 is configured to deflect relative to the frame of the body of the stylus in response to a force applied by the tip of the stylus. As a result of the deflection, the electrically-measurable property of the sensor can change. Thus, by measuring the electrical property of the sensor, a force estimate can be obtained by the coordination engine 206. The force estimate may be an estimation of the magnitude of the reaction force acting on the stylus 204. Once a force estimate is obtained, the coordination engine 206 communicates the force estimate to the electronic device 202 as a vector or scalar quantity using any suitable encoded or not-encoded format.

Main Controller Subsystem of the Stylus

As noted above, the user input system 200 depicted in FIG. 2A may be configured to locate the stylus 204 and to estimate the angular position of the stylus 204 based on the cooperation between the coordination engines 206, 220. In many embodiments, other information can be exchanged between the electronic device 202 and the stylus 204, such as, but not limited to: applied force magnitude; battery capacity of the stylus 204; stylus setting information; user identity information; stylus identity information; and so on.

As noted above, such information can be conveyed from the stylus 204 to the electronic device 202 by modulating said information as a digital or analog data signal over either or both the tip signal and the ring signal. In other cases, however, a separate communication technique can be used. In many examples, these additional operations and functions of the stylus are performed, monitored, and/or coordinated by a processing unit and a wireless interface, such as the processing unit 208 and the wireless interface 212 as of the stylus 204 as shown in FIG. 2B.

Figure 2E:
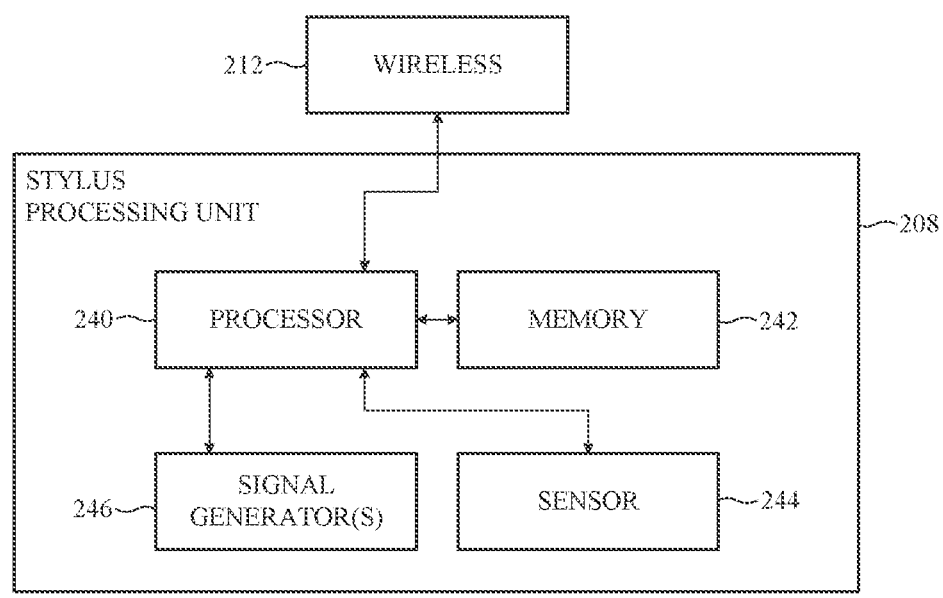
FIG. 2E depicts a simplified block diagram of a processing unit and a wireless interface of the stylus of FIG. 2B.

Next reference is made to FIG. 2E, in which a simplified system diagram of the processing unit 208 and the wireless interface 212 of the stylus 204 of FIG. 2B is shown. The processing unit 208 may be configured to facilitate communication between the coordination engine 206, the power subsystem 210, the wireless interface 212, and/or the power connector 214 (as shown in FIGS. 2A-2B). These operations and purposes of the processing unit 208 are merely examples; different embodiments may task the processing unit 208 differently.

The processing unit 208 can include a processor 240, a memory 242, a sensor 244, and a signal generator 246. The processor 240 can control or coordinate some or all of the operations of the processing unit 208 by communicating, either directly or indirectly, with substantially all of the components of the processing unit 208 and/or other subsystems of the stylus 204. For example, a system bus or signal line or other communication mechanism can facilitate communication between the processor 240 and various components of the processing unit 208 or, more generally, other subsystems of the stylus 204.

The processor 240 can be implemented as any electronic device capable of processing, receiving, or transmitting data or instructions. The processor 240 may be configured to access the memory 242, which has instructions stored therein. The instructions may be configured to cause the processor 240 to perform, coordinate, or monitor one or more of the operations or functions of the processing unit 208 and/or the stylus 204.

In many embodiments, one or more components of the processor 240 can include or can be communicably coupled to circuitry and/or logic components, such analog circuitry, digital circuitry, and the memory 242. The circuitry can facilitate some or all of the operations of the processor 240 including, but not limited to: communicating with and/or transacting data with other subsystems of the stylus 204; generating parameters used to generate the tip signal and the ring signal; conveying the tip signal and the ring signal to the coordination engine 206; measuring and/or obtaining the output of one or more analog or digital sensors, such as a strain sensor or accelerometer; and so on.

In some cases, the processor 240 and the memory 242 are implemented in the same integrated circuit (which may be a surface-mounted integrated circuit), although this is not required of all embodiments.

The instructions stored in the memory 242 may be configured to control or coordinate the operation of a separate processor, an analog or digital circuit, a volatile or nonvolatile memory module, a display, a speaker, a microphone, a rotational input device, a button or other physical input device, a biometric authentication sensor and/or system, a force or touch input/output component, a communication module (such as the wireless interface 212), and/or a haptic or tactile feedback device. For simplicity of illustration and to reduce duplication of elements between figures, many of these (and other) components are omitted from one or more of the simplified system diagrams depicted in FIGS. 2A-2B and 2E. It may be understood that many of these elements and components may be included either entirely or partially within the housing of the stylus 204 and may be integrated in an appropriate and implementation-specific manner into many embodiments described herein.

The memory 242 can also store electronic data that can be used by the stylus 204 or the processor 240. For example, the memory 242 can store electrical data or content such as, but not limited to: media files; documents and applications; device settings and preferences; timing and control signals or data for various modules or subsystems of the stylus 204; data structures or databases, files, parameters, or configurations related to the tip signal and/or the ring signal; and so on.

The memory 242 can be configured as any type of memory. By way of example, the memory 242 can be implemented as random access memory, read-only memory, flash memory, removable memory, or other types of storage elements, or combinations of such devices.

The processor 240 may be configured to obtain data from one or more sensors, collectively labeled as the sensor 244. The sensor 244 can be positioned substantially anywhere on the processing unit 208 or, more generally, anywhere within the housing of the stylus 204. For example, one sensor of the sensor 244 may be the sensor coupled to the force-sensitive structure 236 (see, e.g., FIG. 2D).

In some embodiments, the sensor 244 is configured to detect environmental conditions and/or other aspects of the operating environment of the stylus 204. For example, an environmental sensor may be an ambient light sensor, proximity sensor, temperature sensor, barometric pressure sensor, moisture sensor, and the like. In other cases, the sensors may be used to compute an ambient temperature, air pressure, and/or water ingress into the stylus 204. Such data may be used by the processor 240 to adjust or update the operation of the stylus 204 and/or may communicate such data to the electronic device 202 to adjust or update the operation thereof.

In still further embodiments, the sensor 244 is configured to detect motion characteristics of the stylus 204. For example, a motion sensor may include an accelerometer, a gyroscope, a global positioning sensor, a tilt sensor, and so on for detecting movement and acceleration of the stylus 204. Such data may be used to adjust or update the operation of the stylus 204 and/or may communicate such data to the electronic device 202 to adjust or update the operation thereof.

In still further embodiments, the sensor 244 is configured to biological characteristics of the user manipulating the stylus 204. An example biosensor can detect various health metrics, including skin temperature, heart rate, respiration rate, blood oxygenation level, blood volume estimates, blood pressure, or a combination thereof. The processor 240 can use such data to adjust or update the operation of the stylus 204 and/or may communicate such data to the electronic device 202 to adjust or update the operation thereof.

The stylus 204 may also include one or more utility sensors that may be used to estimate, quantify, or estimate a property of an object nearby or otherwise external to the stylus 204. Example utility sensors include magnetic field sensors, electric field sensors, color meters, acoustic impedance sensors, pH level sensor, material detection sensor, and so on. The processor 240 can use such data to adjust or update the operation of the stylus 204 and/or may communicate such data to the electronic device 202 to adjust or update the operation thereof.

In many cases, the processor 240 can sample (or receive samples of) external data, motion data, power data, environmental data, utility data, and/or other data, and track the progress thereof over a defined or undefined period of time. The cumulative tracked data, the rate of change of the tracked data, the average of the tracked data, the maximum of the tracked data, the minimum of the tracked data, the standard deviation of the tracked data, and so on, can all be used to adjust or update the operation of the stylus 204 and/or may communicate such data to the electronic device 202 to adjust or update the operation thereof.

The wireless interface 212 can be communicably coupled to the processor 240 and may include one or more wireless interface(s) that are adapted to facilitate communication between the processor 240 and a separate electronic device, such as the electronic device 202. In general, the wireless interface 212 may be configured to transmit and receive data and/or signals that may be interpreted by instructions executed by the processor 240.

The wireless interface 212 can include radio frequency interfaces, microwave frequency interfaces, cellular interfaces, fiber optic interfaces, acoustic interfaces, Bluetooth interfaces, infrared interfaces, magnetic interfaces, electric field interfaces, Universal Serial Bus interfaces, Wi-Fi interfaces, Near-Field Communication interfaces, TCP/IP interfaces, network communications interfaces, or any other wireless communication interfaces. In many embodiments, the wireless interface 212 may be a low-power communication module, such as a low-power Bluetooth interface. The wireless interface 212 may be a two-way communication interface or a one-way communication interface.

In one embodiment, the processor 240 utilizes the wireless interface 212 to convey information about the stylus 204 to the electronic device 202, substantially in real-time. For example, such information can be, but is not limited to: real-time, or substantially real-time, force estimations made by the coordination engine 206 and/or the processor 240 as a result of measuring the sensor of the force-sensitive structure 236; real-time, or substantially real-time, angular position estimations made by the processor 240 after obtaining data from an accelerometer or gyroscope within the stylus 204; and so on.

The processor 240 can also be in communication with a signal generator 246. The signal generator 246 may be configured to generate the tip signal and the ring signal, conveyed by the coordination engine 206 to the tip-field generator 232 and the ring-field generator 238 respectively (see, e.g., FIGS. 2B and 2D). In other examples, the signal generator 246 generates, stores, accesses, or modifies tip and/or ring signal parameters that are conveyed to the coordination engine 206. The coordination engine 206 can receive these parameters and, in response, can generate a corresponding tip signal and ring signal.

In some examples, the signal generator 246 can include stylus or user identifying information within either or both of the tip signal and/or the ring signal. For example, the signal generator 246 can include information that identifies a particular stylus to a particular electronic device. In these embodiments, more than one stylus (each having a different identity) can be used with the same electronic device 202. In some cases, multiple styluses can be associated with different functions and/or operations of the electronic device 202. In one example, a series of individually-identifiable styluses can be used to perform separate tasks within a graphical illustration program operating on the electronic device.

In other examples, the signal generator 246 can include authentication information within either or both of the tip signal and/or the ring signal. In these cases, a particular user of a particular stylus can be identified to an electronic device. For example, a stylus may include one or more bioauthentication sensors, such as fingerprint sensors, useful to establish the identity of a user manipulating the stylus. In this embodiment, the signal generator 246 can encode authentication information (e.g., public keys, security certificates, and so on) into either or both the tip signal or the ring signal. Thereafter, the electronic device can decode and/or demodulate the received tip signal and/or ring signal in order to obtain the authentication information provided. The electronic device may, thereafter, estimate whether the obtained authentication information is associated with a user identity known or knowable to the electronic device. A known user may be granted authority to operate certain features of the electronic device or to access certain information available to or accessible by the electronic device.

Power Subsystem of the Stylus

Figure 2F:
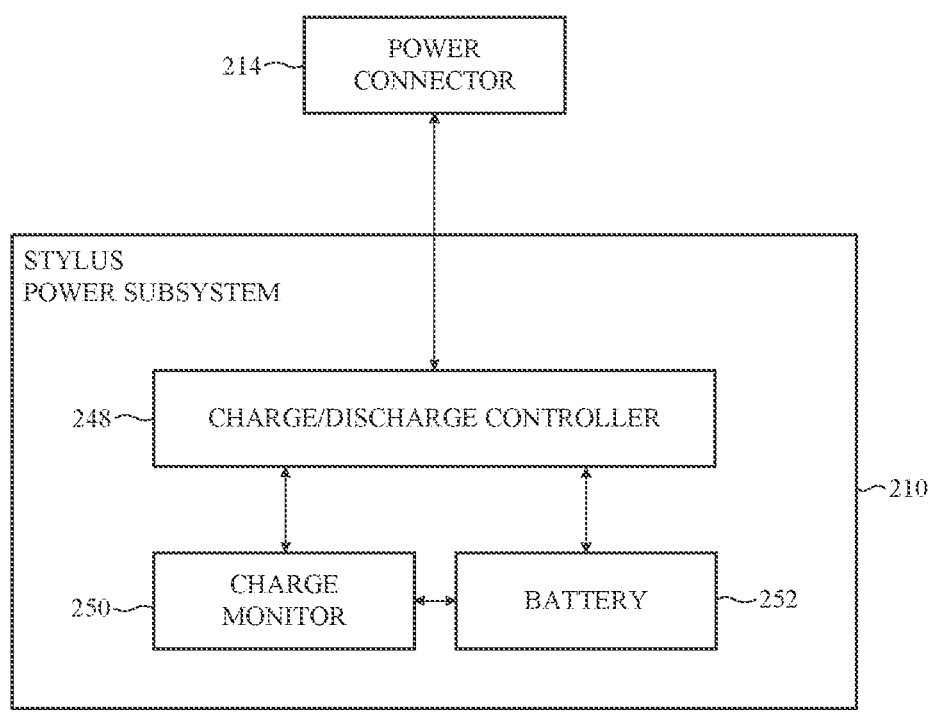
FIG. 2F depicts a simplified block diagram of a power subsystem of the stylus of FIG. 2B.

As noted above, the user input system 200 depicted in FIG. 2A may be configured to locate the stylus 204, estimate the angular position of the stylus 204, and to facilitate direct communication between the electronic device 202 and the stylus 204. Next, reference is made to the power subsystem 210 of the stylus 204, as depicted in FIG. 2F.

Generally and broadly, the power subsystem 210 of the stylus 204 may be configured to store and provide power to various components and other subsystems of the stylus 204. The power subsystem 210 generally includes a charge/discharge controller 248, a charge monitor 250, and a battery 252.

The charge monitor 250 may be configured to estimate the capacity of the battery 252 at a particular time. The charge/discharge controller 248 may be implemented as a processor and power regulator that may be configured to control the voltage and/or current supplied to the battery 252 when in a charging mode and, separately, to control the voltage and/or current supplied by the battery 252 when in a discharging mode.

The charge/discharge controller 248 is also coupled to the power connector 214. When the power connector 214 is coupled to a power source (e.g., a powered data port, such as the data port 114 of the electronic device 102 shown in FIG. 1A), the charge/discharge controller 248 can convey power received therefrom to the battery 252 in order to replenish the charge of the battery 252.

In one embodiment, the charge/discharge controller 248 may be configured to permit rapid charging of the battery 252 without causing damage to the battery 252. In some cases, the charge/discharge controller 248 may be configured to slow the charging rate once the battery 252 has been recharged beyond a selected threshold capacity. For example, the charge/discharge controller 248 may be configured to operate in a fast charging mode (e.g., high constant current) until the capacity of the battery 252 is estimated to be greater than eighty percent. Thereafter the charge/discharge controller 248 may slow the charging rate to a rate selected so as to prevent permanent damage to the battery 252.

The battery 252 may be a lithium-polymer battery or a lithium ion battery. However, in other embodiments, alkaline batteries, nickel-cadmium batteries, nickel-metal hydride batteries, or any other suitable rechargeable or one-time-use batteries may be used.

For embodiments in which the battery 252 is a lithium-polymer battery, the battery 252 may include stacked layers that may form the components of the battery 252 (e.g., anode, cathode). In many embodiments, the battery 252 may be rolled prior to being sealed in a pouch. In this manner, the battery 252 may have little or no unused space when positioned within the body of the stylus 204.

The battery 252 includes a cathode, an electrolyte, a separator, and an anode. The cathode (or positive electrode) may be a layered oxide, such as lithium cobalt oxide ($LiCoO_2$), a polyanion, such as lithium iron phosphate, or a spinel, such as lithium manganese oxide. The cathode may include a solution having an active material (e.g., $LiCoO_2$), a conductive additive (e.g., carbon black, acetylene black, carbon fibers, graphite, etc.), a binder (such as polyvinyledene fluoride, ethylene-propylene, and a diene), and optionally a solvent. The binder can act to hold the active material and the conductive additive together, and in instances where the binder is non-water soluble the solvent (such as N-methypyrrolidone), acts to distribute the active material and conductive additive throughout the binder. It should be noted that the above examples of the cathode solution are meant as illustrative only and many other conventional cathode materials may be used to form the cathode.

The anode (or negative electrode) is generally the source of ions and electrons for the battery 252. The anode may include an anode solution including an active material (e.g., lithium, graphite, hard carbon, silicon, or tin), a conductive additive (e.g., carbon black, acetylene black, or carbon fibers), a binder (such as polyvinyledene fluoride, ethylene-propylene, and a diene), and optionally a solvent.

The separator may be positioned between the cathode and the anode. The separator may be a fiberglass cloth or flexible plastic film (e.g., nylon, polyethylene, or polypropylene). The separator separates the anode and cathode while allowing the charged lithium ions to pass between the anode and cathode.

The electrolyte may be a mixture of organic carbonates such as ethylene carbonate or diethyl carbonate containing complexes of lithium ions. These non-aqueous electrolytes generally use non-coordinating anion salts such as lithium hexafluorophosphate ($LiPF_6$), lithium hexafluoroarsenate monohydrate ($LiAsF_6$), lithium perchlorate ($LiClO_4$), lithium tetrafluoroborate ($LiBF_4$), and lithium triflate ($LiCF_3SO_3$). The electrolyte may be filled into the anode and/or cathode around the anode and cathode solutions. In some embodiments, the electrolyte may be saturated into the separator, such that as the separator is added to the core, the electrolyte may be added as well.

In some embodiments, the battery 252 may include one or more other components, such as flow barriers and/or encapsulation walls operably connected to either or both the cathode electrode collector and the anode electrode collector, among other components. The particular configuration of the battery 252 described above is merely a simplified example, and the number and order of the individual components may vary.

As with the specific embodiments depicted in FIGS. 1A-1D, the foregoing description of the embodiments depicted in FIGS. 2A-2F, and various alternatives and variations, are presented, generally, for purposes of explanation, and to facilitate a thorough understanding of general operation and function of an input system such as described herein.

However, it will be apparent to one skilled in the art that some of the specific details presented herein may not be required in order to practice a particular described embodiment, or an equivalent thereof. Thus, the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings. Particularly, it may be understood that the operational characteristics of the user input system depicted in FIGS. 2A-2F, including the operation of the electronic device and the operation of the stylus, can be implemented in a number of suitable and implementation-specific ways.

Component Layout of the Stylus

As noted with respect to many embodiments described herein, a stylus configured to generate a tip field and a ring field (which may be detected by a coordination engine of an electronic device) may be constructed in a manner that serves to reduce or eliminate parasitic coupling, electromagnetic interference, or any other interference that may negatively affect the tip field and/or ring field. Generally and broadly, embodiments described herein physically separate electronic components and circuits within a stylus from the tip-field generator and ring-field generator. Additionally, certain structural components within the stylus are configured to serve as electromagnetic shields benefiting the tip-field generator, the ring-field generator, and/or signal lines associated therewith. One such example stylus is described below with reference to FIG. 3A; however, it may be appreciated that the shielding techniques and generalized layout presented therein and described below are merely one example and that other embodiments can be implemented in different ways.

Figure 3A:
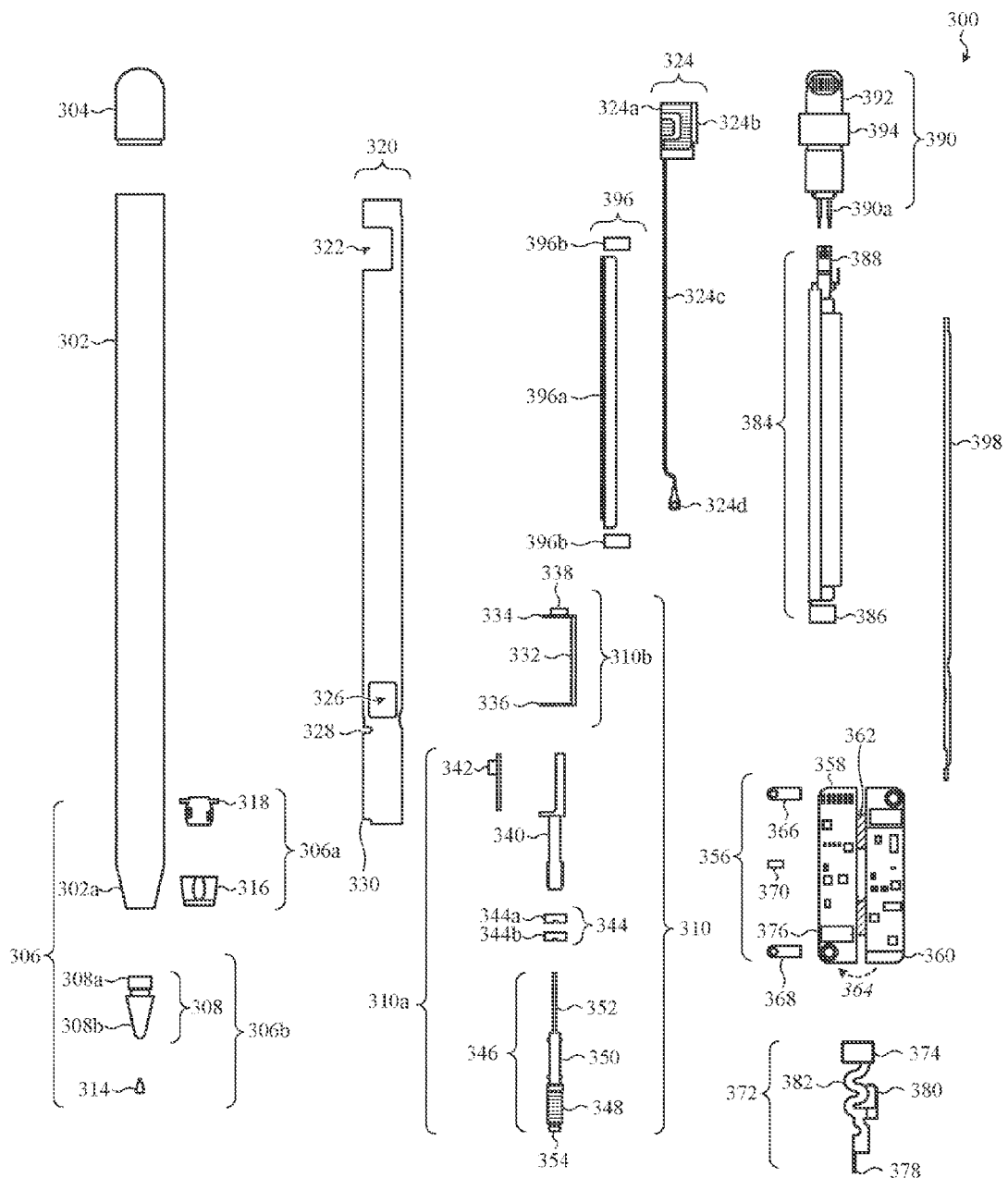
FIG. 3A depicts an exploded view of various components and subsystems of a stylus such as described herein (e.g., the stylus of the user input system depicted in FIGS. 1A-1D, a stylus having the subsystems depicted in FIGS. 2D-2F, and so on).

FIG. 3A depicts various components of a stylus 300 in an exploded view. To facilitate an understanding of the interoperation and assembly of the various components of the stylus 300, FIGS. 3D-3G are provided, showing the fully-assembled stylus 300 (e.g., FIG. 3D), a detailed view of an assembled tip end of the stylus 300 (e.g., FIG. 3E), a detailed view of an assembled middle portion of the stylus 300 (e.g., FIG. 3F), and a detailed view of an assembled blind cap end of the stylus 300 (e.g., FIG. 3G). For simplicity of illustration, some portions of the embodiments depicted in FIGS. 3D-3G are provided in phantom or are illustrated to be semi-transparent.

The stylus 300 of the illustrated embodiment includes a barrel 302. The barrel 302 is hollow. The barrel 302 may take various forms to facilitate convenient, familiar, and comfortable manipulation or the stylus 300 by a user. In the illustrated example, the barrel 302 has the general form of a writing instrument, such as a pen or a pencil. The barrel 302 is generally cylindrical with a constant diameter. The barrel 302 can be formed from plastics, metals, ceramics, laminates, glass, sapphire, wood, leather, synthetic materials, or any other material or combination of materials.

The barrel 302 can be configured to connect to a blind cap 304 at an end of the barrel 302. The blind cap 304 may be configured to provide a cosmetic end to the barrel 302 of the stylus 300. The blind cap 304 forms a substantially continuous external surface with the barrel 302 when attached to the barrel 302.

In some cases, the blind cap 304 includes a clip (not shown) for attaching the stylus 300 to a user's pocket, or any other suitable storage location. The blind cap 304 can include a through-hole configured to couple to a lanyard or tether. The lanyard or tether may also be configured to couple to an electronic device.

The blind cap 304 may be formed from any suitable material, such as, but not limited to, metal, plastic, glass, ceramic, sapphire, and the like or combinations thereof. In many cases, the blind cap 304 is formed from the same material as the barrel 302, although this is not required. In some embodiments, the blind cap 304 may be configured, entirely or partially, as a signal diffuser to diffuse an infrared signal or another optical signal, such as a multi-color light-emitting diode. In other cases, the blind cap 304 may be configured, entirely or partially, as an antenna window, allowing for wireless communications and/or electric fields to pass therethrough.

As illustrated, the blind cap 304 terminates in a rounded end, although this is not required of all embodiments. In some embodiments, the blind cap 304 terminates as a plane. In other embodiments, the blind cap 304 terminates in an arbitrary shape.

The blind cap 304 can exhibit a constant or a variable diameter cross-section. In many embodiments, such as illustrated, the cross-section view of the blind cap 304 matches that of the barrel 302 where the barrel 302 and the blind cap 304 interface.

The blind cap 304 can be configured to be removably attached to the barrel 302. In one embodiment, the blind cap 304 is threaded such that the blind cap 304 screws into corresponding threads within the barrel 302. In other cases, the blind cap 304 includes one or more detents and/or recesses that are configured to align with one or more corresponding recesses and/or detents within the barrel 302 and/or the connector that the blind cap 304 may conceal. In other cases, the blind cap 304 is interference-fit to the barrel 302. In still further cases, the blind cap 304 is magnetically attracted to a portion of the barrel 302.

In the illustrated embodiment, the barrel 302 tapers at one end. The tapered end of the barrel 302 is identified in the figure as the tapered tip 302a. The tapered tip 302a of the barrel 302, which is opposite the end of the barrel 302, may be configured to connect to the blind cap 304 to partially enclose and support a point assembly 306 (see, e.g., FIGS. 3D-3E).

As illustrated, the tapered tip 302a may be formed integrally with the barrel 302. In other embodiments, the tapered tip 302a is a separate piece from the barrel 302. For example, the tapered tip 302a can be adhered to the barrel 302, sonic-welded to the barrel 302, snap-fit to the barrel 302, friction fit to the barrel 302, or connected to the barrel 302 in any other suitable manner.

The point assembly 306 is partially disposed within the tapered tip 302a. Other portions of the point assembly 306 are attached, either permanently or removably, to the end of the tapered tip 302a from the exterior thereof. The point assembly 306 is itself configured to enclose, retain, and/or support various electronic components associated with a tip-field generator, a ring-field generator, and a strain-responsive element of the stylus 300, all of which are referenced and described in detail below.

The point assembly 306 can include a grounded portion 306a and a movable portion 306b. The movable portion 306b of the point assembly 306 may be movable with respect to the barrel 302. The grounded portion 306a of the point assembly 306 may be fixed with respect to the barrel 302, or a chassis thereof.

The movable portion 306b of the point assembly 306 includes a nosepiece 308. The nosepiece 308 generally takes a conical shape, however such a shape is not required of all embodiments. The nosepiece 308 includes a collar 308a and a nib 308b.

In many cases, the nosepiece 308 can be replaceable and/or removable by a user. For example, different nosepieces can take different shapes. A user may prefer, in some examples, to swap the nosepiece 308 for a nosepiece having a specific shape. Example nosepiece shapes include, but are not limited to: point shapes of different size; chisel shapes; flat shapes; fountain pen tip shapes; and so on.

The nosepiece 308 can be formed of a single material. In other cases, the collar 308a is formed from a first material and the nib 308b is formed from a second material. The nosepiece 308 can be manufactured by a two-shot molding process, a co-molding process, an overmolding process, an insert molding process, or any other suitable process.

The collar 308a may be configured to removably or permanently engage with a portion of a coordination engine 310 (described in detail below) disposed within the barrel 302. The coordination engine 310 includes a rigid signal conduit 310a and a force-sensitive structure 310b. The rigid signal conduit 310a is configured to electrically and mechanically couple the movable portion 306b of the point assembly 306 to the force-sensitive structure 310b (see, e.g., FIGS. 3D-3E).

More specifically, the collar 308a can include a threaded portion that may be configured to engage with corresponding threads of the rigid signal conduit 310a. In this embodiment, the collar 308a may tightly abut a boss attached to the rigid signal conduit 310a so that torques experienced by the nosepiece 308 during manipulation of the stylus 300 by the user does not cause the collar 308a to rotate and/or disengage from the rigid signal conduit 310a.

In other embodiments, the collar 308a may be configured to engage the rigid signal conduit 310a in a different manner, such as with a snap-fit or a friction fit. In still further examples, the collar 308a can be permanently attached to the rigid signal conduit 310a, for example using an adhesive or by welding.

Once the collar 308a is attached to the rigid signal conduit 310a, the nosepiece 308 may be movable with respect to the barrel 302. More specifically, the nosepiece 308 may be permitted to withdraw by a certain distance into the barrel 302 in response to a reaction force such as described above.

Figure 3B:
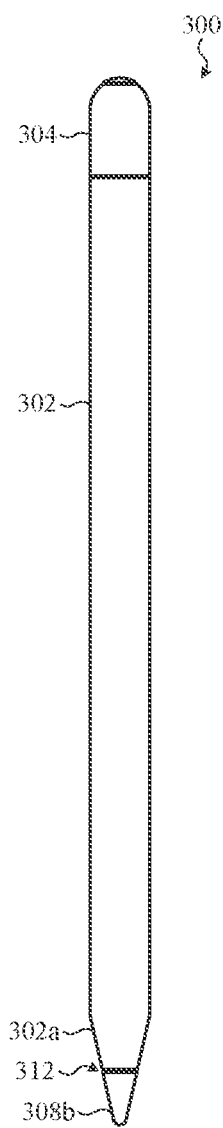
FIG. 3B depicts the stylus of FIG. 3A, assembled, specifically showing the stylus in a ready state in which a clearance gap separates a tip and a body of the stylus in the absence of a reaction force acting on the tip.

In some implementations, when assembled into the barrel 302, the nosepiece 308 is separated from the tapered tip 302a by a clearance gap 312, such as shown in FIG. 3B. Herein, this state of the stylus 300 is generally referred to as a "ready" state.

In the ready state, the clearance gap 312 can have any suitable width; however, for typical embodiments, the clearance gap 312 may be less than 1 millimeter when in a neutral position (e.g., when the stylus 300 is not applying a force to any surface and no reaction force is acting to close the clearance gap 312). In other embodiments, the clearance gap 312 may be less than 0.1 millimeters when in a neutral position. In other embodiments, the clearance gap 312 has a different width. In some examples, the width of the clearance gap 312 is configurable by rotating the nosepiece 308. In one embodiment, the user rotates the nosepiece 308, causing the collar 308a to advance along the threads of the rigid signal conduit 310a, toward the barrel 302, thereby reducing the clearance gap 312. In another embodiment, the user is able to rotate the nosepiece 308, causing the collar 308a to retreat from the threads of the rigid signal conduit 310a, away from the barrel 302, thereby increasing the clearance gap 312.

Figure 3C:
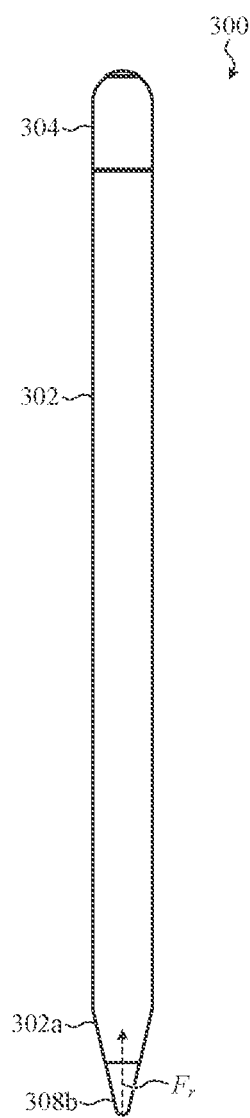
FIG. 3C depicts the stylus of FIG. 3B, specifically showing the stylus in an input state in which the clearance gap is partially or entirely closed as a result of a reaction force acting on the tip when the stylus is pressed against a surface, such as the display of the electronic device depicted in FIGS. 1A-1C.

In some examples, the width of the clearance gap 312 in the ready state can be selected, at least in part, to reduce the peak mechanical load experienced by the coordination engine or, more generally, electrical or mechanical components disposed within the barrel 302. More specifically, the clearance gap 312 may be configured to be fully closed after the nosepiece 308 receives a reaction force $F_r$ beyond a certain threshold (e.g., 1 kilogram in one embodiment, 0.5 kilograms in another embodiment), such as shown in FIG. 3C. Once the clearance gap 312 is fully closed, the nib 308b directly contacts the tapered tip 302a, thereby preventing components within the barrel 302, such as the coordination engine, from experiencing a reaction force greater than a threshold magnitude. As described below with respect to FIG. 7, one or more adjustable internal components may be used to limit the travel of the nosepiece 308 and/or the force transmitted to internal components, such as, but not limited to, a force-sensitive structure.

In some embodiments, the clearance gap 312 can be filled with a compliant material, such as an elastomer or a polymer. In other examples, a deformable or compressible material can cosmetically bridge the clearance gap 312, connecting the nosepiece 308 to the tapered tip 302a of the barrel 302.

Returning to FIG. 3A, the nib 308b of the nosepiece 308 of the point assembly 306 may be configured to contact an input surface of an electronic device. The nib 308b may taper to a point, similar to a pen, so that the user may control the stylus 300 with precision in a familiar form factor. In some examples, the nib 308b may be blunt or rounded, as opposed to pointed, or may take the form of a rotatable or fixed ball.

In many embodiments, the nib 308b is formed from a softer material than the input surface of the electronic device (such as the electronic device 102 depicted in FIG. 1A). For example, the nib 308b can be formed from (or may have an external surface or coating formed from) a silicone, a rubber, a fluoroelastomer, a plastic, a nylon, or any other suitable material or combination of materials. In this manner, drawing of the nib 308b across the input surface may not cause damage to the input surface or layers applied to the input surface such as, but not limited to, anti-reflective coatings, oleophobic coatings, hydrophobic coatings, cosmetic coatings, ink layers, and the like.

The nib 308b can be formed from a material doped with an agent configured to provide the nib 308b with a selected color, hardness, elasticity, stiffness, reflectivity, refractive pattern, texture and so on. In other examples, the doping agent can confer other properties to the nib 308b including, but not necessarily limited to, electrical conductivity and/or insulating properties, magnetic and/or diamagnetic properties, chemical resistance and/or reactivity properties, infrared and/or ultraviolet light absorption and/or reflectivity properties, visible light absorption and/or reflectivity properties, antimicrobial and/or antiviral properties, oleophobic and/or hydrophobic properties, thermal absorption properties, pest repellant properties, colorfast and/or anti-fade properties, antistatic properties, liquid exposure reactivity properties, and so on. In many cases, the nib 308b is formed from the same material as the barrel 302, although this is not required.

Figure 3D:
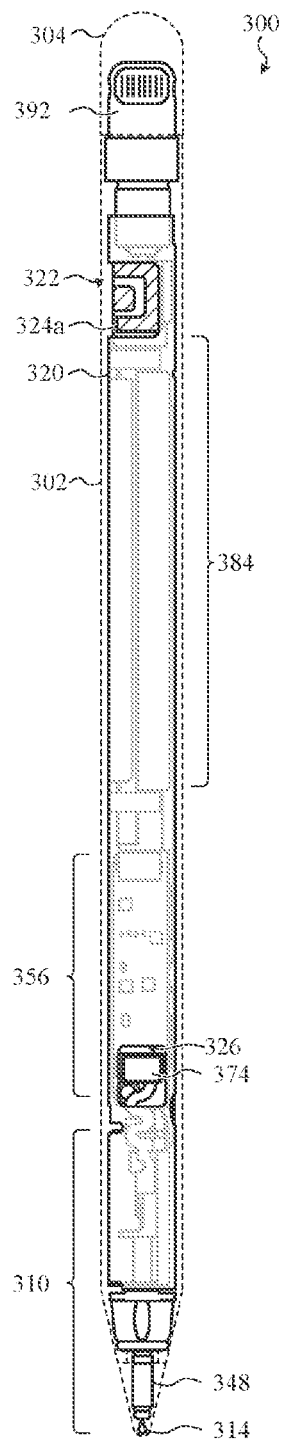
FIG. 3D depicts the stylus of FIG. 3A assembled, presenting a barrel, a nib, and a blind cap of the stylus in phantom, while depicting an internal chassis of the stylus as partially transparent.
Figure 3E:
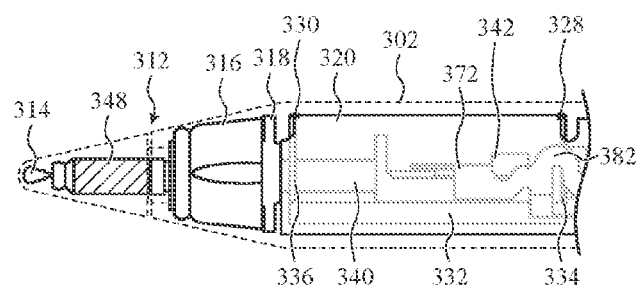
FIG. 3E depicts a detailed view of a tip end of the assembled stylus of FIG. 3D.
Figure 3F:
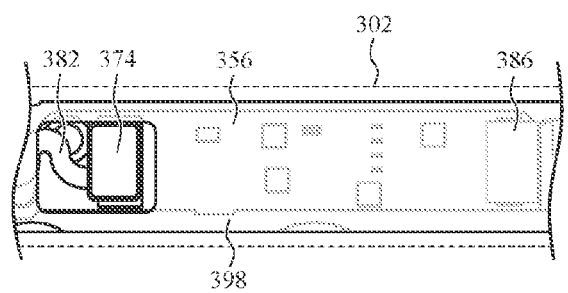
FIG. 3F depicts a detailed view of a barrel section of the assembled stylus of FIG. 3D.

A tip-field generator 314 is disposed within a tip end of the nib 308b (see, e.g., FIGS. 3D-3E). In many embodiments, the tip-field generator 314 is insert molded into the nib 308b, although this may not be required of all embodiments. The tip-field generator 314 may be disposed as near to the external surface of the nib 308b as possible.

As noted above, the point assembly 306 also includes several components that may be disposed within and fixed with respect to the barrel 302. In typical embodiments, the point assembly 306 includes a support collar 316 and a flanged nut 318. In some embodiments, such components can be formed as integral components.

In many embodiments, the flanged nut 318 can be welded, soldered, or otherwise permanently adhered to a chassis 320. The chassis 320 can take the shape of a sleeve that inserts within the barrel 302. The chassis 320 can be fixed with respect to an interior surface of the barrel 302 (see, e.g., FIGS. 3D-3G; the chassis 320 is depicted as semi-transparent). The support collar 316 can be connected to the flanged nut 318. In some examples, the support collar 316 abuts a lip or ring within an interior surface of the barrel 302 (not visible).

The chassis 320 is configured to slide into the interior volume of the barrel 302 and may provide structural support mounting features for the various internal components of the stylus 300. The chassis 320 has a shape that corresponds to the shape of the barrel 302. In this case, the chassis 320 takes a substantially cylindrical shape, which corresponds to a cylindrical shape of the internal volume of the barrel 302. The chassis 320 may be sized so as to extend across the majority of the length of the barrel 302, although this may not be required in all embodiments (see, e.g., FIG. 3D).

In some examples, the chassis 320 can include one or more electrically insulating layers disposed on an exterior surface thereof. The electrically insulating layers can prevent the chassis 320 from interfering with the operation of one or more circuits within the stylus 300. The electrically insulating layers may be formed from an ink, coating, or separate component adhered or otherwise fixed to the inner surface of the chassis 320.

In some examples, the chassis 320 can include one or more electrically insulating layers disposed on an exterior surface thereof. The electrically insulating layers can prevent the chassis 320 from interfering with the operation of one or more circuits within the stylus 300.

In other examples, the chassis 320 can be electrically connected to one or more circuits. In many examples, the chassis 320 can serve as a system ground, proving an electrical ground for all (or substantially all) the electrical circuits disposed within the stylus 300. In other cases, the chassis 320 can also serve as a ground plane for one or more antenna elements.

In some embodiments, one or more wireless components are positioned within the chassis 320 and are configured to transmit signals to one or more external devices. To facilitate the transmission of these signals, the chassis 320 may include an antenna window 322. The antenna window 322 is an aperture sized to permit electromagnetic signals generated by an antenna assembly 324 to exit the barrel 302. The size and location of the antenna window 322 depends, at least in part, on the size and location of the antenna assembly 324.

Figure 3G:
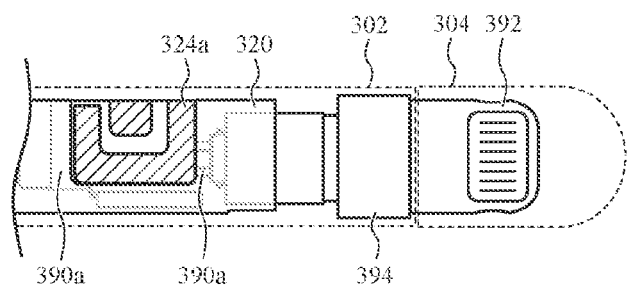
FIG. 3G depicts a detailed view of an end section of the assembled stylus of FIG. 3D.

Although in the illustrated embodiment the chassis 320 defines an antenna window 322, other embodiments can include more than one antenna window (see, e.g., FIG. 3D and FIG. 3G). In some examples, more than one antenna assembly can share the same antenna window, or, in other cases, each antenna assembly can be positioned within or adjacent to its own dedicated antenna window.

The chassis 320 may also include an access or assembly window 326. The assembly window 326 may be included to facilitate simplified manufacturing of the stylus 300. For example, the assembly window 326 can be defined in the chassis 320 adjacent a location at which a hot bar operation is desired or preferred to electrically couple one component to another, when both components are already disposed within the chassis 320. In other examples, the assembly window 326 can be defined in the assembly window 326 adjacent to a location at which a connection between two separate circuits is made via a connector.

As may be appreciated, certain embodiments can define the chassis 320 with more than one assembly window. In other cases, an assembly window may not be required.

In some examples, the assembly window 326 may be covered once the manufacturing operation necessitating the assembly window 326 is completed. In some cases, the assembly window 326 can be covered by an electrically conductive tape. In another case, the assembly window 326 can be covered by welding a plate over the assembly window 326. As may be appreciated, the cover disposed over the assembly window 326 in certain embodiments may be electrically conductive in order to provide electromagnetic shielding to the electronic elements that are disposed within the chassis 320.

The chassis 320 can also include a bonding point 328. In the illustrated embodiment, the chassis 320 has two bonding points, labeled as a bonding point 328 and a bonding point 330. The bonding points 328, 330 can be formed with geometry that facilitates bonding to another component. For example, a bonding point can be prepared for welding to another metal material. Preparing a bonding point for welding may include any number of operations including, but not limited to: removing one or more coatings applied to the material selected for the chassis 320; scoring the bonding point; adding sacrificial material to the bonding point; forming the bonding point into a particular geometry; and so on.

Although the bonding points of the chassis 320 are depicted as being defined in the same half of the chassis 320, it is appreciated that bonding points can be appropriately defined at a location along the chassis 320. In many embodiments, the bonding points 328, 330 of the chassis 320 are configured to be welded to a force-sensitive structure 310b (see, e.g., FIGS. 3D-3E).

The force-sensitive structure 310b can be formed, at least in part, from metal. The force-sensitive structure 310b can include a lateral bed 332 with two cantilevered legs extending from each end of the lateral bed 332. The cantilevered legs are identified in the illustrated embodiment as the rear cantilevered leg 334 and the front cantilevered leg 336.

The rear cantilevered leg 334 and the front cantilevered leg 336 can be formed from the same material as the lateral bed 332. In some embodiments, the lateral bed 332 and the rear cantilevered leg 334 and the front cantilevered leg 336 are formed as a single, integral part. In other examples, the rear cantilevered leg 334 and the front cantilevered leg 336 are attached to the lateral bed 332 via adhesive, welding, or any other suitable method.

In some cases, the rear cantilevered leg 334 and the front cantilevered leg 336 can be coupled to the lateral bed 332 by a pivoting or hinging connection.

Both of the rear cantilevered leg 334 and the front cantilevered leg 336 can provide a mechanical ground to the chassis 320, suspending the lateral bed 332 of the force-sensitive structure 310b within the barrel 302 and/or the interior of the chassis 320 of the stylus 300. In some cases, one end of each of the front and rear cantilevered legs 334, 336 is fixed with respect to the chassis 320 and the barrel 302 and the lateral bed 332 is allowed to shift or move laterally. As described in more detail below with respect to FIGS. 4A-4M, the front and rear cantilevered legs 334, 336 may deflect and the lateral bed 332 may shift in response to a force exerted on the nib 308b (or movable portion 306b).

In particular, the movable portion 306b of the point assembly 306 of the stylus 300 may be mechanically coupled to the rigid signal conduit 310a. In turn, the rigid signal conduit 310a can be coupled to the lateral bed 332 of the force-sensitive structure 310b. For example, the movable portion 306b of the point assembly 306 can be coupled to at least one of the rear cantilevered leg 334 or the front cantilevered leg 336 and/or the lateral bed 332. In the present embodiment, the movable portion 306b is coupled to the lateral bed 332 via the tubular shield 340. In this manner, when the movable portion 306b of the point assembly 306 of the stylus 300 moves toward the barrel 302 and/or withdraws into the interior of the chassis 320, the rear cantilevered leg 334 and the front cantilevered leg 336 deflect.

Upon removing the stylus 300 from the input surface (and, thus, removing the reaction force acting on the stylus 300), one or both of the rear cantilevered leg 334 and the front cantilevered leg 336 of the force-sensitive structure 310b are formed from a resilient material and return the movable portion 306b of the point assembly 306 of the stylus 300 to its nominal position.

In many embodiments, the rear cantilevered leg 334 and the front cantilevered leg 336 are substantially orthogonal to the lateral bed 332 when in a neutral position. In other cases, the rear cantilevered leg 334 and the front cantilevered leg 336 extend from the lateral bed 332 at an oblique angle. In some cases, both the rear cantilevered leg 334 and the front cantilevered leg 336 connect to the same side of the lateral bed 332 (for example, as illustrated). This embodiment causes the force-sensitive structure 310b to exhibit a profile of a widened U-shape. In other cases, the rear cantilevered leg 334 and the front cantilevered leg 336 connect to opposite sides of the lateral bed 332; a profile of the force-sensitive structure 310b takes an elongated S-shape or Z-shape.

In these embodiments, the force-sensitive structure 310b also includes an element that exhibits an electrically-measurable property that changes as a function of the magnitude of force applied. In one example, a strain-sensitive electrode 338 may be coupled to the rear cantilevered leg 334 of the force-sensitive structure 310b. The strain-sensitive electrode 338 can be coupled to an electrical circuit within the stylus 300. The electrical circuit can be configured to monitor one or more electrical properties (e.g., resistance, capacitance, accumulated charge, inductance, and so on) of the strain-sensitive electrode 338 for changes. The electrical circuit then quantifies these changes which may be used to estimate the applied force. Thereafter, the stylus 300 can communicate the applied force to the electronic device, which may be interpreted as a user input.

In many embodiments, more than one strain-sensitive electrode is included. For example, a first strain-sensitive electrode can be coupled to a left side of the rear cantilevered leg 334 and a second strain-sensitive electrode can be coupled to a right side of the rear cantilevered leg 334. In other words, more than one strain-sensitive electrode can be arranged next to one another on the rear cantilevered leg 334. In some embodiments, one of the strain-sensitive electrodes can be placed in compression whereas another strain-sensitive electrode is placed into tension (e.g., tensile strain) in response to deformation of the rear cantilevered leg 334. In other cases, all of the more than one strain-sensitive electrodes are placed in compression (e.g., compressive strain) in response to deformation of the rear cantilevered leg 334.

The multiple strain-sensitive electrodes can be connected to an electrical circuit (e.g., sensor circuitry) in order to approximate a magnitude of strain (e.g., compression or tension) experienced by the rear cantilevered leg 334. In this example, a magnitude of strain can be obtained by measuring either a common property (e.g., parallel and/or series resistance) or a differential property (e.g., voltage division) of the multiple strain-sensitive electrodes.

In one embodiment, a common property estimate such as parallel resistance can be obtained by applying a known voltage to the circuit and measuring a current through the multiple strain-sensitive electrodes. In another embodiment, a current can be injected into the multiple strain-sensitive electrodes and a voltage can be estimated therefrom. In either case, the resistance of either or both multiple strain-sensitive electrodes can be calculated via Ohm's law and can, in turn, be correlated to an amount of strain experienced by the strain-sensitive electrodes.

In another embodiment, multiple strain-sensitive electrodes can be electrically coupled together such that a differential property estimate (such as voltage division) can be obtained by applying a known voltage to the circuit and measuring a voltage across a point between two or more of the multiple strain-sensitive electrodes and a reference voltage. In another embodiment, a current can be injected into the multiple strain-sensitive electrodes and a voltage, or more than one voltage, can be estimated. In either case, the resistance of either or both multiple strain-sensitive electrodes can be calculated via Ohm's law and can, in turn, be correlated to an amount of strain experienced by one or more of the multiple strain-sensitive electrodes.

In many cases, differential property estimates can be combined with or compared to common property estimates. In some examples, the differential property estimate and common property estimate can be combined by unweighted or weighted averaging. In other embodiments, the maximum or minimum of the two estimates can be used. In still further examples, other methods of combining or deciding between the two estimates can be used.

In other cases, an actual calculation of resistance and/or accumulated charge for each independent strain-sensitive electrode may not be required. For example, in certain embodiments, an estimated voltage or current (e.g., from a common property estimate, differential property estimate, or both) can be correlated directly to an amount of strain experienced by the force-sensitive structure.

Once the resistance of each strain-sensitive electrode is obtained via calculation or measurement, each can be compared to a known baseline resistance value in order to determine whether the strain-sensitive electrodes are experiencing tension or compression. In other words, when the force-sensitive structure experiences a reaction force, it may deform, causing one or more strain-sensitive electrodes to either expand (e.g., tension) or contract (e.g., compression), which can cause the resistance thereof to change in a mathematically predictable manner. In some cases, the resistance or other electrical property of the strain-sensitive electrode 338 is measured as a relative value, which may factor environmental effects, such as temperature and/or residual or static strain.

For certain materials, resistance can change linearly with compression or tension. For other materials, resistance can change following a known curve in response to compression or tension. Accordingly, depending upon the material selected for the strain-sensitive electrodes, and the position of the strain-sensitive electrodes on the force-sensitive structure (whether on the rear cantilevered leg 334, the lateral bed 332, or both), a particular resistance can be correlated to a particular amount of strain experienced by a particular strain-sensitive electrode, which in turn can itself be correlated to an amount of force applied to the force-sensitive structure, which in turn can be correlated to an amount of force applied by the tip portion to the input surface.

As noted above, the strain-sensitive electrode 338 can be made of any number of suitable materials. In some examples, the strain-sensitive electrode 338 can be made from a number of materials arranged in a laminated stack. For example, in one embodiment, the strain-sensitive electrode 338 can be implemented as a capacitive sensor; two electrically conductive plates are separated by a dielectric material. As the capacitive electrode shifts and/or moves in response to deformation of the force-sensitive structure 310b in response to a reaction force, the capacitance exhibited by the capacitive electrode changes. The electrical circuit can estimate these changes and correlate the same to a magnitude of force in accordance with embodiments described herein.

Although many embodiments position the strain-sensitive electrode 338 along an external surface of the rear cantilevered leg 334, this configuration is not required. For example, in some embodiments, the strain-sensitive electrode 338 can be positioned to overlap the rear cantilevered leg 334 and the lateral bed 332. In other words, the strain-sensitive electrode 338 can extend around the corner (e.g., interface) between the rear cantilevered leg 334 and the lateral bed 332.

In still further embodiments, the strain-sensitive electrode 338 can be positioned between the lateral bed 332 and the chassis 320. In these embodiments, the strain-sensitive electrode 338 is partially fixed and partially floating. More specifically, the strain-sensitive electrode 338 is fixed with respect to the chassis 320, and mechanically coupled to the lateral bed 332. In this manner, when the lateral bed 332 displaces within the chassis 320 (e.g., in response to a reaction force), the strain-sensitive electrode 338 deforms.

In other embodiments, the deflection of the force-sensitive structure 310b can be measured in another manner such as with, but not limited to: optical sensors; acoustic sensors; resonance sensors; piezoresistive sensors; and so on.

As noted above, the force-sensitive structure 310b is in mechanical communication with the movable portion 306b of the point assembly 306 via the rigid signal conduit 310a.

The rigid signal conduit 310a includes a tubular shield 340. The tubular shield 340 includes a hollow portion and tray portion. As illustrated, the hollow portion of the tubular shield 340 extends downwardly, and is threaded at an end thereof opposite the tray portion. The tubular shield 340 may provide electromagnetic shielding for electrical conduit (e.g., signal lines, traces, and so on) that passes through the hollow portion. The tubular shield 340 may also be configured to provide rigid structural support to transfer reaction forces received at the point assembly 306 to the force-sensitive structure 310b without substantial deflection or buckling. The tray portion of the tubular shield 340 may be configured to receive, support, and partially enclose a control board 342, described in detail below (see, e.g., FIGS. 3D-3E).

The tubular shield 340 may be configured to be received within the force-sensitive structure 310b. More specifically, the front cantilevered leg 336 of the force-sensitive structure 310b defines an aperture (not visible in FIG. 3A) through which the hollow portion of the tubular shield 340 extends. The tray portion of the tubular shield 340, together with the control board 342, is mechanically fastened to the lateral bed 332 of the force-sensitive structure 310b. In one example, the tray portion of the tubular shield 340 is fastened to the lateral bed 332 via one or more screws or other mechanical fastening technique. The tubular shield 340 may be formed from a metal material and welded to the lateral bed 332. In another example, the tray portion of the tubular shield 340 is adhered to the lateral bed 332 via a pressure sensitive adhesive, a curable adhesive, or a silicone or polymer seal. In some cases, the tray portion of the tubular shield 340 is potted within the lateral bed 332. In these examples, the lateral bed 332 can include sidewalls that extend upwardly from the edges of the lateral bed 332; a potting material configured to seal at least one component of the tray portion of the tubular shield 340 is applied over the tray portion, and may abut the sidewalls of the lateral bed.

In this manner, the tubular shield 340 is at least partially inset into the force-sensitive structure 310b. A force applied (e.g., a reaction force, such as described above) to the threaded end of the hollow portion of the tubular shield 340 transfers to the lateral bed 332, causing the front cantilevered leg 336 and the rear cantilevered leg 334 of the force-sensitive structure 310*b* to deflect.

In many embodiments, the tubular shield 340 also extends through the grounded portion 306*a* of the point assembly 306. For example, the tubular shield 340 can extend through the support collar 316 and the flanged nut 318. In typical embodiments, the tubular shield 340 may be configured to extend through each element of the grounded portion 306*a* without impacting internal sidewalls thereof. More specifically, the tubular shield 340 is free to move within the grounded portion 306*a*.

The rigid signal conduit 310*a* also includes one or more load-shifting nuts 344 attached to the threaded end of the hollow portion of the tubular shield 340. In the illustrated embodiment, two load-shifting nuts 344 are shown, but one may appreciate that in different embodiments, more than two load-shifting nuts 344 can be used (see, e.g., FIGS. 3D-3E). In other embodiments, a single load-shifting nut may be included.

In the illustrated embodiment, a back load-shifting nut 344*a* and a front load-shifting nut 344*b* are shown. Generally and broadly, the back load-shifting nut 344*a* and the front load-shifting nut 344*b* are attached to the threaded end of the hollow portion of the tubular shield 340, and separated by a selected distance.

The back load-shifting nut 344*a* may be separated from the flanged nut 318 by a distance less than the clearance gap 312. Similarly, the front load-shifting nut 344*b* may be configured to abut the collar 308*a* of the nosepiece 308 to ensure that the nosepiece 308 may not undesirably separate from the rigid signal conduit 310*a*.

The back load-shifting nut 344*a* is separated from the flanged nut 318 in order to control the peak mechanical load transferred to the force-sensitive structure 310*b* or, more generally, other electrical or mechanical components disposed within the barrel 302. More specifically, the back load-shifting nut 344*a* may be configured to impact the flanged nut 318 during the closure of the clearance gap 312 (e.g., a reaction force is received, causing the movable portion 306*b* to move toward the barrel 302). The distance separating the back load-shifting nut 344*a* and the flanged nut 318 may be configurable or fixed.

The rigid signal conduit 310*a* also includes a core insert 346. A bulk of the core insert 346 is formed from an electrically insulating material, such as plastic. For increased rigidity, the bulk of the core insert 346 can be doped with a fiber material, such as glass fiber.

The core insert 346 defines several signal paths therethrough. In one example, the core insert 346 defines two distinct signal paths, one that may be configured to convey the tip signal to the tip-field generator 314, and one that may be configured to convey the ring signal to a ring-field generator 348 (described in detail below).

The core insert 346 can also include one or more grounding shields. The grounding shields can provide electromagnetic isolation between the signal paths configured to convey the tip signal and the ring signal. For example, in some embodiments, a ground shield of the core insert 346 can be disposed between a ring signal path and a tip signal path. In other cases, one or more grounding shields can enclose the ring signal path and the tip signal path in order to prevent external interference from affecting the same.

The core insert 346 includes a body 350 and a flexible circuit 352. The body 350 of the core insert 346 may be configured to be inserted within the tubular shield 340. In this manner, the tubular shield 340 provides electromagnetic shielding to signal paths traversing the length of the body 350.

The flexible circuit 352 of the core insert 346 may be configured to couple to the control board 342. In one example, the control board 342 is soldered to the flexible circuit 352. In other cases, a hot bar coupling technique can be used.

The control board 342 can include connectors, solder/hot bar pads, circuitry, processors, and traces and/or system bus lines connecting the same. These components can be affixed using any suitable mounting technique to a flexible substrate, rigid substrate, or a flexible substrate that is coupled to a stiffener. The control board 342 can include more than one circuit board connected by a flexible connector. In this embodiment, the control board 342 can be folded over itself or over another component of the stylus.

As noted above, the core insert 346 includes a signal line dedicated to conveying the tip signal to the tip-field generator 314 (herein, the "tip signal line") and another signal line dedicated to conveying the ring signal to the ring-field generator 348 (herein, the "ring signal line"). While these are described as a single line, the tip signal line and ring signal line may each be made from multiple individual conductive elements, lines, or traces.

In one example, the tip signal line (not visible in FIG. 3A) terminates in a contact pad 354 at a bottom end of the core insert 346. In one example, the contact pad 354 is formed during the manufacturing process of the core insert 346. For example, flashing of the core insert 346 can be cut in a finishing process. The location of the cut may be intentionally selected so as to expose the tip signal line. In some cases, the cut can be serrated in order to increase the surface area of the exposed signal line; the increased surface area can bond and/or solder to the contact pad 354 in a more durable manner.

In these embodiments, the contact pad 354 can couple to the tip-field generator 314 in any electrically-suitable manner. For example, as noted above, the tip-field generator 314 may be partially flexible, for example, when implemented as a pogo pin. In another example, the contact pad 354 can be soldered to the tip-field generator 314. In still further examples, the tip-field generator 314 can sit within an electrically conductive paste that is applied to the contact pad 354 in a manufacturing step.

In still further examples, the contact pad 354 can be partially flexible. For example, the contact pad 354 can be formed from an electrically conductive foam or elastomer. In other cases, the contact pad 354 can include pogo pin geometry in addition to and/or separate from pogo pin geometry of the tip-field generator 314.

As noted with respect to other embodiments described herein (and as illustrated), the tip-field generator 314 and the ring-field generator 348 are co-axially aligned along the length of the core insert 346 so that the fields generated thereby (e.g., the tip field and the ring field) are axially symmetrical. In this manner, a user can grasp and hold the stylus 300 in any manner that is comfortable to the user.

The ring-field generator 348 takes the shape of a closed ring through which the tip signal line passes. In addition, one or more grounding layers, sheaths, or other structures can enclose the tip signal line within the ring-field generator 348. In this manner, the ring-field generator 348 may not interfere with the tip signal, and both the ring field and the tip field may be substantially spherical and coaxially aligned.

The ring-field generator 348 can be formed in any suitable manner. In many cases, many examples (and as illustrated), the ring-field generator 348 is around (and/or partially within) the core insert 346. For example, the ring-field generator 348 is formed on an external surface of the core insert 346. The ring-field generator 348 can be disposed onto the external surface of the core insert 346 using any number of suitable manufacturing techniques, including, but notlimited to: physical vapor deposition, pulsed laser deposition, self-adhering conductive film, metallic leafing techniques, metallic plating techniques, and so on. In other cases, the ring-field generator 348 may be a solid metal ring that is insert-molded into the core insert 346.

The ring-field generator 348 can be formed from any number of suitable electrically conductive materials. In some examples, the ring-field generator 348 is formed from metal. In other cases, the ring-field generator 348 is formed from a deposited electrically conductive material, such as a metal-oxide or a metal powder. For example, the electrically conductive material can be deposited via pulsed laser deposition, physical vapor deposition, or any other suitable technique.

In some cases, the ring-field generator 348 is formed from a single material, whereas in other cases the ring-field generator 348 is formed from more than one material. In some cases, the ring-field generator 348 is rigid, whereas in other cases the ring-field generator 348 may be at least partially compliant and/or flexible.

The ring-field generator 348 may be coupled to the ring signal line in any electrically suitable manner. In one example, a via through the core insert 346 connects the ring signal line to the ring-field generator 348.

As noted above, the ring-field generator 348 may be configured to generate an electric field (e.g., the ring field) that is approximately spherical in nature when estimated from a particular distance. In other words, the ring-field generator 348 may function, substantially, as a field source that takes a ring shape (e.g., an annular shape); the field generated by a ring-shaped field source is substantially spherical if measured from a distance greater than the radius of the ring. Thus, in many embodiments, the radius of the ring-field generator 348 is smaller than the distance separating the center of the ring-field generator 348 and the tip of the nib 308b.

The individual components of the stylus 300 described above and depicted in FIG. 3A generally and broadly relate to the coordination engine 206 described with respect to FIG. 2D. The various components, connections, and placements of these components may vary substantially from embodiment to embodiment; the depicted elements present merely one example and certain components may be substituted or omitted in certain implementations.

Next, reference is made to certain operational components of the stylus 300 that may be disposed within the chassis 320. Particularly, the stylus 300 may include a processing unit circuit board set 356.

The processing unit circuit board set 356 may include one or more substrates on or through which one or more electronic components are disposed. These components may be surface mount or through-hole components. Components may be attached to both sides of the substrate. The substrate can be a single layer circuit board, a multi-layer circuit board, or a flexible circuit board. In some examples, a flexible circuit board can be used that is made rigid with one or more stiffeners.

In the illustrated embodiment, the processing unit circuit board set 356 includes substrates that are connected by one or more flexible circuits. A top control board 358 may be coupled to a bottom control board 360 via one or more flexible connectors 362. In some cases, the flexible connectors 362 are formed integrally with either or both the top control board 358 and/or the bottom control board 360. In these embodiments, the flexible connectors 362 electrically and mechanically couple the top control board 358 to the bottom control board 360 without the need for a separate mechanism, coupling, connector, or manufacturing step to connect the same.

However, in other embodiments, the flexible connectors 362 can be separate from the top control board 358 and/or the bottom control board 360. For example, the flexible connectors 362 are permanently or removably attached to either or both the top control board 358 and/or the bottom control board 360.

In many cases, the top control board 358 and the bottom control board 360 take substantially the same shape. In this manner, the bottom control board 360 can be folded underneath the top control board 358 (shown in the illustrated embodiment as a fold path 364). Thereafter, the top control board 358 and the bottom control board 360 can be fastened together in a manner that retains a selected distance between the boards. In some embodiments, the top control board 358 and the bottom control board 360 can be folded over other components of the stylus 300.

In one embodiment, the top control board 358 and the bottom control board 360 can be fastened together with a first standoff 366, a second standoff 368, and a spacer 370. The first standoff 366 and the second standoff 368 may be disposed at a top edge and a bottom edge of the folded boards, respectively. The spacer 370 may be positioned generally in the middle of the top control board 358 and the bottom control board 360.

The first standoff 366 and the second standoff 368 can be fastened to the boards via one or more mechanical fasteners, such as screws. In other cases, the first standoff 366 and the second standoff 368 are adhered to the boards using an adhesive. In some cases, the first standoff 366 and/or the second standoff 368 can be electrically connected to a circuit ground of either or both boards.

The width of the processing unit circuit board set 356, when folded, is selected to be less than the internal diameter of the chassis 320. In this manner, the processing unit circuit board set 356 can be disposed within the chassis 320 during manufacturing. In many embodiments, the processing unit circuit board set 356 is positioned within a middle portion of the chassis 320, adjacent to the assembly window 326. In this manner, during assembly, at least a portion of the processing unit circuit board set 356 can be accessed through the assembly window 326 (see, e.g., FIGS. 3D-3F).

The processing unit circuit board set 356 couples to the control board 342 of the coordination engine 310 so data, signals, and/or power can be exchanged between them. In one embodiment, a flexible circuit 372 can be used to couple the processing unit circuit board set 356 to the control board 342 of the coordination engine 310. The processing unit circuit board set 356 may be configured to, without limitation, at least one of the following: provide power and/or circuit ground connections to the control board 342; provide the tip signal and/or ring signal to the control board 342; provide parameters to the control board 342 that the control board 342 uses to generate the tip signal and/or ring signal; provide data to the control board 342 for the control board 342 to modulate into the tip signal and/or ring signal; receive from the control board 342 a force measurement; and so on.

Similarly, the control board 342 may be configured to, without limitation, at least one of the following: receive power and/or circuit ground connections from the processing unit circuit board set 356; receive a tip signal and/or a ring signal from the processing unit circuit board set 356; receive parameters related to a tip signal and/or ring signal from the processing unit circuit board set 356; generate a tip signal and/or ring signal in accordance with the parameters; measure an electrical property of the strain-sensitive electrode 338; determine a force associated with an electrical property of the strain-sensitive electrode 338; provide to the processing unit circuit board set 356 an estimation of force; and so on.

The control board 342 can include any number of suitable circuits or circuitry. For example, in many embodiments, the control board 342 can be configured to convey the tip signal and the ring signal to the tip-field generator 314 and the ring-field generator 348, respectively. In other cases, the control board 342 can be configured to estimate one or more electrical properties of the strain-sensitive electrode 338 and/or associate the magnitudes of such electrical properties to a magnitude of force received by the force-sensitive structure 310b. The control board 342 can communicate with the processing unit circuit board set 356. For example, the processing unit circuit board set 356 may convey to the control board 342 stylus identity information, user identity information, or stylus setting information. The control board 342 can receive this information and modify the tip signal and/or the ring signal accordingly. In other examples, the control board 342 receives the tip signal and/or the ring signal directly from the processing unit circuit board set 356.

In one example, the flexible circuit 372 includes a connector 374 that may be configured to connect to a port 376 of the processing unit circuit board set 356. Additionally, the flexible circuit 372 includes one or more hot bar pads 378 that are configured to be permanently coupled to the control board 342. In other cases, the flexible circuit 372 can connect to the control board 342 using a connector such as the connector 374 (see, e.g., FIGS. 3D-3F).

In addition to coupling the control board 342 of the coordination engine 310 to the processing unit circuit board set 356, the flexible circuit 372 can also couple the strain-sensitive electrode 338 (or more than one electrode) of the force-sensitive structure 310b to either or both the control board 342 or the main control board 365. The connection between the flexible circuit 372 and the strain-sensitive electrode 338 can be permanent or removable; the connection can be a soldered connection, a hot barred connection, or a connection made between a connector and a port.

The flexible circuit 372 can also include an articulated portion 382. The articulated portion 382 permits the flexible circuit 372 to contract or fold when a reaction force causes the electromechanical coupling to shift. Generally, the flexible circuit 372 allows for the relative motion of the force-sensitive structure 310b with respect to the processing unit circuit board set 356. The shape of the articulated portion 382 may reduce or minimize effects of the electrical connection between the control board 342 and the processing unit circuit board set 356. In some embodiments, the articulated portion 382 is configured to reduce the relax time or time constant of the force-sensitive structure 310b after a deflection or force-sensing event.

The processing unit circuit board set 356 is also coupled to a battery pack 384. The battery pack 384 may be a lithium-polymer battery pack or a lithium ion battery. However, in other embodiments, alkaline batteries, nickel-cadmium batteries, nickel-metal hydride batteries, or any other suitable rechargeable or one-time-use batteries may be used.

For embodiments in which the battery pack 384 is a lithium-polymer battery pack, the battery pack 384 may include stacked layers that may form the components of the battery pack 384 (e.g., anode, cathode). In many embodiments, the battery pack 384 may be folded or rolled prior to being sealed in a pouch (not shown). In some embodiments, the pouch may be a rectangular pouch that may be rolled or folded after the battery pack 384 is inserted therein. The direction of the rolls or folds may be generally aligned with the longitudinal axis of the barrel 302. In this manner, the battery pack 384 may have little or no unused space when positioned within the chassis 320.

In some embodiments, the battery pack 384 may include one or more other components, such as flow barriers and/or encapsulation walls operably connected to either or both the cathode electrode collector and the anode electrode collector, among other components.

The particular configuration of battery pack 384 described above is merely a simplified example, and the number and order of the individual components may vary. In many examples, the battery pack 384 includes one or more leads 386 that are configured to permanently or removably attach to the processing unit circuit board set 356. The battery pack 384 includes a power control board 388. The battery pack 384 and the power control board 388 are sized so as to fit within the chassis 320. In some cases, the battery pack 384 may be axially aligned with a central axis of the chassis 320, although this is not required of all embodiments. In some cases, the battery pack 384 may be axially offset with respect to a central axis of the chassis 320. In these embodiments, the offset alignment of the battery pack 384 may cause the stylus 300 to be eccentrically balanced along its longitudinal axis which, in turn, may prevent the stylus 300 from rolling when the stylus 300 is placed on a surface. In some embodiments, marking on the exterior of the stylus 300 such as instructions, logos, personalization, icons, and so forth may be positioned based on the alignment of the battery pack 384 so that the markings may be either visible or hidden when the stylus 300 is placed on a surface.

The power control board 388 includes circuitry configured to control the charge and/or discharge rate of the battery pack 384. In many examples, the power control board 388 is communicably coupled directly to the processing unit circuit board set 356 via a signal path trace that extends along the length of the battery pack 384 (see, e.g., FIGS. 3D-3F).

In some cases, the power control board 388 and/or another portion of the battery pack 384 can be disposed (at least partially) within the internal volume of the antenna support block 324b. In some cases, leads extending from the power control board 388 can be intentionally lengthened into a service loop. The service loop can be included to simplify manufacturing of the stylus 300.

The power control board 388 can include connectors, solder/hot bar pads, circuitry, processors, and traces and/or system bus lines connecting the same. These components can be affixed using any suitable mounting technique to a flexible substrate, rigid substrate, or a flexible substrate that is coupled to a stiffener. The power control board 388 can include more than one circuit board connected by a flexible connector. In this embodiment, the power control board 388 can be folded over itself or over another component of the stylus, in a manner similar to the processing unit circuit board set 356.

In many examples, the power control board 388 is configured to, without limitation, at least one of the following: provide information related to the capacity of the battery pack 384 to the processing unit circuit board set 356; provide information related to the charging speed of the battery pack 384 to the processing unit circuit board set 356; provide information related to the age, health, or expansion of the battery pack 384 to the processing unit circuit board set 356; and so on.

In many cases, the battery pack 384 can be disposed such that the mass of the battery pack 384 is coaxially aligned with the length of the stylus 300.

The stylus 300 also includes a data and/or power connector 390. The data and/or power connector 390 may be coupled to both the power control board 388 and the processing unit circuit board set 356. The data and/or power connector 390 includes a connector end 392 and a plug collar 394.

The connector end 392 can be configured to couple to a power and/or data port of an electronic device to facilitate recharging of the battery pack 384. In other cases, the connector end 392 can be used to exchange data between the stylus 300 and an electronic device. The connector end 392 can be configured to be flexible (laterally moveable within the plug collar 394) so that when connected to an electronic device, the stylus 300 can resist and withstand certain forces that may otherwise damage the stylus 300 and/or the electronic device.

Although the connector end 392 is illustrated as a multipin, reversible, and standardized data and/or power connector, it is appreciated that such a connector is not required. Particularly, in some embodiments, a Lightning connector, Universal Serial Bus connector, Firewire connector, serial connector, Thunderbolt connector, headphone connector, or any other suitable connector can be used.

In some cases, the data and/or power connector 390 can be disposed (at least partially) within the internal volume of the antenna support block 324*b*. In some cases, one or more leads 390*a* extending from the data and/or power connector 390 can be intentionally lengthened into a service loop. The service loop can be included to simplify manufacturing of the stylus 300.

In many cases, the blind cap 304 may be configured to conceal a data and/or power connector 390 of the stylus 300. The data and/or power connector 390 may be concealed by the blind cap 304 (see, e.g., FIG. 3D and FIG. 3F).

As illustrated, the data and/or power connector 390 may extend outwardly from the barrel 302 when assembled. The plug collar 394 can be configured to seal the barrel 302 when assembled. In some embodiments, the data and/or power connector 390 can retract, either manually or automatically, and either partially or entirely, into the barrel 302 when not in use. In some examples, the data and/or power connector 390 can be connected to a push-push mechanism.

The processing unit circuit board set 356 is also coupled to the antenna assembly 324. The antenna assembly 324 includes an antenna 324*a*, an antenna support block 324*b*, a transmission line 324*c*, and a connector 324*d*. The antenna 324*a* is disposed onto or otherwise coupled to the antenna support block 324*b*. In some embodiments, the antenna support block 324*b* is formed from a dielectric material, such as plastic. The antenna 324*a* can be disposed onto the external surface of the antenna support block 324*b* using any number of suitable manufacturing techniques, including, but not limited to: physical vapor deposition, pulsed laser deposition, self-adhering conductive film, metallic leafing techniques, metallic plating techniques, and so on. In some embodiments, the antenna 324*a* is formed using a laser direct structuring technique and formed directly on the outer surface of the antenna support block 324*b*.

The antenna support block 324*b* defines an internal volume. The internal volume of the antenna support block 324*b* can be sized and/or otherwise configured to retain other components of the stylus 300 such as, but not limited to: electronic circuits, batteries, sensors, service loops of wire, flexible connectors, ground planes, balancing weights, flexible elements, moisture detection features, and so on.

The connector 324*d* may be configured to directly connect to a connector on the processing unit circuit board set 356. In many cases, the connector 324*d* and the transmission line 324*c* may be shielded so that signals passing therethrough are not affected by external interference and, oppositely, the signals passing therethrough do not affect any components within the stylus 300.

The transmission line 324*c* may be configured to run alongside or adjacent to the battery pack 384 when the antenna assembly 324 and the battery pack 384 are assembled within the chassis 320. The transmission line 324*c* is generally aligned to be parallel to the longitudinal axis of the barrel 302. As noted above, the antenna assembly 324 is inserted into the chassis 320 so that the antenna 324*a* aligns with the antenna window 322.

In some cases, the transmission line 324*c* can be separated from an inner surface of the chassis 320 by a compressible element 396. The compressible element 396 includes a compressible foam 396*a*, and one or more binding elements 396*b*. The binding elements 396*b* can attach the compressible foam 396*a* and the transmission line 324*c* to the battery pack 384.

As noted with respect to many embodiments described above, many of the components of the stylus 300 may be disposed, at least partially, within the chassis 320. In this manner, the chassis 320 provides effective electromagnetic shielding to a number of the elements of the stylus 300.

To facilitate installation of the various components within the chassis 320, said components may, in some examples, be attached to a sled 398. The sled 398, along with all components it contains, may be slid into the chassis 320. Thereafter, the chassis 320 and the sled 398 can be fastened to one another in any suitable manner. For example, screws, rivets, or adhesive can be used to fasten the chassis 320 to the sled 398. In other examples, the chassis 320 can be welded to the sled 398. The chassis 320 may then be inserted into the internal volume of the barrel 302 (see, e.g., FIGS. 3D-3F).

In some cases, the sled 398 can serve as a system ground, proving an electrical ground for all (or substantially all) the electrical circuits disposed within the stylus 300. In other cases, the sled 398 can also serve as a ground plane for one or more antenna elements.

The foregoing description of the embodiments depicted in FIGS. 3A-3B, and various alternatives and variations, are presented, generally, for purposes of explanation, and to facilitate a thorough understanding of a stylus as contemplated herein. However, it will be apparent to one skilled in the art that some of the specific details presented herein may not be required in order to practice a particular described embodiment, or an equivalent thereof.

Thus, the foregoing and following descriptions of specific embodiments are understood to be presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings. Particularly, it may be understood that the stylus depicted in FIGS. 3A-3B can be implemented in a number of suitable and implementation-specific ways.

Generally and broadly, FIGS. 4A-4M reference different embodiments of a coordination engine of a stylus such as described herein. A user may manipulate the stylus and apply a force to an input surface of an electronic device. A corresponding reaction force may be transferred through the tip of the stylus connected to the electromechanical coupling and to a force-sensitive structure positioned within the stylus. The force-sensitive structure may deform in response which may be measured by the stylus and used to estimate the applied force. The force-sensitive structures described with respect to FIGS. 4A-4M may be used to produce a non-binary output that corresponds to the applied force. For example, the force-sensitive structures may be used to produce an output that represents a magnitude that varies in accordance with a variable amount of applied force.

Figure 4A:
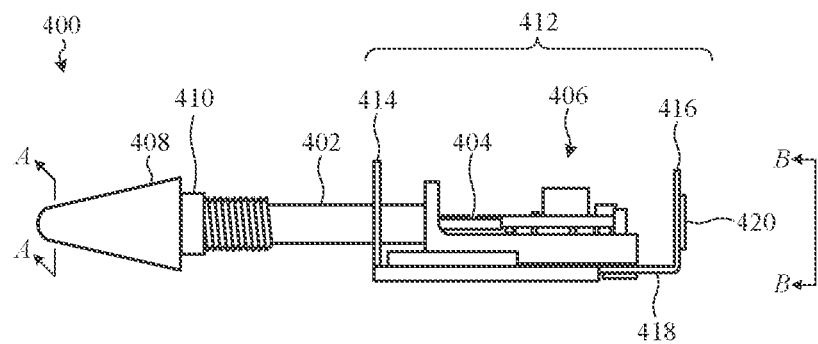
FIG. 4A depicts a side view of a coordination engine of a stylus such as described herein, showing a force-sensitive structure that supports a tip of the stylus and, in particular, showing the force-sensitive structure in a nominal state generally characterized by the absence of a reaction force acting on the tip.

FIG. 4A depicts a side view of a coordination engine 400 of a stylus, particularly showing a force-sensitive structure that supports a tip of the stylus. As with the embodiment described with respect to FIG. 3A, the coordination engine 400 includes a tubular shield 402 that encloses a rigid conduit 404 configured to convey electrical signals received from a control board 406 via one or more signal paths (e.g., the tip signal path and the ring signal path) to a nosepiece 408 of the stylus. The nosepiece 408 includes a collar 410 that is threaded onto a correspondingly-threaded portion of the tubular shield 402 which, in turn, may be mechanically coupled to a force-sensitive structure 412. The nosepiece 408 may be removed from the force-sensitive structure 412 and treated as a disposable, substitutable, or replaceable component.

The tubular shield 402 and the control board 406 are mechanically coupled to a force-sensitive structure 412 with any suitable method. The tubular shield 402 includes a hollow portion and a bed portion. The tubular shield 402 is formed from an electrically conductive material having a rigidity that prevents the tubular shield 402 from buckling or deflecting when a force is applied. The length of the hollow portion of the tubular shield 402 may be selected so as to provide electromagnetic shielding to a tip-field generator (not shown) or a ring-field generator.

The force-sensitive structure 412 can be described, generally, as a cantilevered sled that can move inwardly with respect to the body of a stylus in response to a force. The cantilevered portions of the force-sensitive structure 412 are affixed, at one end, to an internal structure of the stylus, such as the chassis 320 depicted in FIG. 3A.

The force-sensitive structure 412 includes a front cantilevered leg 414 and rear cantilevered leg 416 that are coupled together or joined by a lateral bed 418 that extends between the two cantilevered legs. As noted with respect to other embodiments described herein, the front cantilevered leg 414 and the rear cantilevered leg 416 are fixed with respect to the body of the stylus (e.g., the barrel as shown in FIG. 3A). In this example, the combined shape of the front cantilevered leg 414, the lateral bed 418, and the rear cantilevered leg 416 form an elongated U-shape. A strain-sensitive electrode 420 is positioned on a back surface of the rear cantilevered leg 416.

The force-sensitive structure 412 may be formed from a resilient or compliant material that is configured to deflect or bend without yielding or breaking; in some embodiments, the force-sensitive structure 412 is formed from a tempered spring steel that is configured to deflect in a predictable and repeatable manner. The force-sensitive structure 412 may also be molded from a polymer material, formed from a composite of polymer and metal, or other combination of materials.

The front and rear cantilevered legs 414, 416 may be fixed to one or more internal components of the stylus. In some implementations, the legs are welded to a sleeve or chassis using a laser-welding or other precision welding process. The legs may also be fixed using a mechanical tab, fastener, or other mechanical attachment technique.

Figure 4B:
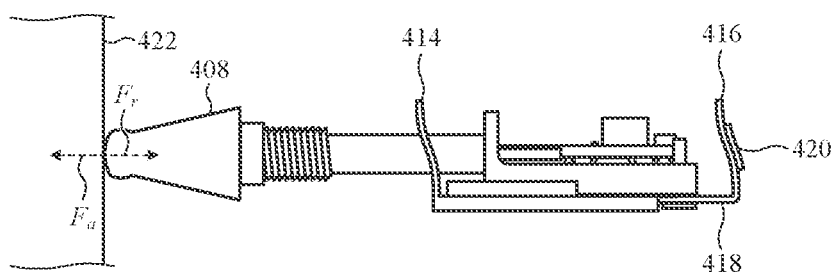
FIG. 4B depicts a side view of the coordination engine of FIG. 4A, showing the force-sensitive structure and tip in a deflected state generally characterized by the presence of a reaction force that acts on the tip when the stylus is pressed against a surface, such as the display of the electronic device depicted in FIGS. 1A-1C.

In this manner, when the nosepiece 408 of the stylus applies a force $F_a$ to an input surface 422, and an equal and opposite reaction force $F_r$ is conveyed to the electromechanical coupling by the nosepiece 408, it causes the nosepiece 408 to partially withdraw or deflect inward, in turn causing the front cantilevered leg 414 and the rear cantilevered leg 416 to deflect or deform along a serpentine curve, such as shown in FIG. 4B. The strain-sensitive electrode 420 is deformed as a result of the deformation of the rear cantilevered leg 416. The deformation of the strain-sensitive electrode 420 can be measured by an electrical circuit in order to determine the magnitude of the reaction force $F_r$. As described in more detail below with respect to FIGS. 4C and 4K-4M multiple strain-sensitive electrodes may be disposed on one or more surfaces of the rear cantilevered leg 416.

Typically, the front cantilevered leg 414 and the rear cantilevered leg 416 deform in an S-shape (such as shown), although this is not required and other deformations are possible for different embodiments. The deflection of the rear cantilevered leg 416 may also be described as a serpentine shape having a concave region, a convex region, and an inflection region (e.g., zero or near-zero strain point) joining the regions. In some embodiments the lateral bed 418 can include one or more stiffeners 424, as shown in the cross-section depicted in FIG. 4D, taken along line A-A of FIG. 4A. The stiffeners 424 can be applied and/or adhered to one or more sides of the lateral bed 418. The stiffeners 424 provide structural support to the lateral bed 418 so that the force-sensitive structure 412 deforms substantially only at the grounding point of the front cantilevered leg 414 and the rear cantilevered leg 416. In other words, the stiffeners 424 cause the lateral bed 418 to remain substantially parallel to inner sidewalls (e.g., inner portions) of the barrel of the stylus and/or a chassis of the stylus. In these embodiments, the force-sensitive structure 412 takes the general shape of a box when no force is applied and takes the general shape of a parallelogram (with or without deformed sides) when a force is applied.

Figure 4C:
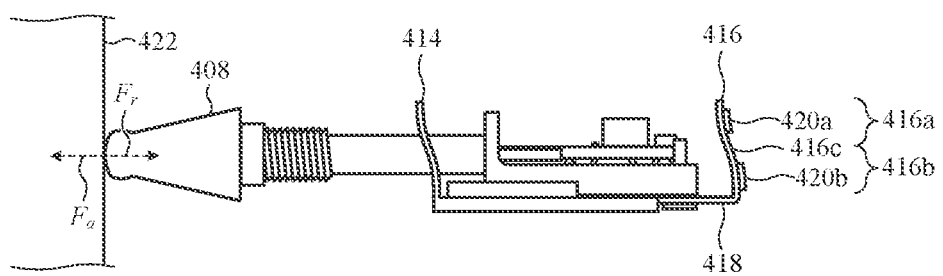
FIG. 4C depicts a side view of the coordination engine of FIG. 4A, particularly showing a deflected state of another force-sensitive structure.

As illustrated in FIG. 4C, a first strain-sensitive electrode 420a is disposed on an upper portion 416a of the rear cantilevered leg 416 and a second strain-sensitive electrode 420b is disposed on a lower portion 416b of the rear cantilevered leg 416. An inflection point 416c is between the upper portion 416a and the lower portion 416b. In this manner, the first strain-sensitive electrode 420a experiences compression (e.g., the upper portion 416a is concave) when the rear cantilevered leg 416 deforms whereas the second strain-sensitive electrode 420b experiences tension (e.g., the lower portion 416b is convex) when the rear cantilevered leg 416 deforms.

Figure 4D:
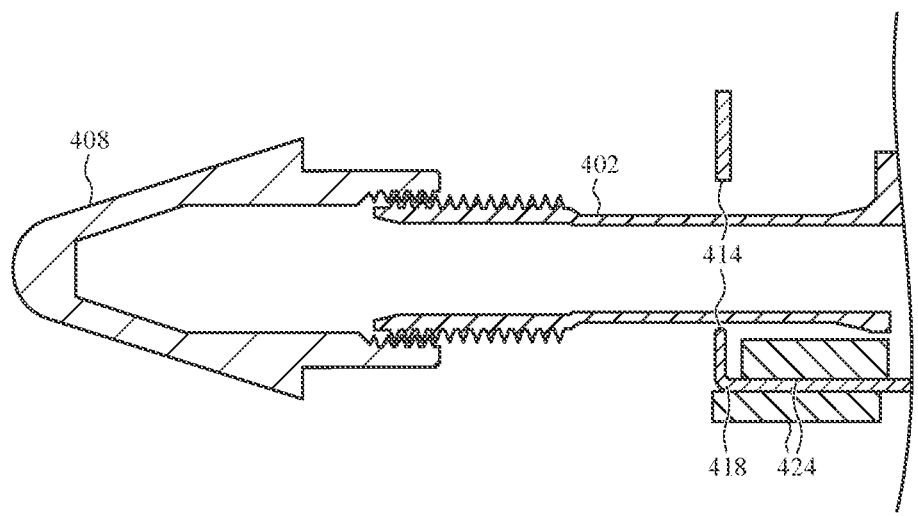
FIG. 4D depicts a cross-section view of the coordination engine of FIG. 4A, taken through line A-A, particularly showing an example of a mechanical coupling between the tip of the stylus and the force-sensitive structure.

In some embodiments the lateral bed 418 can include one or more stiffeners 424, such as shown in the cross-section depicted in FIG. 4D, taken along line A-A of FIG. 4A. The stiffeners 424 can be applied and/or adhered to one or more sides of the lateral bed 418. The stiffeners 424 provide structural support to the lateral bed 418 so that the force-sensitive structure 412 deforms substantially only at the grounding point of the front cantilevered leg 414 and the rear cantilevered leg 416.

As noted with respect to other embodiments described herein, more than one strain-sensitive electrode can be included. In some examples, a strain-sensitive electrode 420 can be applied or otherwise adhered to an internal surface of the rear cantilevered leg 416. In still other embodiments, a strain-sensitive electrode 420 can be applied to a front or rear surface of the front cantilevered leg 414.

As noted with respect to other embodiments described herein, the force-sensitive structure 412 may not necessarily take the shape as depicted in FIG. 4A. In general, the force-sensitive structure 412 may be characterized as having at least one cantilevered leg having one edge fixed with respect to the body or other internal structure of the stylus. The non-fixed end of the cantilevered leg may be connected or attached to a bed that is configured to shift laterally with respect to the body or other structure of the stylus. Various non-limiting examples of this general concept are described below with respect to FIGS. 4E-4J.

Figure 4E:
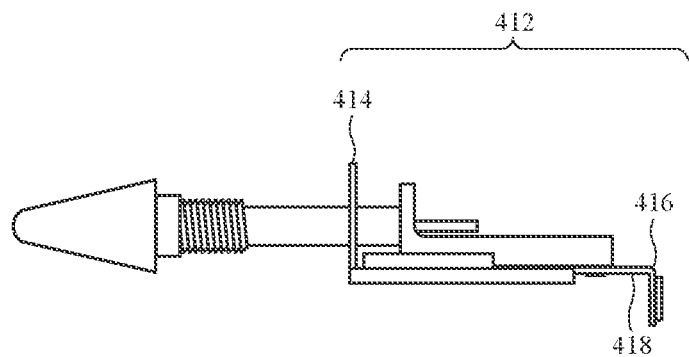
FIG. 4E depicts a side view of one example force-sensitive structure in a nominal state.

For example, in one embodiment such as depicted in FIG. 4E, the force-sensitive structure 412 includes a front cantilevered leg 414 and a rear cantilevered leg 416 that extend from opposite sides of the lateral bed 418 and are coupled to opposite sides of the body of the stylus (e.g., the barrel as shown in FIG. 3A). In this embodiment, the force-sensitive structure 412 takes the shape that resembles the letter Z or a letter S.

Figure 4F:
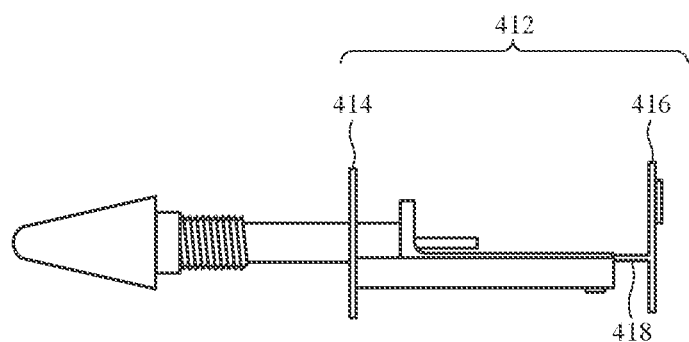
FIG. 4F depicts a side view of another force-sensitive structure in a nominal state.

In another embodiment such as depicted in FIG. 4F, the force-sensitive structure 412 includes a front cantilevered leg 414 and a rear cantilevered leg 416. Each includes two ends that are fixed with respect to opposite sides the body of the stylus (e.g., the barrel as shown in FIG. 3A). In this example, the front cantilevered leg 414 and rear cantilevered leg 416 extend from both sides of the lateral bed 418 and resembles the shape of an elongated letter H.

Figure 4G:
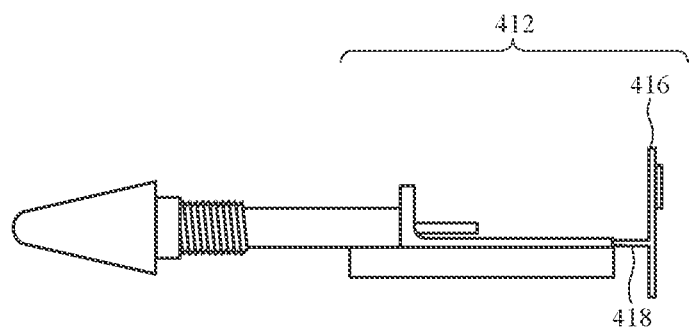
FIG. 4G depicts a side view of yet another force-sensitive structure in a nominal state.

In another embodiment such as depicted in FIG. 4G, the force-sensitive structure 412 includes a rear cantilevered leg 416 including two ends which extend from opposite sides of the lateral bed 418 that are fixed with respect to opposite sides of the body of the stylus (e.g., the barrel as shown in FIG. 3A). In this embodiment, the force-sensitive structure 412 resembles the shape of an elongated letter T, rotated clockwise by ninety degrees.

Figure 4H:
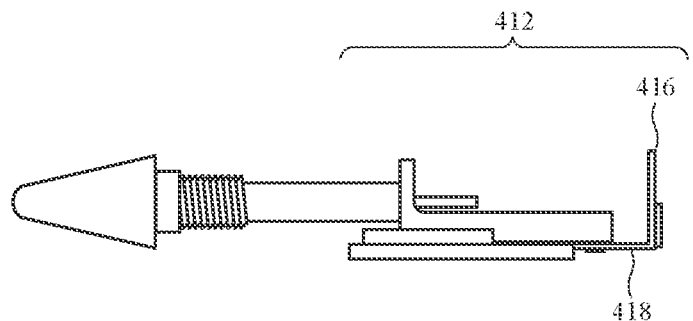
FIG. 4H depicts a side view of another example force-sensitive structure in a nominal state.

In yet another embodiment such as depicted in FIG. 4H, the force-sensitive structure 412 includes a rear cantilevered leg 416 including one end that is fixed with respect to the body of the stylus (e.g., the barrel as shown in FIG. 3A). The unfixed end of rear cantilevered leg 416 is attached to a lateral bed 418 and has a shape that resembles an elongated letter L, rotated counterclockwise by ninety degrees.

Figure 4I:
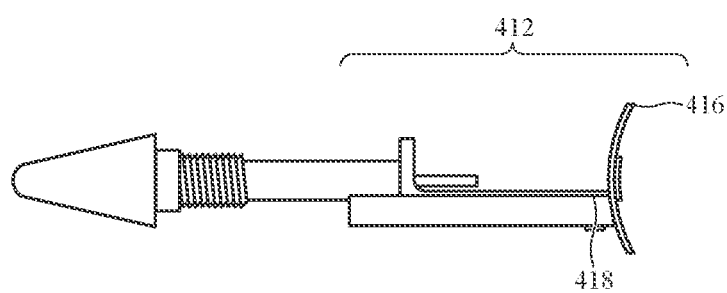
FIG. 4I depicts a side view of another force-sensitive structure in a nominal state.

In yet another embodiment such as depicted in FIG. 4I, the force-sensitive structure 412 includes a rear cantilevered leg 416 that takes the shape of an arc and extends in two directions at the end of the lateral bed 418. Both ends of the arc can be fixed with respect to the body of the stylus (e.g., the barrel as shown in FIG. 3A). While the rear cantilevered leg 416 is depicted as being convex in shape (as viewed from the tip-end of the stylus), the rear cantilevered leg 416 may also be concave or have another contoured shape.

Figure 4J:
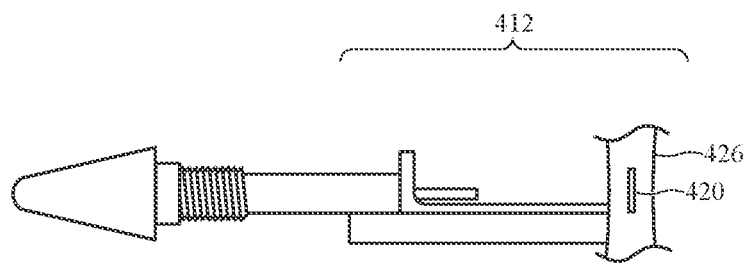
FIG. 4J depicts a side view of yet another force-sensitive structure in a nominal state.

In yet another embodiment such as depicted in FIG. 4J, the force-sensitive structure 412 is coupled to a compressible member 426. In one example, the compressible member 426 may be formed from any number of materials that are configured to elastically or viscoelastically deform. In this embodiment, the compressible member 426 may be coupled at one or more than one location to the body of the stylus.

The foregoing description of the embodiments depicted in FIGS. 4A-4J, and various alternatives and variations, are presented, generally, for purposes of explanation, and to facilitate a general understanding of a force-sensitive structure and coordination engines as described with respect to stylus embodiments disclosed herein. However, it will be apparent to one skilled in the art that some of the specific details presented herein may not be required in order to practice a particular described embodiment, or an equivalent thereof.

Thus, the foregoing and following descriptions of these specific embodiments are understood to be presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings. Particularly, it may be understood that the force-sensitive structures and coordination engines depicted in FIGS. 4A-4J can be implemented in a number of suitable and implementation-specific ways. For example, as noted above, strain sensors or, more broadly, strain-responsive elements as described herein can be applied to one or more cantilevered legs of a force-sensitive structure in any number of suitable ways.

Figure 4K:
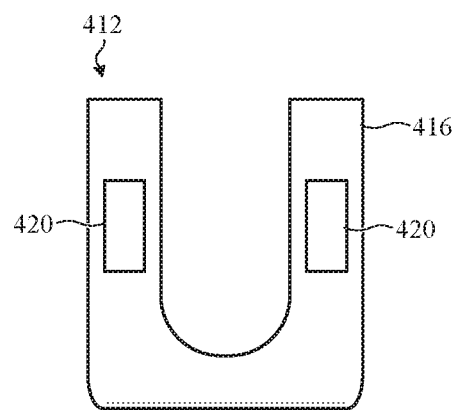
FIG. 4K depicts a back view of the force-sensitive structure of FIG. 4A, viewed along line B-B, particularly showing a distribution of strain-responsive elements coupled to the force-sensitive structure.
Figure 4L:
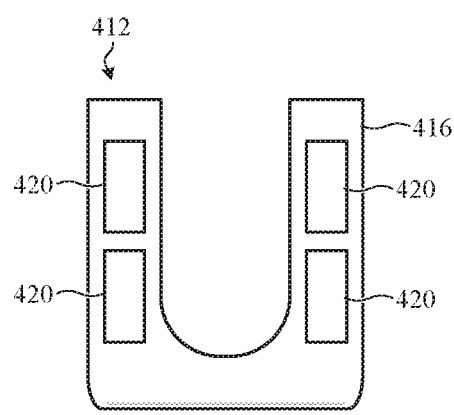
FIG. 4L depicts a back view of another force-sensitive structure in a nominal state, particularly showing an example distribution of strain-responsive elements coupled to the force-sensitive structure.
Figure 4M:
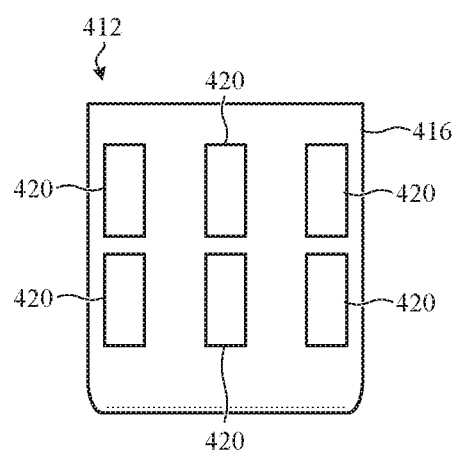
FIG. 4M depicts a back view of yet another force-sensitive structure in a nominal state, particularly showing an example distribution of strain-responsive elements coupled to the force-sensitive structure.

Accordingly, generally and broadly, FIGS. 4K-4M depict back views of a force-sensitive structure such as may be attached to the coordination engine of FIG. 4A, viewed along line B-B of FIG. 4A.

FIG. 4K depicts a back surface of the rear cantilevered leg 416 of the force-sensitive structure 412. The back surface of the rear cantilevered leg 416 can be a solid sheet of material or can define one or more cutouts. As depicted, the back surface of the rear cantilevered leg 416 includes a U-shaped cutout or relief. In these embodiments, the cutout and/or the shape of the back surface of the rear cantilevered leg 416 can depend upon the amount of force sensitivity required or desired for a particular embodiment. Portions of the cantilevered leg may be thinned or thickened to provide more or less sensitivity. Portions of the cantilevered leg may also be shaped to provide a particular shaped deflection. For example, the cantilevered leg may have a shape or include features that provide an inflection point or line along the length of the cantilevered leg while deflected. In general, the dimensions and shape of the profile of the rear cantilevered leg 416 will be adapted to provide a particular responsiveness to an applied force. In the illustrated embodiment, it may be understood that an upper portion of the rear cantilevered leg 416 is configured to be mechanically coupled to the body of the stylus. In many cases, this portion can be welded to a chassis of the stylus.

The back surface of the rear cantilevered leg 416 can be used to attach one or more strain-sensitive electrodes 420. In the illustrated embodiment, two strain-sensitive electrodes 420 are included. One strain-sensitive electrode 420 is disposed on a right side of the rear cantilevered leg 416 and one strain-sensitive electrodes 420 is disposed on a left side of the rear cantilevered leg 416.

The strain-sensitive electrodes 420 can be axially aligned, such as shown, although this may not be required or preferred for all embodiments. For example, one of the two strain-sensitive electrodes 420 may be positioned more adjacent to the upper portion of the rear cantilevered leg 416.

In further embodiments, more than two strain-sensitive electrodes can be included. For example, FIG. 4L depicts an embodiment including four independent strain-sensitive electrodes 420. In still further embodiments, more than four strain-sensitive electrodes can be included. For example, FIG. 4M depicts an embodiment including six independent strain-sensitive electrodes 420.

In some embodiments, one or more pairs of strain-sensitive electrodes may be positioned on different portions of the surface of the rear cantilevered leg 416 that are placed in compressive and tensile strain modes, respectively. As described above with respect to FIG. 4B, the rear cantilevered leg 416 may deflect in an S-shaped or serpentine manner in response to an applied force. One strain sensitive electrode of the pair may be attached to a region of the surface that is configured to deflect into a compressive strain mode, and the other strain-sensitive electrode of the pair may be attached to a different region that is configured to deflect into a tensile strain mode. In some cases, the pair of strain-sensitive electrodes is positioned on opposite sides of an inflection point or inflection line that corresponds to a transition between a concave and convex contour in the deflected surface. Measuring a difference in the electrical response between the electrodes in the tensile and compressive strain modes may increase the sensitivity of the deflection measurement and, therefore, increase the ability of the stylus to resolve small changes in the applied force.

Suitable materials for the strain-sensitive electrodes vary from embodiment to embodiment and may include nickel, Constantan and Karma alloys, gallium-doped zinc oxide, polyethylenedioxythiophene, indium tin oxide, carbon nanotubes, graphene, silver nanowire, nickel nanowires, other metallic nanowires, and the like. Typically, when the electrode is strained, such as when the tip of the stylus applies a force to the input surface, the resistance of the electrode changes as a function of the strain. The resistance can be estimated with an electrical circuit.

In certain embodiments, the strain-sensitive electrodes may be estimated by using a Wheatstone bridge. In such an example, a voltage $V_g$ may be estimated across the output of two parallel voltage dividers connected to a voltage supply $V_s$. One of the voltage dividers may include two resistors of known resistance $R_1$ and $R_2$ and the other voltage divider may include one resistor or known resistance $R_3$ and the electrode Rx. By comparing the voltage across the output of each voltage to the voltage of the voltage supply Vs, the unknown resistance Rx of the electrode may be calculated and, thus, the magnitude of the force applied by the tip of the stylus to the input surface can be estimated.

In another embodiment, more than one strain-sensitive electrode can be arranged next to one another on the back cantilevered leg. The multiple strain-sensitive electrodes can be connected to an electrical circuit in order to approximate a magnitude of strain (e.g., compression or tension) experienced by the back cantilevered leg. In this example, a magnitude of strain can be obtained by measuring either a common property (e.g., parallel and/or series resistance) or a differential property (e.g., voltage division) of the multiple strain-sensitive electrodes.

In one embodiment, a common property estimate such as parallel resistance can be obtained by applying a known voltage to the circuit and measuring a current through the multiple strain-sensitive electrodes. In another embodiment, a current can be injected into the multiple strain-sensitive electrodes and a voltage can be estimated therefrom. In either case, the resistance of either or both multiple strain-sensitive electrodes can be calculated via Ohm's law and can, in turn, be correlated to an amount of strain experienced by the strain-sensitive electrodes.

In another embodiment, multiple strain-sensitive electrodes can be electrically coupled together such that a differential property estimate (such as voltage division) can be obtained by applying a known voltage to the circuit and measuring a voltage across a point between two or more of the multiple strain-sensitive electrodes and a reference voltage. In another embodiment, a current can be injected into the multiple strain-sensitive electrodes and a voltage, or more than one voltage, can be estimated. In either case, the resistance of either or both multiple strain-sensitive electrodes can be calculated via Ohm's law and can, in turn, be correlated to an amount of strain experienced by one or more of the multiple strain-sensitive electrodes.

In many cases, differential property estimates can be combined with or compared to common property estimates. In some examples, the differential property estimate and common property estimate can be combined by unweighted or weighted averaging. In other embodiments, the maximum or minimum of the two estimates can be used. In still further examples, other methods of combining or deciding between the two estimates can be used.

In other cases, an actual calculation of resistance for each independent electrode may not be required. For example, in certain embodiments, an estimated voltage or current (e.g., from a common property estimate, differential property estimate, or both) can be correlated directly to an amount of strain experienced by the force-sensitive structure.

Once the resistance of each electrode is obtained via calculation or estimate, each can be compared to a known baseline resistance value in order to estimate whether the strain-sensitive electrodes are experiencing tension or compression. In other words, when the force-sensitive structure experiences an application of force (e.g., as a result of applying a force to the input surface), it may deform, causing one or more strain-sensitive electrodes to either expand (e.g., tension) or contract (e.g., compression), which can cause the resistance thereof to change in a mathematically predictable manner.

The foregoing description of the embodiments depicted in FIGS. 4K-4M, and various alternatives and variations, are presented, generally, for purposes of explanation, and to facilitate a general understanding of possible placements of strain-sensitive electrodes relative to cantilevered legs of force-sensitive structures as described with respect to stylus embodiments disclosed herein. However, it will be apparent to one skilled in the art that some of the specific details presented herein may not be required in order to practice a particular described embodiment, or an equivalent thereof.

For example, it is understood that, although these and other embodiments are described herein with reference to strain-sensitive electrodes, any force-sensitive and/or strain-sensitive element can be included for particular embodiments. Similarly, a cantilevered leg can take any suitable shape.

Figure 5A:
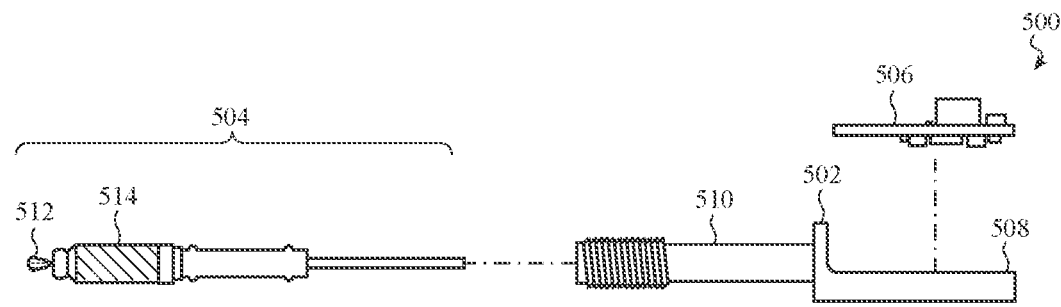
FIG. 5A depicts a side assembly view of a coordination engine of a stylus, particularly showing a signal conduit disposed within a hollow portion of a tubular and rigid electromagnetic shield.
Figure 5B:
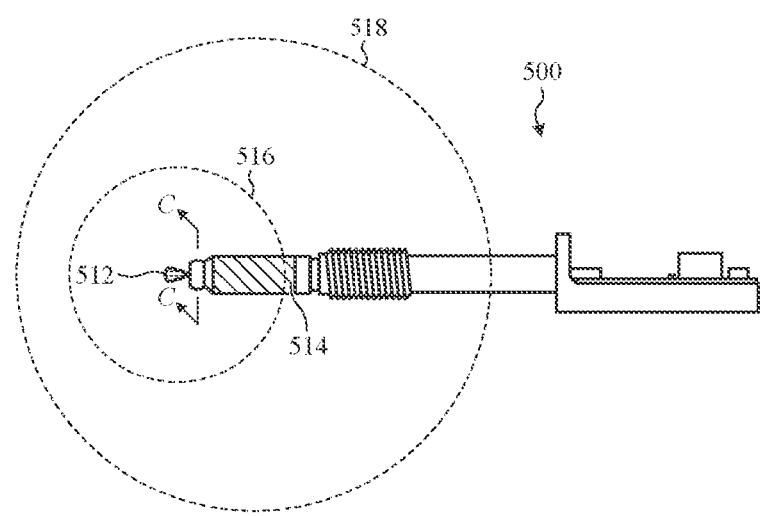
FIG. 5B depicts an assembled view of the coordination engine of FIG. 5A, particularly illustrating electric fields that may be generated at different field strengths from offset point sources of the coordination engine of FIG. 5A.
Figure 5C:
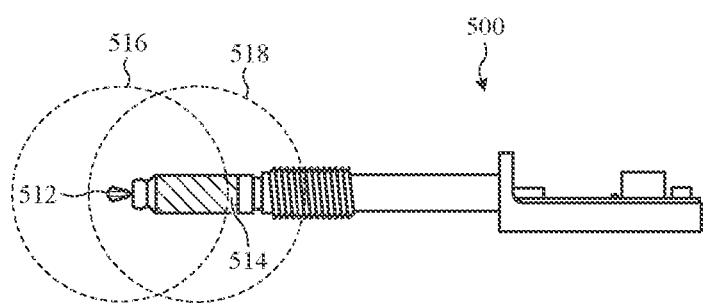
FIG. 5C depicts the coordination engine of FIG. 5B, particularly illustrating example electric fields that may be generated at similar field strengths from offset point sources of the coordination engine of FIG. 5A.
Figure 5G:
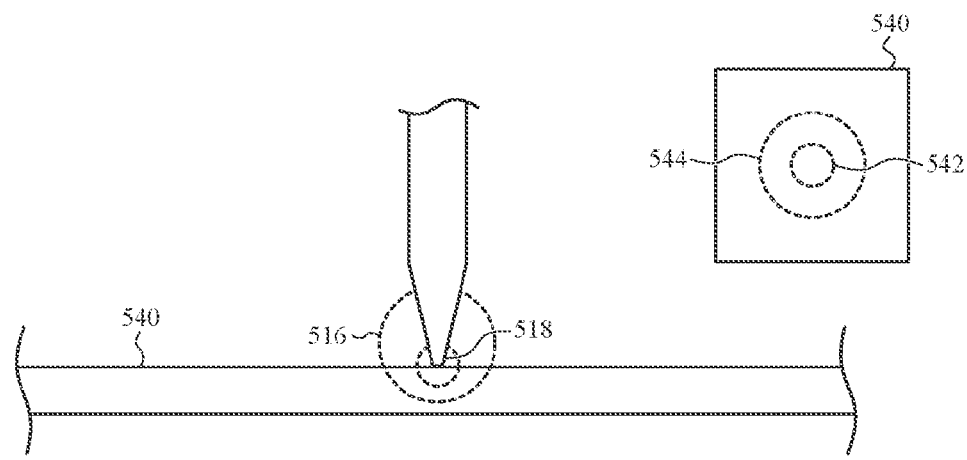
FIG. 5G depicts a side view and a top view of a stylus oriented normal to an input surface of an electronic device, the stylus configured to generate a tip field and a ring field of different magnitudes from a tip end of the stylus, each field intersecting the plane of the input surface and defining a tip field intersection area and a ring field intersection area.
Figure 5H:
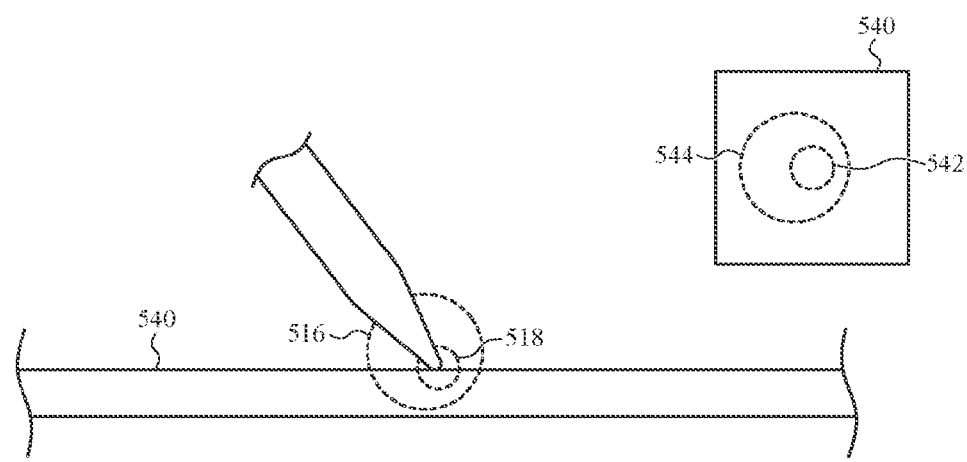
FIG. 5H depicts a side view and a top view of the stylus of FIG. 5G, particularly illustrating the relative position of the tip field intersection area and the ring field intersection area when the stylus is oriented at an angle relative to the plane of the input surface of the electronic device.
Figure 5I:
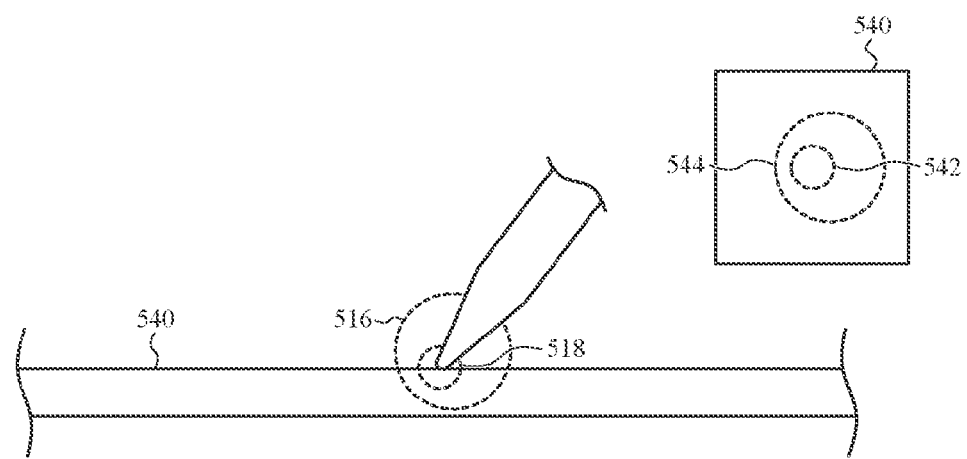
FIG. 5I depicts a side view and a top view of the stylus of FIG. 5G, particularly illustrating the relative position of the tip field intersection area and the ring field intersection area when the stylus is oriented at a different angle relative to the plane of the input surface of the electronic device.
Figure 5J:
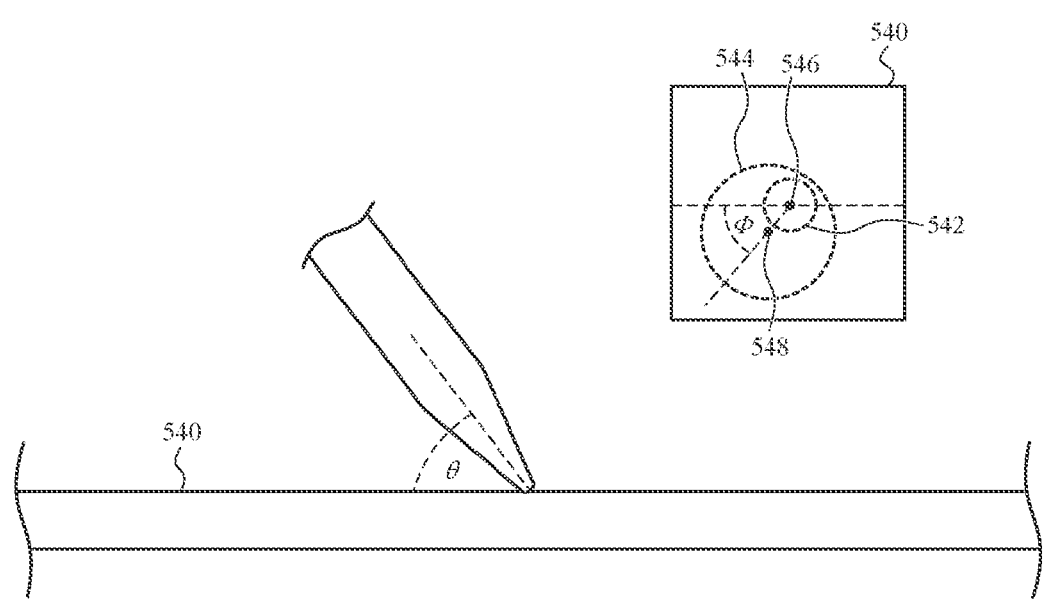
FIG. 5J depicts a side view and a top view of the stylus of FIG. 5G, particularly illustrating the azimuthal angle and polar angle of the stylus relative to the plane of the input surface of the electronic device.
Figure 5K:
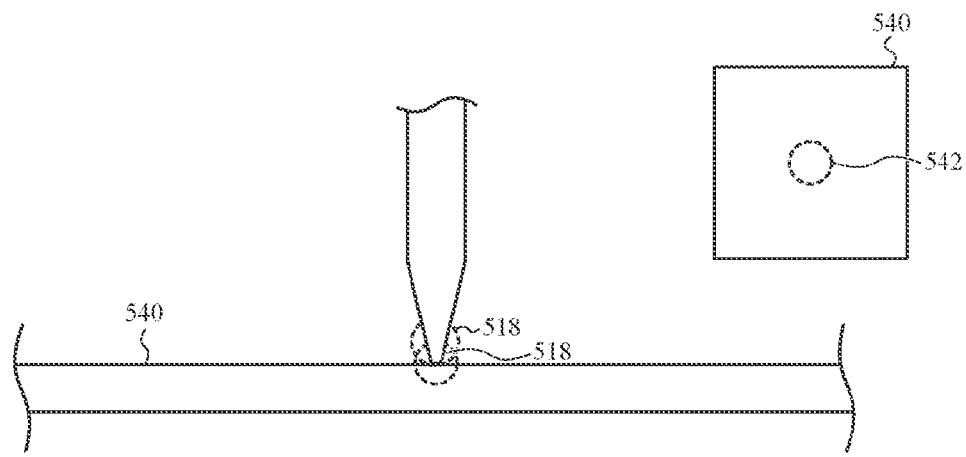
FIG. 5K depicts a side view of a stylus generating a tip field and a ring field of similar magnitudes from a tip end of the stylus, the fields each intersecting an input surface of an electronic device, particularly illustrating the relative position of a tip field intersection area and a ring field intersection area when the stylus is oriented normal relative to the plane of the input surface of the electronic device.
Figure 5L:
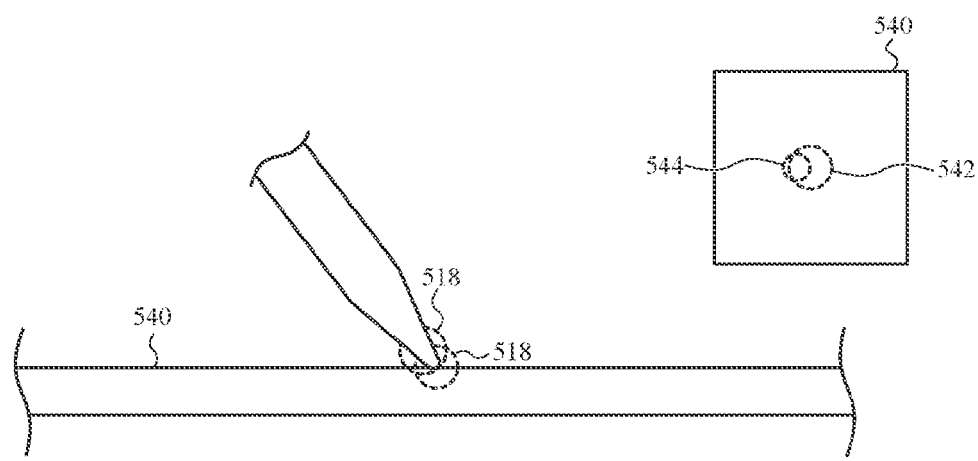
FIG. 5L depicts the stylus of FIG. 5K, particularly illustrating the relative position of the tip field intersection area and the ring field intersection area when the stylus is oriented at an angle relative to the plane of the input surface of the electronic device.
Figure 5M:
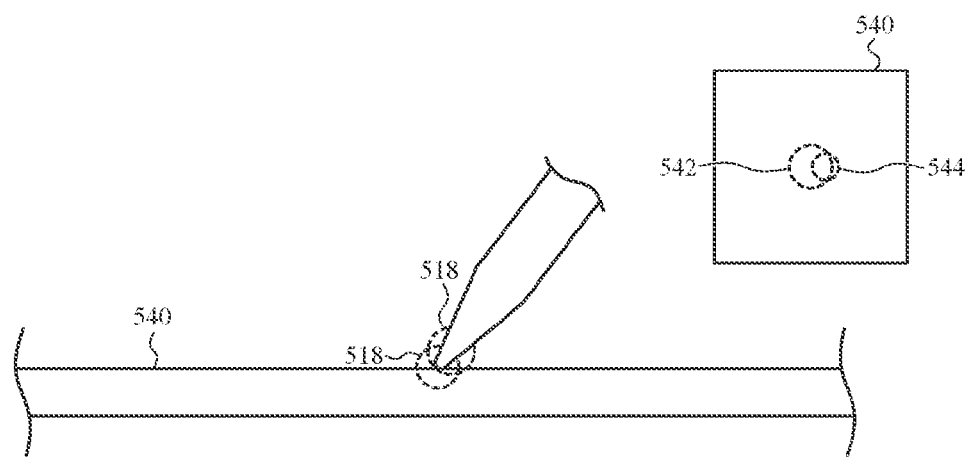
FIG. 5M depicts the stylus of FIG. 5K, particularly illustrating the relative position of the tip field intersection area and the ring field intersection area when the stylus is oriented at a different angle relative to the plane of the input surface of the electronic device.
Figure 5N:
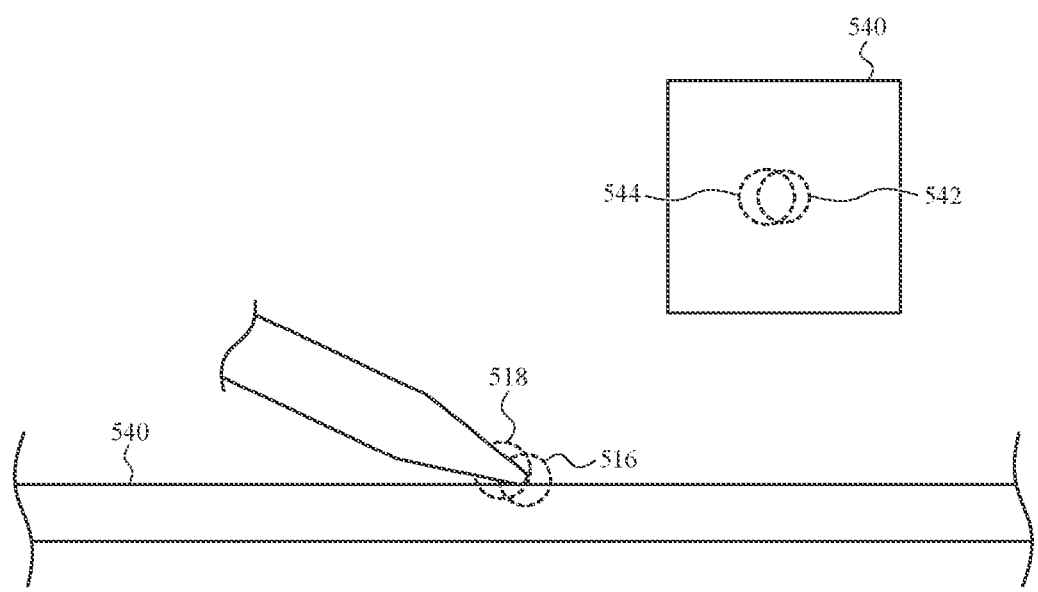
FIG. 5N depicts the stylus of FIG. 5K, particularly illustrating the relative position of the tip field intersection area and the ring field intersection area when the stylus is oriented at an angle that is nearly parallel to the plane of the input surface of the electronic device.

Generally and broadly, FIGS. 5A-5N reference different embodiments of a rigid signal conduit of a coordination engine of a stylus such as described herein. A user manipulates the stylus to change the relative locations of a tip field and a ring field. An electronic device calculates the relative positions of the fields and, in response, locates and estimates the angular position of the stylus.

For example, FIG. 5A depicts a side view of a portion of a coordination engine 500 of a stylus. As with the embodiment described with respect to FIG. 3A, the coordination engine 500 includes a tubular shield 502 configured to receive a core insert 504 therein. The tubular shield 502 has a tray section 506 into (or onto) which a control board 508 can be positioned. The tubular shield 502 has a hollow portion 510 into which the core insert 504 is placed.

The core insert 504 may be configured to convey electrical signals received from the control board 508 to a tip-field generator 512 and a ring-field generator 514. In some embodiments, a ground ring 513 can be disposed between the tip-field generator 512 and the ring-field generator 514. The ground ring 513 can help prevent capacitive coupling between the tip-field generator 512 and the ring-field generator 514.

The core insert 504 may be a shielded signal path; one or more signal paths within the core insert 504 can be shielded from the other signal paths in order to prevent capacitive coupling therebetween.

When assembled and operating, the tip-field generator 512 may generate and/or emit the tip field 516, and the ring-field generator 514 may generate and/or emit the ring field 518. The tip field 516 and the ring field 518 can be generated at different powers, such as shown in FIG. 5B in which the ring field 518 is generated at a higher power than the tip field 516. In other cases, the tip field 516 and the ring field 518 are generated at substantially the same power, such as shown in FIG. 5C.

The tip-field generator 512 may be configured to generate an electric field (e.g., the ring field) that is approximately spherical in nature when estimated from a particular distance. In other words, the tip-field generator 512 may function, substantially, as an electric field point source.

In the illustrated embodiment, the ring-field generator 514 takes the shape of a closed ring through which the tip signal line passes. In this manner, the ring-field generator 514 may not interfere with the tip signal, and both the ring field 518 and the tip field 516 may be substantially spherical and coaxially aligned, such as illustrated in FIG. 5B.

The ring-field generator 514 generates the ring field 518. The ring-field generator 514 can be formed in any number of suitable shapes such as, but not limited to: a cylindrical shape (e.g., such as shown), a crown shape, a series of rings, a distribution of lines (e.g., Fibonacci sequence of lines and/or rings), and so on.

Despite the annular shape of the ring-field generator 514, the ring field 518 is substantially spherical in many embodiments. More specifically, as may be appreciated by a person of skill in the art, an electric field generated by a ring-shaped element can be modeled by the equation:

$$E = \frac{k \cdot Q \cdot a}{(r^2 + a^2)^{\frac{3}{2}}} \qquad \text{Equation 1}$$

The equation above describes the magnitude of the electric field E, when estimated from a distance a from the geometric center of the ring-shaped element having a radius r to which a charge Q is applied. As may be known, Coulomb's constant k provides a scaling factor and unit correction in order to accurately estimate the electric field E.

When the distance a from the geometric center of the ring-shaped field generator is much larger than the radius r, the electric field E is approximately equal to:

$$E \cong \frac{k \cdot Q}{a^2}, a \gg r \qquad \text{Equation 2}$$

Therefore, for embodiments in which the distance between the ring-field generator 514 and an input surface of an electronic device is greater than the radius of the ring-field generator 514, the ring field 518 may appear to be substantially spherical to an input surface, despite that the ring-field generator 514 is not, at least geometrically, a point source.

In other words, for many embodiments, the radius of the ring-field generator 514 is selected to be smaller than the distance from the ring-field generator 514 to the input surface. In this manner, the ring field 518 appears to an input surface as a substantially spherical electric field generated by a point charge. In this manner, both the tip field 516 and the ring field 518 are substantially spherical, at least in the direction of the tip of the stylus.

However, although many embodiments are described herein with reference to coaxially aligned spherical fields generated by a stylus that are detected by generally circular groupings of sensors within an electronic device, such a configuration may not be required of all embodiments. In some examples, the ring field generated by a ring-field generator can take a non-spherical shape. For example, a ring-field generator can be configured to generate a substantially conical shape. In this example, the ring field intersection area may be a conic section (e.g., hyperbola, ellipse, circle, and so on). In other examples, a ring-field generator can be configured to generate more than one electric field. For example, a ring-field generator can be configured to generate four substantially conical electric fields, each evenly spaced from one another. The conical electric fields may alternate in polarity or may be associated with different ring signals so that adjacent conical electric fields do not interfere with one another. In this example, the ring field intersection area may be a series of conic sections (e.g., hyperbola, ellipse, circle, and so on). It is therefore appreciated that any suitable electric field shape, or series of electric field shapes, can be generated by a ring-field generator of a particular embodiment.

FIG. 5D depicts a cross-section of the core insert 504 of the coordination engine 500, taken through section line C-C of FIG. 5B. As noted above, the core insert 504 includes a signal line dedicated to conveying the tip signal to the tip-field generator 512 (the tip signal line) and another signal line dedicated to conveying the ring signal to the ring-field generator 514 (the ring signal line). In addition, one or more grounding layers, sheaths, or other structures can enclose the ring signal line within the ring-field generator 514. Thus, generally and broadly, the core insert 504 includes several sets of conductors that are configured to transmit one or more electrical signals therethrough.

The tip-field generator 512 can be formed from any number of suitable electrically conductive materials. In some examples, the tip-field generator 512 is formed from metal or a metallized material. In other cases, the tip-field generator 512 is formed from an electrically conductive polymer or fiber such as an electrically-conductive silicone or an electrically-conductive nylon. In some cases, the tip-field generator 512 is formed from a single material, whereas in other embodiments the tip-field generator 512 is formed from more than one material. In some cases, the tip-field generator 512 is rigid, whereas in other cases, the tip-field generator 512 may be at least partially compliant and/or flexible. In one example, the tip-field generator 512 may be implemented as a pogo pin that is at least partially collapsible. The pogo pin can include a spring and two or more interlocking slidable members. Example embodiments of the tip-field generator 512 are described with reference to FIGS. 6A-6G.

The tip-field generator 512 may be formed into the shape of an inverted bulb. A rounded end of the bulb is oriented toward the tip end of the stylus. The rounded end can take a substantially spherical shape or, in other embodiments, a substantially hemispherical shape. A root end of the bulb is oriented to extend into the interior of the stylus. The rounded end of the bulb may be configured to act as an electric field point source. In other words, the rounded end of the bulb may be formed into a shape that may generate a substantially spherical electric field therefrom. In many cases, the root end of the bulb of the tip-field generator 512 decreases in diameter away from the rounded end of the bulb shape. The decrease in diameter can be constant, stepped, or may follow a mathematical function such as an exponential decay function.

The ring-field generator 514 can be formed from any number of suitable electrically conductive materials. In some examples, the ring-field generator 514 is formed from metal. In other cases, the ring-field generator 514 is formed from a deposited electrically conductive material, such as a metal-oxide or a metal powder.

The ring-field generator 514 can be formed in any suitable manner. In many cases, many examples (and as illustrated), the ring-field generator 514 is disposed on an exterior surface of the core insert 504. The ring-field generator 514 can be disposed onto the external surface of the core insert 504 using any number of suitable manufacturing techniques, including, but notlimited to: physical vapor deposition, pulsed laser deposition, self-adhering conductive film, metallic leafing techniques, metallic plating techniques, and so on. In some embodiments, the ring-field generator 514 is formed using a laser direct structuring technique and formed directly on the outer surface of the core insert 504.

The ring-field generator 514 may be coupled to the ring signal line in any electrically suitable manner. In one example, a via 520 through the core insert 504 connects the ring signal line to the ring-field generator 514, which can terminate in a standoff electrode 522. In many cases, the via 520 takes a notched (e.g., inverted conical) shape. The via 520 connects the standoff electrode 522 to the ring-field generator 514. An electrical connection 520a traversing the via 520 can be disposed onto the external surface of the core insert 504 or an internal sidewall of the via 520 using any number of suitable manufacturing techniques, including, but notlimited to: physical vapor deposition, pulsed laser deposition, laser direct structuring, self-adhering conductive film, metallic leafing techniques, metallic plating techniques, and so on. In some cases, the via 520 can be completely filled with a metal material, although this may not be required.

As noted with the embodiment depicted in FIG. 3A, the tip signal line terminates in a contact pad 524 at an end of the core insert 504. In these embodiments, the contact pad 524 can couple to the tip-field generator 512 in any electrically-suitable manner.

As noted with respect to other embodiments described herein (and as illustrated), the tip-field generator 512 and the ring-field generator 514 are co-axially aligned along the length of the core insert 504 so that the tip field 516 and the ring field 518 are axially aligned and are axially symmetric. As may be appreciated, the spherical nature of the tip field 516 and the ring field 518, of many embodiments, facilitate the operations of locating the stylus on an input surface and, additionally, estimating the angular position of thereof.

The core insert 504 can be constructed in a number of ways. For example, with particular reference to FIG. 5E which shows a cross-section of the core insert 504 when taken through line D-D, the core insert 504 can include a multi-layer circuit board 526 that is disposed within a dielectric bulk 528. For simplicity of illustration, the layers of the multi-layer circuit board 526 are omitted from FIGS. 5D-5E, but it may be appreciated that the multi-layer circuit board 526 can have any suitable number of layers, oriented in any suitable manner. In one example, the multi-layer circuit board 526 has eight layers.

The dielectric bulk 528 is typically formed from plastic or another suitable electrically insulating material. For increased rigidity, the dielectric bulk 528 can be doped with a fiber material, such as glass.

In many examples, the via 520 can be defined during the molding of the dielectric bulk 528 and the multi-layer circuit board 526. For example, the multi-layer circuit board 526 may be held within a mold by a support that, when removed after molding, defines the via 520.

The multi-layer circuit board 526 can include any number of suitable components disposed at any particular and suitable location along the length of the multi-layer circuit board 526. For example, the multi-layer circuit board 526 can include (and/or can be coupled to) one or more electrical circuit components (not shown) such as, but not limited to: processors, resistors, capacitors, inductors, transistors, signal lines, ground lines, ground connections, and the like. In many embodiments, the components that are coupled to the multi-layer circuit board 526 are laid out and distributed in a manner that reduces and/or eliminates parasitic capacitance. Particularly, the layout of the components of the multi-layer circuit board 526 may be selected so as to reduce or eliminate cross-talk (e.g., parasitic mutual capacitance) between a tip signal line 530 and a ring signal line 532. This may be particularly desirable to prevent the ring signal from being detected by the electronic device as a result of the tip field and, similarly, to prevent the tip signal from being detected by the electronic device as a result of the ring field.

For example, as illustrated, the tip signal line 530 is separated and isolated from the ring signal line 532 by several ground signal lines 534. In this embodiment, six independent ground signal lines separate, both physically and electrically, two tip signal lines (each identified as the tip signal line 530) and two ring signal lines (each identified as the ring signal line 532). In this manner, the several ground signal lines 534 provide electrical isolation between the ring signal line(s) and the tip signal line(s).

In many cases, the external surface area of the various signal lines passing through the multi-layer circuit board 526 can also be selected so as to reduce the possibility of the development of parasitic capacitance. Particularly, the ground signal line(s), tip signal line(s), and ring signal line(s) can all be relatively thin; the greater the outer surface area of any of the signal lines, the greater the change that parasitic capacitance may develop. In many embodiments, such as the illustrated embodiment, each signal can be conveyed over more than one signal line (e.g., two signal lines convey the ring signal, two signal lines convey the tip signal, six signal lines are grounded) so that the signals are received at the tip-field generator 512 and the ring-field generator 514 without substantial resistive losses resulting from the thinness of a single signal line.

As may be appreciated, although the illustrated embodiment depicts six ground lines separating two ring signal lines and two tip signal lines, such quantities are not required of all embodiments. In some cases, more signal lines or fewer signal lines can be included. In some cases, signal lines that convey the same signal can be connected together at various points along the length of the multi-layer circuit board 526 by one or more vias (not shown).

As noted above, a contact pad 524 is disposed at an end of the core insert 504. In many cases, the contact pad 524 is soldered to the end of the core insert 504. In other cases, the contact pad 524 is formed onto the end of the core insert 504 by a suitable process, such as, but not limited to: physical vapor deposition, pulsed laser deposition, laser-direct structuring, self-adhering conductive film, metallic leafing techniques, metallic plating techniques, and so on.

The multi-layer circuit board 526 of the core insert 504 can terminate with an in-fill section (not labeled) in which a number of vias electrically couple several layers of the multi-layer circuit board 526 to the same electrical circuit or signal line. In many embodiments, each of the vias and signal lines are electrically coupled to the tip signal line 530. For example, FIG. 5F depicts a cross-section of the core insert 504 taken through line E-E of FIG. 5D, along the in-fill section. For clarity, the contact pad 524 is not shown in FIG. 5F.

During manufacturing, the multi-layer circuit board 526 can be cut through the in-fill section, thereby causing one or more vias 536 and one or more signal lines 538a, 538b to be exposed. The one or more signal lines 538a, 538b can be parallel or perpendicular to the length of the multi-layer circuit board 526. In other examples, the signal lines can be oriented in another manner, such as along an angle. In this manner, the exposed vias and signal lines (which are coupled to the tip signal line 530) exhibit a large total electrically-conductive surface area when cut. This large area can couple to (or serve as a portion of) the contact pad 524 using any suitable method. The increased surface area provides for a more mechanically and electrically sound coupling between the tip signal line 530 and the contact pad 524.

In some embodiments, the contact pad 524 may not be required; the exposed areas of the in-fill region can serve to convey the tip signal to the tip-field generator 512. In other cases, the contact pad 524 can be a deposit of electrically conductive material that is disposed onto the exposed areas of the in-fill region.

The length of the in-fill region of the core insert 504 can vary from embodiment to embodiment and may depend upon manufacturing tolerance that may be achieved when manufacturing the core insert 504. For example, the in-fill region can be long (e.g., extend for a certain distance inwardly through the length of the multi-layer circuit board 526) if a particular implementation is manufactured with low tolerances. In other cases, the in-fill region can be short if a particular implementation is manufactured with high tolerance. It may be appreciated, similarly, that the number and density of vias can vary from embodiment to embodiment, Similarly, the number and density of signal lines (however oriented) can also vary from embodiment to embodiment.

Next, reference is made to FIGS. 5G-5I, in which a side view of a stylus generating a tip field 516 and a ring field 518 (of different magnitudes) that each intersect an input surface 540 of an electronic device is shown. Particularly, these figures illustrate (additionally and supplemented by a removed top view), the relative position of a tip field intersection area 542 and a ring field intersection area 544 when the stylus tilts across the input surface.

FIG. 5G depicts the relative position of the tip field intersection area 542 and the ring field intersection area 544 when the stylus is oriented normal to the input surface 540. Particularly, the tip field intersection area 542 and the ring field intersection area 544 are coaxially aligned.

FIG. 5H depicts the relative position of the tip field intersection area 542 and the ring field intersection area 544 when the stylus is oriented at an acute polar angle (e.g., tilting to the left) to the input surface 540. Particularly, the tip field intersection area 542 remains in substantially the same position as depicted in FIG. 5G; however, the ring field intersection area 544 shifts to the left.

FIG. 5I depicts the relative position of the tip field intersection area 542 and the ring field intersection area 544 when the stylus is oriented at an acute polar angle (e.g., tilting to the right) to the input surface 540. Particularly, the tip field intersection area 542 remains in substantially the same position as depicted in FIG. 5G, however, the ring field intersection area 544 shifts to the right.

The operation of locating the stylus based on the location of the tip field intersection area and the ring field intersection area can be completed as follows, although it is appreciated that the embodiment presented below is merely one of many methods and techniques that may be employed in the course of locating a stylus by an electronic device. Similarly, it is appreciated that the equations and techniques presented below are merely examples, and many methods and equations related or unrelated to those presented below may be employed in the course of locating a stylus such as described herein.

FIG. 5J depicts the stylus of FIG. 5G, particularly illustrating the azimuthal angle $\phi$ and polar angle $\theta$ of the angular position of the stylus relative to the plane of the input surface of the electronic device.

In these embodiments, generally and broadly, the electronic device scans a number of sensors associated with the input surface 540 for the tip signal. Upon estimating that a group of adjacent sensors all detect the presence of the tip signal, the electronic device can estimate the geometric center of said group. As noted above, the group of adjacent sensors typically takes the shape of a circle. The electronic device thereafter records the coordinates of the geometric center of the group relative to an origin point of the input surface 540 as a proxy for the location of the tip-field generator, and, more generally, the point at which the tip portion of the stylus touches the input surface 540. For example, the geometric center $(x_c, y_c)$ of a circle having a radius r in the Cartesian coordinate system can be estimated by substituting at least two estimated points $(x_{m1}, Y_{m1})$ and $(X_{m2}, y_{m2})$ that fall on the circumference of the circle into a system of equations:

$$\begin{cases} r^2 = (x_{m1} - x_c)^2 + (y_{m1} - y_c)^2 \\ r^2 = (x_{m2} - x_c)^2 + (y_{m2} - y_c)^2 \end{cases} \qquad \text{Equation 3}$$

The system of equations presented above are solvable; the only two unknown variables are the coordinates of the geometric center $(x_c, y_c)$. In this manner, the electronic device can determine the location of the stylus on the input surface 540 by calculating the geometric center 546 of the tip field intersection area 542.

The operation of determining the angular position (e.g., the azimuthal angle $\phi$ and the polar angle $\theta$) of the stylus based on the location of the tip field intersection area 542 and the ring field intersection area 544 can be completed as follows, although it is appreciated that the embodiment presented below is merely one of many methods and techniques that may be employed in the course of determining the angular position of a stylus by an electronic device.

For example, if the Cartesian coordinates of the geometric center 546 of the tip field intersection area 542 are $(x_t, y_t)$ and the Cartesian coordinates of the geometric center 548 of the ring field intersection area 544 are $(x_r, y_r)$, and the distance separating the tip-field generator 512 and the ring-field generator 514 is d, then one method of estimating the polar angle θ of the stylus can be modeled or approximated by:

$$\theta \cong \cos^{-1}\left(\frac{\sqrt{(x_t - x_r)^2 + (y_t - y_r)^2}}{d}\right) \quad \text{Equation 4}$$

In this case, when the distance between the centers of the tip field intersection area 542 and the ring field intersection area 544 are approximately equal to the distance separating the tip-field generator and the ring-field generator (e.g., the stylus is as flat as possible on the input surface), the inverse cosine operation results in a polar angle θ that approaches 0 radians.

Alternatively, when the distance between the centers of the tip field intersection area 542 and the ring field intersection area 544 are approximately equal to zero (e.g., the stylus is normal to the input surface), the inverse cosine operation results in a polar angle θ that approaches $$\frac{\pi}{2}$$

radians, or ninety degrees.

Similarly, an azimuthal angle φ of the stylus can be calculated. As may be appreciated, an azimuthal angle φ can be estimated with reference to any suitable vector quantity, such as a reference vector $\vec{v}_x$ that is parallel to a horizontal axis (e.g., the x axis) of a Cartesian coordinate system. It may be appreciated that any suitable reference vector that is parallel to the plane of the input surface 540 can be chosen. For example, in some cases, a reference vector $\vec{v}_y$ may be used that is parallel to a vertical axis (e.g., the y axis) of a Cartesian coordinate system. In another example, an arbitrarily angled reference vector can be used.

A stylus vector, $\vec{v}_m$, defined through the center of the tip field intersection area 542 $(x_t, y_t)$ and the center of the ring field intersection area 544 $(x_r, y_r)$, can be input to the cosine formula for dot product in order to estimate the angle between stylus vector and the axis vector. For example, the operation can be performed by the following equation:

$$\phi = \cos^{-1}\left(\frac{\vec{v}_x \cdot \vec{v}_m}{\|\vec{v}_x\| \cdot \|\vec{v}_m\|}\right) \quad \text{Equation 5}$$

In this case, when the horizontal distance between the geometric centers 546, 548 of the tip field intersection area 542 and the ring field intersection area 544 are approximately equal to zero (e.g., the stylus, regardless of the polar angle θ, is substantially parallel to a vertical axis of the input surface), the inverse cosine operation results in an azimuthal angle φ that approaches $$\frac{\pi}{2}$$

radians, or ninety degrees.

Alternatively, when the vertical distance between the centers of the tip field intersection area 542 and the ring field intersection area 544 are approximately equal to zero (e.g., the stylus, regardless of the polar angle θ, is substantially parallel to a horizontal axis of the input surface), the inverse cosine operation results in an azimuthal angle φ that approaches 0 radians, or 0 degrees.

In still further embodiments, tip fields and ring fields can be generated in another manner. For example, FIGS. 5K-5M depict a side view of a stylus generating a tip field 516 and a ring field 518 (of the same magnitudes) that each intersect an input surface 540 of an electronic device. Particularly, these figures illustrate (additionally and supplemented by a removed top view), the relative position of a tip field intersection area 542 and a ring field intersection area 544 when the stylus tilts across the input surface.

FIG. 5K depicts the relative position of the tip field intersection area 542 and the ring field intersection area 544 when the stylus is oriented normal to the input surface 540. Particularly, the tip field intersection area 542 and the ring field intersection area 544 are coaxially aligned. In this example, the ring field intersection area 544 may not be detectable.

FIG. 5L depicts the relative position of the tip field intersection area 542 and the ring field intersection area 544 when the stylus is oriented at an acute polar angle (e.g., tilting to the left) to the input surface 540. Particularly, the tip field intersection area 542 remains in substantially the same position as depicted in FIG. 5K, however, the ring field intersection area 544 shifts to the left.

FIG. 5M depicts the relative position of the tip field intersection area 542 and the ring field intersection area 544 when the stylus is oriented at an acute polar angle (e.g., tilting to the right) to the input surface 540. Particularly, the tip field intersection area 542 remains in substantially the same position as depicted in FIG. 5K, however, the ring field intersection area 544 shifts to the right. In further examples, the ring field intersection area 544 can increase in size as the polar angle of the stylus decreases, such as shown in FIG. 5N.

Generally and broadly, FIGS. 6A-6E reference different embodiments of a nosepiece and tip-field generator of a stylus such as described herein. The nosepiece can be removable, interchangeable, or permanently affixed to the stylus. As with other embodiments described herein, a user slides the nosepiece across the input surface of an electronic device, thereby changing the location of the tip field generated by the tip-field generator disposed within the nosepiece. It may generally be advantageous that the nosepiece provide a durable and non-damaging contact with the input surface while also securing the tip-field generator in an accurate and repeatable position with respect to the input surface.

Figure 6A:
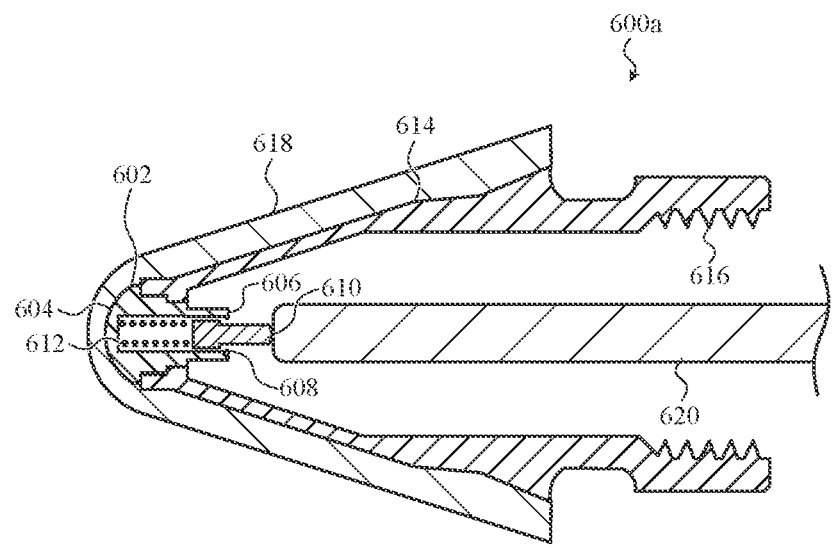
FIG. 6A depicts a cross-section of a nosepiece of a stylus, specifically depicting one example of a tip-field generator integrated within the nosepiece.

FIG. 6A depicts a cross-sectional view of a nosepiece 600a of a stylus, specifically depicting one example of a tip-field generator 602. The tip-field generator 602 is implemented as a bulb-shaped pogo pin formed from a conductive material. The bulb of the tip-field generator 602 includes a rounded portion 604 and a root portion 606.

The rounded portion 604 of the bulb of the tip-field generator 602 is formed to take a substantially hemispherical shape. Thus, the electric field generated thereby (and oriented, generally, in the direction the rounded portion 604 faces) is substantially spherical.

The root portion 606 of the bulb of the tip-field generator 602 is formed to taper away from the rounded portion 604. In the illustrated embodiment, the root portion 606 tapers by following a stair-step pattern, although this may not be required of all embodiments. For example, the root portion 606 of the bulb can taper linearly or by following an exponential decay function.

At the end of the root portion 606 that is opposite the rounded portion 604 of the bulb, the root portion 606 includes a retaining lip 608. The retaining lip 608 may be configured to retain a pin 610 of the tip-field generator 602 within a cavity defined in the tip-field generator 602. A biasing spring 612 may be configured to bias the pin 610 in a direction opposite the rounded portion 604 of the bulb. The pin 610 is configured to maintain electrical contact with one or more conductive traces formed into the end of the rigid signal conduit 620. In some embodiments, a conductive paste or conductive medium is placed between the pin 610 and the rigid signal conduit 620 to facilitate an electrical conduction and minimize parasitic capacitance at the interface between the two components.

In some examples, the rigid signal conduit 620 can be serrated, textured, patterned, or otherwise non-planar at the end which interfaces the tip-field generator. These features of the rigid signal conduit 620 can increase the friction between the two elements, thereby preventing accidental electrical disconnections therefrom. In other cases, the serrations of the rigid signal conduit 620 can increase the surface area with which the pin 610 may contact the rigid signal conduit 620.

The rounded portion 604 of the tip-field generator 602 may be formed from a metal or other conductive material that is configured to produce the desired tip field. However, in some embodiments, the material of the rounded portion 604 may be too hard to slide across the input surface of the device without scratching or risking damage to the surface. Thus, the nosepiece 600a may include one or more layers of material that are configured to provide reliable, non-marking contact with the input surface and also maintain structural and dimensional integrity of the nosepiece 600a.

Figure 6B:
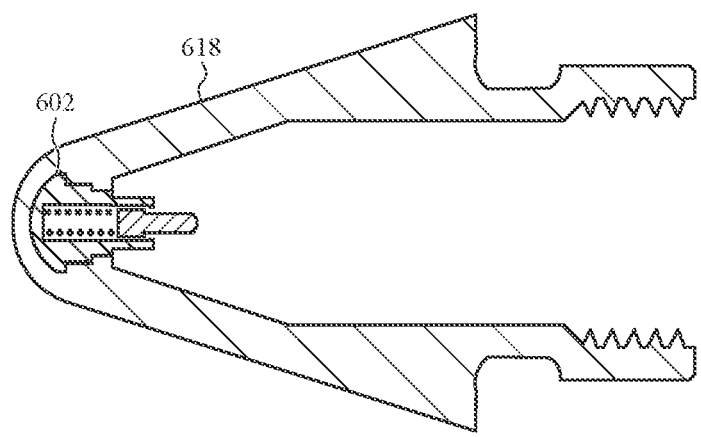
FIG. 6B depicts a cross-section of a nosepiece of a stylus, specifically depicting another example of a tip-field generator integrated within the nosepiece.

The nosepiece 600a may be formed from one or more layers of material that, in some embodiments, may have a hardness that is less than the material of the tip-field generator 602. The different layers of material confer different electrical or mechanical properties to the nosepiece 600a. In other cases, the nosepiece 600a is formed from a single material, such as depicted in FIG. 6B.

Returning to FIG. 6A, the nosepiece 600a can include a structural layer 614. The structural layer 614 is typically formed from a rigid, structurally enhanced material, such as glass-doped plastic, acrylic, fiber-reinforced plastic or polymer, metal, and the like. In some embodiments, the structural layer 614 is formed from a polyamide material including, for example, nylon, Zytel, Kevlar, Rilsan, or the like. The structural layer 614 can be formed with a threaded portion 616. The threaded portion 616 is configured to couple the nosepiece 600a to an electromechanical coupling and/or a tubular shield such as described herein. The nosepiece 600a may be a disposable, substitutable, or replaceable component.

The nosepiece 600a also includes an exterior layer 618. The exterior layer 618 is typically formed from a non-conductive material, such as plastic or nylon. While in some embodiments, the exterior layer 618 can be doped with a fiber material, such as glass for structural rigidity, in other embodiments, the exterior layer 618 is substantially free of fiber or other reinforcing material. An exterior layer 618 that is substantially free of fiber or other reinforcing material may be particularly suitable for contact with softer input surfaces or input surfaces with a delicate coating or surface treatment. In some cases, the hardness of the exterior layer 618 is selected to be lower than the hardness of an input surface of an electronic device. In some embodiments, the exterior layer 618 is formed from a softer polymer including, for example, low durometer nylon or other polyamide, polyether (e.g, Pebax), elastomer, and the like. The exterior layer 618 can be formed over the structural layer 614, with the structural layer 614, or entirely separately from the structural layer 614.

Generally and broadly, it is understood that the tip-field generator 602, the exterior layer 618, and the structural layer 614 can be manufactured together or separately using any suitable manufacturing process, such as, but not limited to: a two-shot molding process, a co-molding process, an overmolding process, an insert molding process, or any other suitable process. Such manufacturing processes may enable the exterior layer 618 and the structural layer 614 to be mechanically coupled using one or more undercut or interlocking features and may also reduce gaps or voids formed between the two layers. In some embodiments, one or both of the layers are overmolded directly onto the tip-field generator 602 using an insert-molding manufacturing process. In some cases, the exterior layer 618 can be painted or inked with a cosmetic (or functional) layer of pigmented material.

Figure 6C:
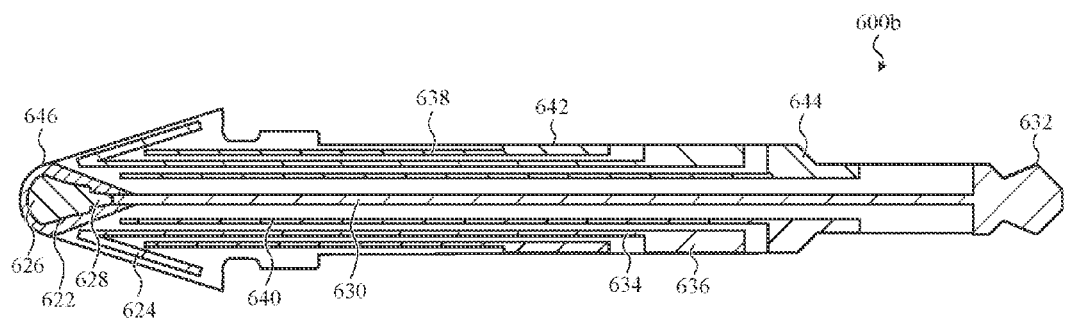
FIG. 6C depicts a cross-section of a nosepiece of a stylus, specifically depicting a tip-field generator and a ring-field generator integrated within the nosepiece.

In this manner, once assembled onto a stylus, the pin 610 of the tip-field generator 602 makes electrical contact to a rigid signal conduit 620 within the stylus. In other embodiments, a nosepiece of a stylus can be implemented in different ways. For example, FIG. 6C depicts a cross-section of a nosepiece of a stylus that includes both a tip-field generator and a ring-field generator.

The nosepiece 600b of the stylus is formed to take the shape of an axial electrical connection, such as that of a headphone connector or plug (e.g., tip-ring-sleeve or tip-ring-ring-sleeve connectors). The nosepiece 600b may be a disposable, substitutable, or replaceable component. The nosepiece 600b includes a tip-field generator 622 and a ring-field generator 624. In this embodiment, the nosepiece 600b takes a generally cylindrical shape, although this may not be required of all embodiments.

The tip-field generator 622 is implemented as a bulb-shaped insert. The tip-field generator 622 includes a rounded end 626 and a root end 628.

As with the pogo pin embodiment depicted in FIG. 6A, the rounded end 626 of the tip-field generator 622 is formed to take a substantially hemispherical shape. Thus, the electric field generated thereby (and oriented, generally in the direction the rounded end 626 faces) is substantially spherical.

The root end 628 of the tip-field generator 622 is formed to taper away from the rounded end 626. In the illustrated embodiment, the root end 628 tapers by following a stepped exponential decay pattern, although this may not be required of all embodiments.

At the tip of the root end 628 that is opposite the rounded end 626 of the tip-field generator 622, the root end 628 contacts a tip signal line 630. The tip signal line 630 is electrically connected to a ring signal contact 636 exposed at one end of the nosepiece 600b.

The nosepiece 600b also includes a ring-field generator 624. In the illustrated embodiment, the ring-field generator 624 is formed into a generally conical shape although this may not be required of all embodiments. The ring-field generator 624 is electrically coupled to a ring signal line 634 that itself may be coupled to a ring signal contact 636 exposed as a ring circumscribing the nosepiece 600b.

A first ground signal line 638 is disposed around both the tip signal line 630 and the ring signal line 634. A second ground signal line 640 is disposed between the tip signal line 630 and the ring signal line 634. In this manner, the first ground signal line 638 and the second ground signal line 640 provide electromagnetic shielding to both the tip signal line 630 and to the ring signal line 634. The first ground signal line 638 and the second ground signal line 640 terminate, respectively, in the first ground signal contact 642 and the second ground signal contact 644, each exposed as a ring circumscribing the nosepiece 600b.

Figure 6D:
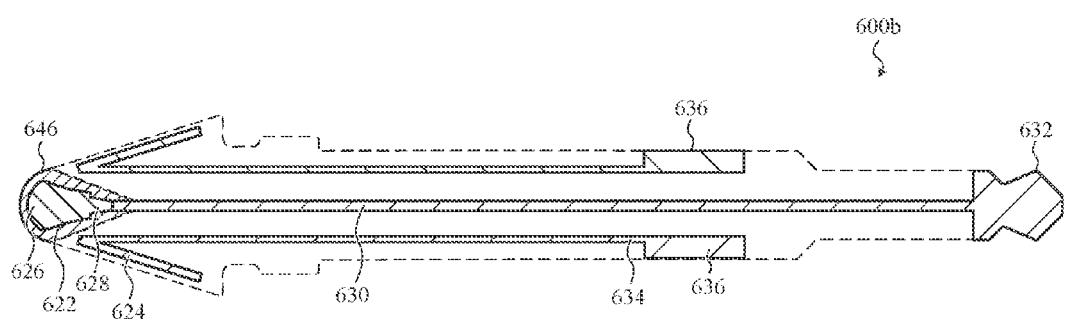
FIG. 6D depicts the nosepiece of FIG. 6C without grounding signal lines.
Figure 6E:
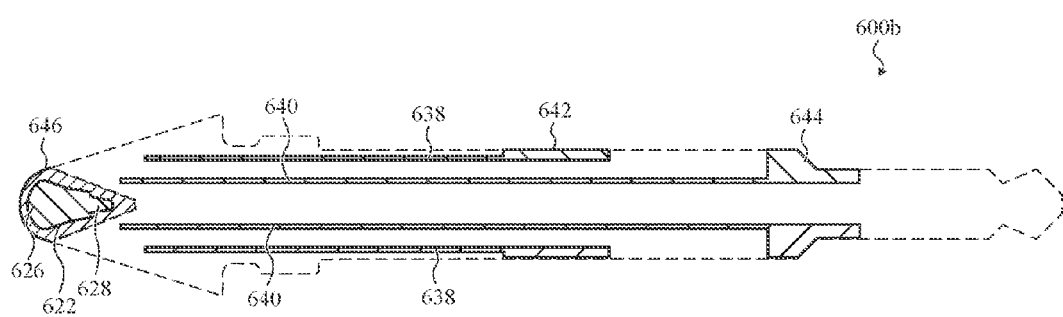
FIG. 6E depicts the nosepiece of FIG. 6C without tip signal lines or ring signal lines.

To facilitate a clear understanding of this embodiment, FIGS. 6D-6E are provided. FIG. 6D shows the nosepiece 600b without the first ground signal line 638 and the second ground signal line 640, more clearly showing the tip signal line 630 and the ring signal line 634. The body of the nosepiece 600b is presented in phantom. Similarly, FIG. 6E shows the nosepiece 600b without the tip signal line 630 and the ring signal line 634, more clearly showing the first ground signal line 638 and the second ground signal line 640. The body of the nosepiece 600b is presented in phantom.

As may be appreciated, the tip signal line 630, the ring signal line 634, the first ground signal line 638 and the second ground signal line 640, the tip signal contact 632, the ring signal contact 636, the first ground signal contact 642, and the second ground signal contact 644 are all formed from electrically conductive materials. The body of the nosepiece 600b is formed from an electrically insulating material.

In one embodiment, the tip-field generator 622 is molded within a nib 646 of the nosepiece 600b. The nib 646 is formed from an electrically-conductive plastic or polymer material. The hardness of the nib 646 may be selected to be lower than the hardness of an input surface of an electronic device. For increased rigidity, the nib 646 can be doped with a fiber material, such as glass.

The nib 646 can be formed from a material that is different from the material used to form a body of the nosepiece 600b, which can be formed from a rigid material, such as glass-doped plastic, acrylic, metal, and the like.

In many cases, the taper of the root end 628 is selected so that an effective bond between the nib 646 and the tip-field generator 622 is formed.

Generally and broadly, it is understood that the tip-field generator 622 and any other components depicted in the embodiments shown in FIGS. 6C-6E can be manufactured together or separately using any suitable manufacturing process, such as, but not limited to: a two-shot molding process, a co-molding process, an overmolding process, an insert molding process, or any other suitable process.

Figure 6F:
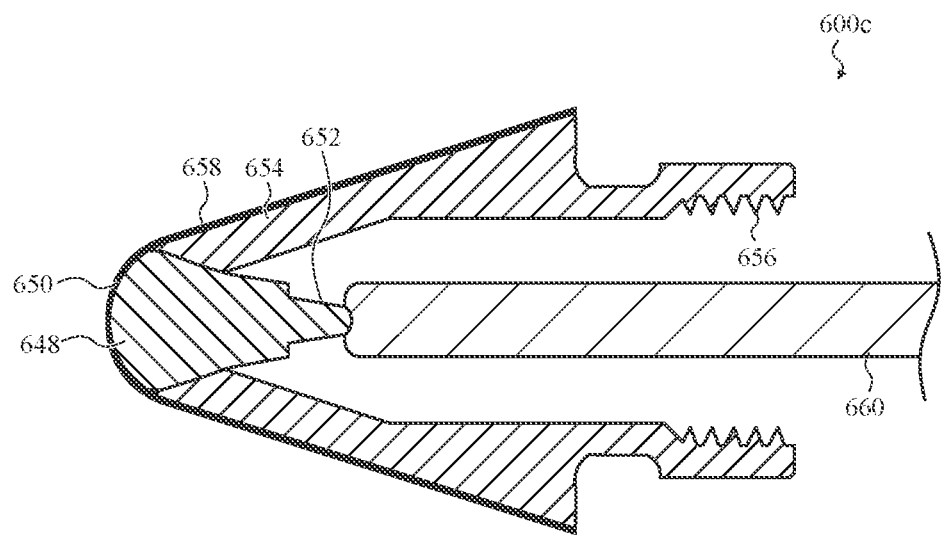
FIG. 6F depicts a cross-section of a nosepiece of a stylus, specifically depicting another example of a tip-field generator integrated within the nosepiece.

Other embodiments can take other configurations. FIG. 6F depicts a cross-section of a nosepiece 600c of a stylus, specifically depicting one example of a tip-field generator 648. The tip-field generator 648 is implemented as a bulb-shaped insert. As with other embodiments described herein, the bulb of the tip-field generator 648 includes a rounded portion 650 and a root portion 652.

The rounded portion 650 of the bulb of the tip-field generator 648 is formed to take a substantially hemispherical shape. Thus, the electric field generated thereby (and oriented, generally in the direction the rounded portion 650 faces) is substantially spherical.

The root portion 652 of the bulb of the tip-field generator 648 is formed to taper away from the rounded portion 650. In the illustrated embodiment, the root portion 652 tapers by following a stair-step pattern, although this may not be required of all embodiments. For example, the root portion 652 of the bulb can taper linearly or by following an exponential decay function. In many cases, the taper of the root portion 652 is selected so that an effective bond between the tip-field generator 648 and another element (e.g., structural layers and so on) is formed.

As with other embodiments described herein, the nosepiece 600c is formed from one or more layers of material. The different layers of material confer different electrical or mechanical properties to the nosepiece 600c. For example, the nosepiece 600c can include a structural layer 654. The structural layer 654 may be formed from a rigid material, such as glass-doped plastic, acrylic, metal, and the like. The structural layer 654 can be formed with a threaded portion 656. The threaded portion 656 may be configured to couple the nosepiece 600c to a coordination engine and/or a tubular shield such as described herein. In many cases, the taper of the root portion 652 is selected so that an effective bond between the structural layer 654 and the tip-field generator 648 is formed.

The nosepiece 600c also includes an ink layer 658. The ink layer 658 may be formed from a non-conductive paint. The hardness of the dried ink layer may be selected to be lower than the hardness of an input surface of an electronic device.

Generally and broadly, it is understood that the tip-field generator 648, the ink layer 658 and the structural layer 654 can be manufactured together or separately using any suitable manufacturing process, such as, but not limited to: a two-shot molding process, a co-molding process, an overmolding process, an insert molding process, or any other suitable process.

In this manner, once assembled onto a stylus, the root portion 652 of the tip-field generator 648 makes electrical contact to a rigid signal conduit 660 within the stylus. The nosepiece 600c may be a disposable, substitutable, or replaceable component.

The tip-field generator 648 can be made from any suitable electrically conductive material. For example, the tip-field generator 648 can be a conductive, polymer such as, but not limited to: conductive silicone, conductive nylon, polyaniline, polythiophene, polypyrrole, polyethylenedioxythiophene, and so on.

Figure 6G:
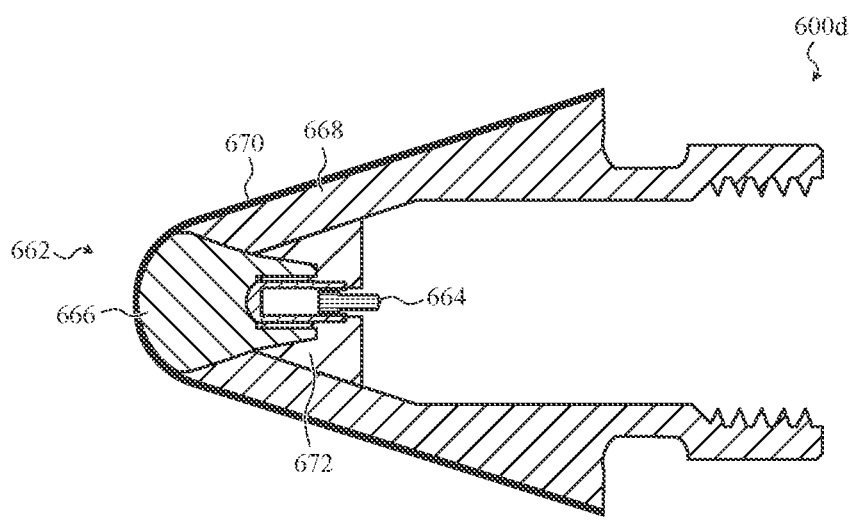
FIG. 6G depicts a cross-section of a nosepiece of a stylus, specifically depicting another example of a tip-field generator integrated within the nosepiece.

In still further embodiments, the tip-field generator 648 can be implemented in a different manner. For example, as shown in FIG. 6G, the tip-field generator 662 is formed by depositing an electrically conductive pogo pin 664 at least partially within an electrically conductive material 666. The electrically conductive material 666 can be an electrically conductive polymer or plastic. For increased rigidity, the electrically conductive material 666 can be doped with a fiber material, such as glass.

As with other embodiments described herein, the nosepiece 600d is formed from one or more layers of material. The different layers of material confer different electrical or mechanical properties to the nosepiece 600d. For example, the nosepiece 600d can include a structural layer 668. The structural layer 668 may be formed from a rigid material, such as glass-doped plastic, acrylic, metal, and the like. The structural layer 668 can be formed with a threaded portion configured to couple the nosepiece 600d to a coordination engine and/or a tubular shield such as described herein. The nosepiece 600d may be a disposable, substitutable, or replaceable component. An ink layer 670 can be coated on the exterior of the electrically conductive material 666 and/or the structural layer 668 of the nosepiece 600d.

In some examples, the electrically conductive pogo pin 664 is supported within the nosepiece 600d by a support collar 672. The support collar 672 can be formed from any number of suitable materials such as, but not limited to: polymer materials, elastomeric materials, metals, acrylics, ceramics, fiber-reinforced materials, and so on. For increased rigidity, the support collar 672 can be doped with a fiber material, such as glass. The support collar 672 can be formed from the same material as the electrically conductive material 666, although this is not required. For example, in many embodiments, the support collar 672 is formed from a different material. In some examples, the material selected for the electrically conductive material 666 is softer than the material selected for the support collar 672.

Generally and broadly, it is understood that the tip-field generator 602, the support collar 672, the structural layer 668, the electrically conductive pogo pin 664, and the an electrically conductive material 666 can be manufactured together or separately using any suitable manufacturing process, such as, but not limited to: a two-shot molding process, a co-molding process, an overmolding process, an insert molding process, or any other suitable process. For example, in these embodiments, the support collar 672 can be referred to as a first inner shot, and the electrically conductive material 666 can be referred to as a second outer shot of a two-shot molding process.

The foregoing description of the embodiments depicted in FIGS. 6A-6G, and various alternatives and variations, are presented, generally, for purposes of explanation, and to facilitate a general understanding of possible nosepieces including tip-field generators and/or ring-field generators for use with stylus embodiments disclosed herein. However, it will be apparent to one skilled in the art that some of the specific details presented herein may not be required in order to practice a particular described embodiment, or an equivalent thereof.

More generally, the foregoing description of the embodiments depicted in FIGS. 3A-6G, and various alternatives and variations, are presented, generally, for purposes of explanation, and to facilitate a general understanding of both movable and grounded sections of a tip portion of a stylus in accordance with embodiments described herein. It is understood that these various components (including, but not limited to, nosepieces, force-sensitive structures, coordination engines, rigid conduits, and so on) may be assembled together in a number of implementation-specific ways.

Figure 7:
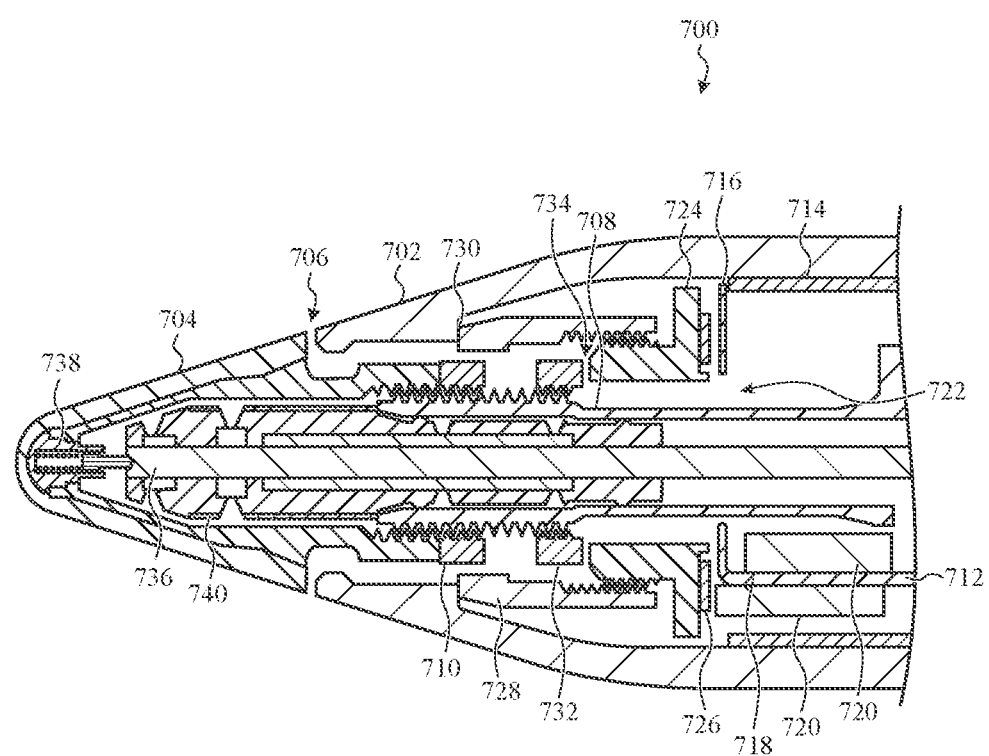
FIG. 7 depicts a cross-section of a nosepiece of a stylus, specifically illustrating the nosepiece supported by a force-sensitive structure of a coordination engine disposed within the body of the stylus.

However, to facilitate an understanding of one possible assembly of these components, FIG. 7 is presented, depicting a cross-section of a stylus, specifically illustrating a coordination engine connecting the tip to a force-sensitive structure of a force engine and providing a signal path for a tip-field generator and a ring-field generator.

The stylus 700 includes a barrel 702 that tapers at one end. A nosepiece 704 is separated from the body at the tapered end by a clearance gap 706. When a force is received by the nosepiece 704, the nosepiece 704 moves toward the barrel 702 thereby reducing the width of the clearance gap 706. The nosepiece 704 is screwed onto a threaded portion of a tubular shield 708 so as to abut a load-shifting nut 710. The load-shifting nut 710 prevents the nosepiece 704 from becoming undesirably disconnected from the tubular shield 708. The load-shifting nut 710 may also restrict the bending or twisting of the nosepiece 704 with respect to the barrel 702. Specifically, with respect to the cross-sectional view of FIG. 7, the load-shifting nut 710 may limit movement of the nosepiece 704 in the up and down direction resulting from a side or non-axial force exerted on the nosepiece 704.

The tubular shield 708 is mechanically coupled to a portion of a force-sensitive structure 712. The force-sensitive structure 712 is partially grounded or otherwise fixed with respect to a chassis 714. The chassis 714 is rigidly coupled to the barrel 702. The force-sensitive structure 712 includes a cantilevered leg 716 that is welded to a portion of the chassis 714, thereby mechanically grounding or otherwise fixing one end of the cantilevered leg 716 to the chassis 714. The force-sensitive structure 712 also includes a lateral bed 718 that is coupled to the non-grounded or unfixed end of the cantilevered leg 716. In this manner, the lateral bed 718 (and anything coupled to it) can translate laterally within the barrel 702. A lateral translation of the lateral bed may, with respect to FIG. 7, refer to movement generally in the horizontal direction. One or more stiffeners 720 can be coupled to the lateral bed 718.

The lateral bed 718 is the portion of the force-sensitive structure 712 to which the tubular shield 708 may be coupled. Additionally, the tubular shield 708 may extend, at least partially, through the cantilevered leg 716 which defines an opening 722. In this manner, the tubular shield 708 (or anything coupled to it) can translate laterally with the lateral bed 718.

In this manner, when a force is received by the nosepiece 704, the nosepiece 704 transfers the force received to the tubular shield 708 which, in turn transfers the force to the lateral bed 718 of the force-sensitive structure 712, causing each of these components to translate laterally, reducing the width of the clearance gap 706. However, the fixed leg of the cantilevered leg 716 may not move in response; thus, the cantilevered leg 716 deforms in response to the force received.

The chassis 714 may be coupled (e.g., welded to) a flanged nut 724. A washer 726 can be positioned between the flanged nut 724 and the chassis 714. In other examples, the washer 726 can be a foam pad. A support collar 728 is screwed onto threads of the flanged nut 724 so that the support collar 728 abuts an internal lip 730 defined on an internal surface of the barrel 702. In other words, the support collar 728 may provide an unbroken mechanical connection between the internal lip 730 and to the chassis 714.

The tubular shield 708 extends through both the support collar 728 and the flanged nut 724. Additionally, a second load-shifting nut 732 can be positioned on the tubular shield 708 so that when the nosepiece 704 is in a neutral position (e.g., not receiving a force), the second load-shifting nut 732 is separated from the flanged nut 724 by a second clearance gap 734. The second clearance gap 734 may be less than the clearance gap 706.

In this manner, when a force of high magnitude is received by the nosepiece 704, the nosepiece 704 transfers the force received to the tubular shield 708 which in turn transfers the force to the lateral bed 718 of the force-sensitive structure 712, causing each of these components to translate laterally. Once the assembly has translated a distance sufficient to close the second clearance gap 734, the assembly may be stopped from further translation by the second load-shifting nut 732 and the flanged nut 724. In this manner, the peak mechanical load that can be experienced by the force-sensitive structure 712 is controlled by the relative position of the second load-shifting nut 732 and the flanged nut 724.

The tubular shield 708 is hollow. A rigid conduit 736 extends within the tubular shield 708 to deliver a tip signal to a tip-field generator 738 and, additionally, a ring signal to a ring-field generator 740.

The foregoing description of the embodiments depicted in FIG. 7 and various alternatives and variations, are presented, generally, for purposes of explanation, and to facilitate a general understanding of one possible assembly of a stylus such as disclosed herein. However, it will be apparent to one skilled in the art that some of the specific details presented herein may not be required in order to practice a particular described embodiment, or an equivalent thereof.

Figure 8A:
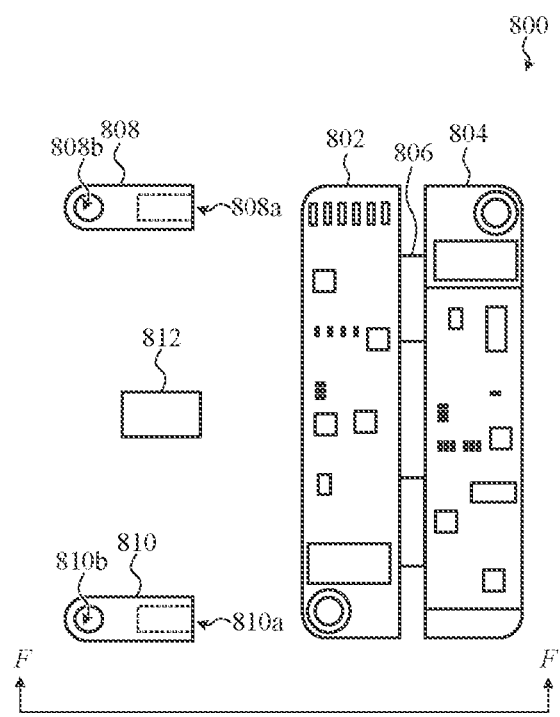
FIG. 8A depicts a plan view of a controller board set that may be folded in order to be received in a thin form factor of a stylus.
Figure 8B:
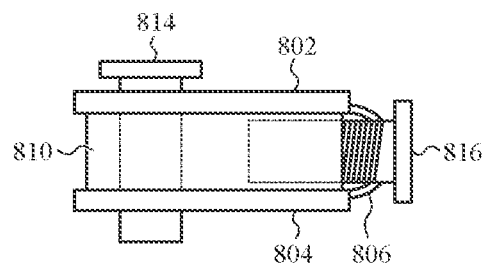
FIG. 8B depicts a side view of the flexible circuit of FIG. 8A, viewed along line F-F, specifically illustrating the placement of a two-axis standoff configured to couple the flexible circuit, when folded, to a chassis within the stylus.
Figure 8C:
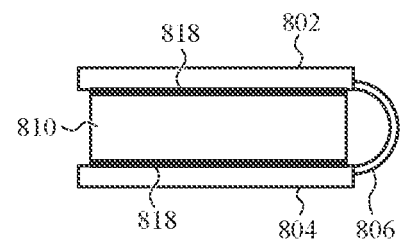
FIG. 8C depicts a side view of the flexible circuit of FIG. 8A, viewed along line F-F, specifically illustrating surface-mount standoffs configured to couple the flexible circuit, when folded, to a chassis within the stylus.

Generally and broadly, FIGS. 8A-8C reference different embodiments of a flexible circuit board of a stylus such as described herein. FIG. 8A depicts a plan view of a controller board set that may be folded in order to be received in a thin form factor of a stylus.

The controller board set 800 may include a substrate on or through which one or more electronic components are disposed. These components may be surface mount or through-hole components. The substrate can be a single layer circuit board, a multi-layer circuit board, or a flexible circuit board. In some examples, a flexible circuit board can be used that is made rigid with one or more stiffeners.

In the illustrated embodiment, the controller board set 800 includes substrates that are connected by one or more flexible circuits. A first control board 802 may be coupled to a second control board 804 via one or more flexible connectors 806. In many cases, the first control board 802 and the second control board 804 take substantially the same shape. In this manner, the second control board 804 can be folded underneath the first control board 802 (as shown in FIG. 8B, when viewed along line F-F of FIG. 8A). Thereafter, the first control board 802 and the second control board 804 can be fastened together in a manner that retains a selected distance between the boards.

In one embodiment, the first control board 802 and the second control board 804 can be fastened together with a first standoff 808, a second standoff 810, and a spacer 812. The first standoff 808 and the second standoff 810 may be disposed at a top edge and a bottom edge of the folded boards, respectively. The spacer 812 may be positioned generally in the middle of the first control board 802 and the second control board 804.

The first standoff 808 and the second standoff 810 can be fastened to the boards via one or more mechanical fasteners, such as screws. In many embodiments the first standoff 808 defines a horizontally-oriented hole 808*a* and a vertically-oriented hole 808*b*. Either or both of the horizontally-oriented hole 808*a* and the vertically-oriented hole 808*b* can extend either partly or entirely through the first standoff 808. Either or both of the horizontally-oriented hole 808*a* and the vertically-oriented hole 808*b* can be threaded.

Similarly, the second standoff 810 defines a horizontally-oriented hole 810*a* and a vertically-oriented hole 810*b*. Either or both of the horizontally-oriented hole 810*a* and the vertically-oriented hole 810*b* can extend either partly or entirely through the second standoff 810. Either or both of the horizontally-oriented hole 810*a* and the vertically-oriented hole 810*b* can be threaded to accept fasteners such as the screws 814, 816 as shown in FIG. 8B.

In other cases, the first standoff 808 and the second standoff 810 are adhered to the boards using an adhesive. In some cases, the first standoff 808 and/or the second standoff 810 can be electrically connected to a circuit ground of either or both boards.

In still other cases, the first standoff 808 and the second standoff 810 are surface mounted, soldered, hot barred, or otherwise mechanically affixed to the boards, such as shown in FIG. 8C. In some cases, the first standoff 808 and/or the second standoff 810 can be electrically connected to a circuit ground of either or both boards via an electrical connection 818.

The foregoing description of the embodiments depicted in FIGS. 8A-8C and various alternatives and variations, are presented, generally, for purposes of explanation, and to facilitate a general understanding of one folded circuit board set that may be included within the body or barrel of a stylus such as disclosed herein. However, it will be apparent to one skilled in the art that some of the specific details presented herein may not be required in order to practice a particular described embodiment, or an equivalent thereof. For example, although the depicted embodiment shows two circuit boards of approximately equal width, it is appreciated that more circuit boards can be folded together in the manner described.

Figure 9A:
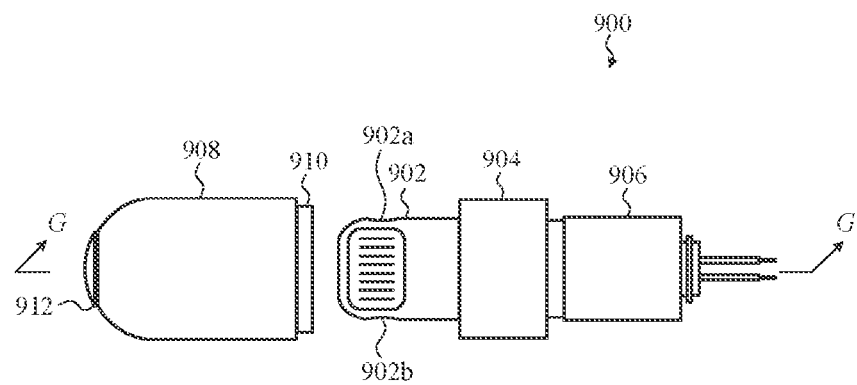
FIG. 9A depicts a power connector of a stylus and a blind cap for concealing the power connector when not in use.

Generally and broadly, FIGS. 9A-9D reference different embodiments of a power connector that can be concealed by a blind cap of a stylus such as described herein. In these embodiments, the blind cap attaches to the power connector via magnetic attraction. FIG. 9A depicts a power connector 900 of a stylus and a cap for concealing the power connector when not in use. The power connector 900 includes a plug 902, a collar 904, and a body 906.

The plug 902 extends from the barrel of the stylus. A blind cap 908 can be placed over the plug 902 to provide a cosmetic termination to the barrel of the stylus, as well as protecting the plug 902 from damage.

The plug 902 can be configured to couple to a power and/or data port of an electronic device to facilitate recharging of a battery pack within the stylus. In other cases, the plug 902 can be used to exchange data between the stylus and an electronic device (e.g., firmware updates, authentication packets, security certificates, and so on). In many cases, the plug 902 is a male connector configured to mate with a female receptacle, but this may not be required in all embodiments. In other cases, the plug 902 may be a female receptacle configured to mate with a male connector. In these embodiments, the blind cap 908 may include a male extension portion configured to fit within the receptacle.

The plug 902 may include at least one element that is ferromagnetic. In other cases, the plug 902 can include a permanent magnet or a selectably-controllable electromagnet. In this manner, the plug 902 can be attracted to a ferromagnetic member and/or a permanent magnet disposed within the blind cap.

Figure 11A:
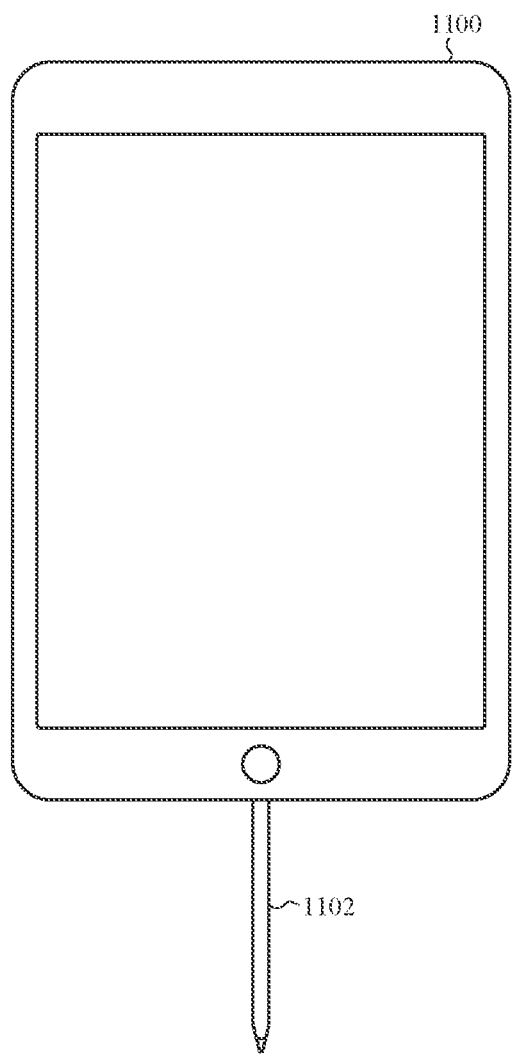
FIG. 11A depicts a stylus incorporating the power connector coupled to an electronic device.
Figure 11B:
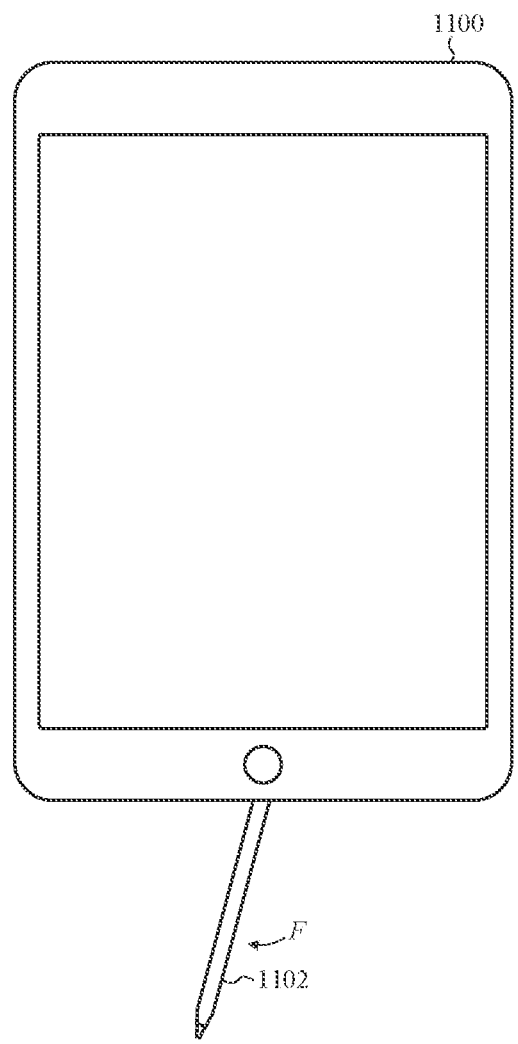
FIG. 11B depicts the stylus and electronic device of FIG. 11A, specifically illustrating flexibility of the power connector.

The plug 902 can be configured to be flexible (laterally moveable within the collar 904) so that when connected to an electronic device, the stylus can resist and withstand certain forces that may otherwise damage the stylus and/or the electronic device (see e.g., FIGS. 11A-11B). In many cases, the plug 902 is flexible in one degree of freedom (e.g., two directions such as right and left). In other embodiments, the plug 902 is flexible in more than one degree of freedom, such as two degrees of freedom (e.g., four directions such as right and left and up and down).

Further, it may be appreciated that although the plug 902 is illustrated as a multi-pin and standardized power connector, such a connector is not required. Particularly, in some embodiments, a Lightning connector, Universal Serial Bus connector, Firewire connector, serial connector, Thunderbolt connector, headphone connector, or any other suitable connector can be used.

In some embodiments, the power connector 900 can retract, either manually or automatically, and either partially or entirely, into the barrel when not in use. In some examples, the power connector 900 can be connected to a push-push mechanism.

The blind cap 908 can take any suitable shape. As illustrated, the blind cap 908 takes the shape of a capsule half (e.g., a cylinder capped with a hemisphere). The blind cap 908 includes a ring 910 that may be configured to sit within a channel defined by the collar 904. The blind cap 908 also includes a pressure vent 912 that may be configured to normalize the pressure within the blind cap 908 to the pressure of the ambient environment. In other words, the pressure vent 912 can be configured to prevent and/or mitigate the development of a pressure differential that may, in some cases, eject the blind cap 908 from the barrel of the stylus. In some embodiments, the pressure vent 912 can include a valve (not shown) that regulates and/or otherwise controls the airflow therethrough.

In many embodiments, the collar 904 is formed from the same material as the barrel of the stylus. In other cases, the collar 904 is formed from a different material, such as a metal. In some cases, the collar 904 may be a heat-treated metal. In many embodiments, the collar 904 has a low magnetic permeability, although this is not required. In many cases, the collar 904 may include a seal (not shown) that connects the collar 904 directly to an external surface of the plug 902. The seal can permit the plug 902 to move within the collar and the seal can connect a metal portion of the plug 902 to a non-metal portion of the collar 904. In other embodiments, the collar 904 can couple to the plug 902 in a different manner. In some cases, the collar 904 can be coupled to a circuit ground or can be coupled to a sensor circuit within the stylus so that the stylus may be able to determine whether the blind cap 908 is attached to the barrel of the stylus.

The collar 904 can provide structural support to one or more components of the stylus or the power connector 900. For example, the collar 904 can at least partially seal the barrel of the stylus. However, in other cases, the collar 904 may not be required to provide structural support to the stylus or to the power connector 900. For example, in some cases, the collar 904 may be configured such that the attachment of the power connector 900 is not solely dependent upon the collar 904 (e.g., a cosmetic and/or other non-structural feature). In these cases, if the collar 904 should fail (e.g., crack, break, detach, and so on), the power connector 900 may remain attached to the barrel of the stylus and may remain functional.

In some embodiments, the collar 904 can be engraved or etched to include symbols, text, or patterns that can serve to identify the manufacturer or user of the stylus.

Figure 9B:
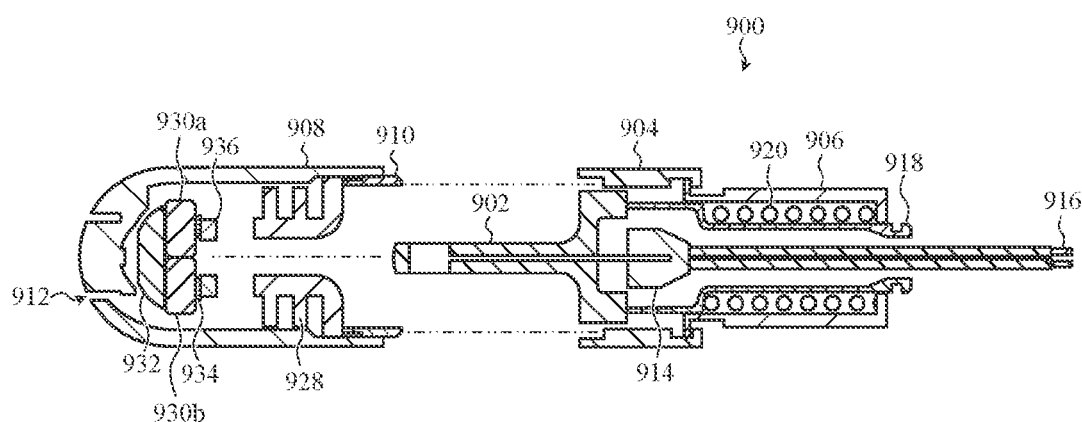
FIG. 9B depicts the power connector and blind cap of FIG. 9A, shown in cross-section through line G-G, specifically showing a configuration of magnets that attract the blind cap to the power connector.

FIG. 9B depicts the power connector 900 and the blind cap 908 of FIG. 9A, shown in cross-section through line G-G. The power connector 900 may be formed, at least partially, from a ferromagnetic material. The collar 904 includes a potted junction 914. The potted junction 914 electrically couples a circuit board extending from the power connector 900 to one or more leads 916. Additionally, the potted junction 914 is covered, coated, or otherwise potted and/or sealed with a flexible material, such as silicone, a polymer, or an elastomer. The potted junction 914 permits limited movement of the power connector 900 without transferring that movement to the one or more leads 916.

The one or more leads 916 extend from the potted junction 914 through a relief sleeve 918 that extends from the back portion of the power connector 900 to the end of the body 906. The relief sleeve 918 is surrounded by a restoring spring 920.

In this manner, when the power connector 900 is connected to an electronic device and a torque is applied to the stylus, said torque is transferred into the relief sleeve 918 and the restoring spring 920, permitting the barrel of the stylus (not shown) to at least partially flex away from the power connector 900. This arrangement allows the stylus to receive and/or absorb a certain amount of torque when the stylus is connected to an electronic device. This flexibility of the power connector 900 prevents damage to both the stylus and an associated electronic device.

In many embodiments, the blind cap 908 includes a guide 928 that has a generally curved profile. The curved profile of the guide 928 encourages the power connector 900 into alignment with the blind cap 908.

The blind cap 908 also includes one or more magnets. The magnets are identified in the illustrated embodiment as the magnets 930a, 930b. The one or more magnets 930a, 930b are attracted to the power connector 900, thereby drawing the power connector 900 through the guide 928 and securing the blind cap 908 to the power connector 900. A magnetic shunt 932 is positioned behind the magnets. The magnetic shunt 932 is formed from a material with a high magnetic permeability. In this manner, the magnetic shunt 932 redirects the flux of the magnets 930a, 930b back toward the plug 902. Similarly, the magnetic shunt 932 redirects the flux of the magnets 930a, 930b away from the rounded end of the blind cap 908. In some cases, the magnetic shunt 932 is a magnetically permeable sheet (e.g., iron, cobalt-iron, and so on) that is attached to the rear side of the magnets 930a, 930b. In other cases, the magnetic shunt 932 may take a specific shape, such as a hemispherical shape.

In many examples, the magnets 930a, 930b can be secured within the blind cap 908 with polarities opposing one another. As a result of this configuration, flux may be concentrated toward the guide 928, thereby exhibiting a stronger magnetic attraction to the plug 902.

In some embodiments, an adhesive 934 attaches a guide ring 936 to the face of the magnets 930a, 930b. The guide ring 936 can guide the plug 902 toward the magnets 930a, 930b. In other embodiments, the guide ring 936 may be coupled to the guide 928.

As noted above, the magnets 930a, 930b are configured to attract to ferromagnetic elements within the plug 902. These elements can be specifically included within the plug 902, or they can be elements otherwise required for the structural support and/or functionality of the plug 902.

Figure 9C:
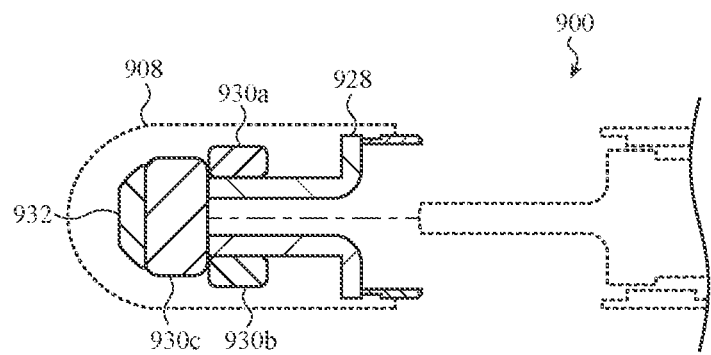
FIG. 9C depicts another example power connector and blind cap, specifically showing another magnetic configuration that attracts the blind cap to the power connector.
Figure 9D:
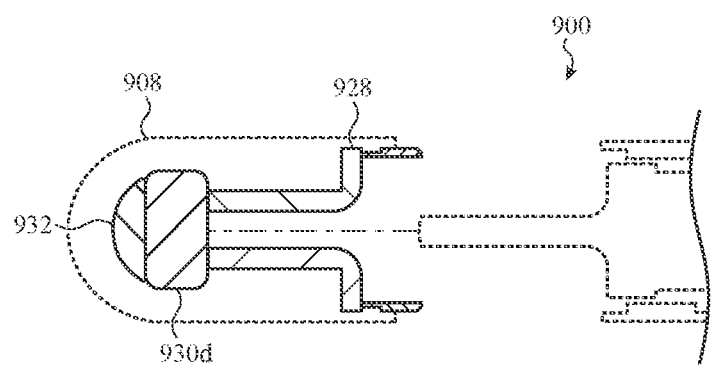
FIG. 9D depicts yet another example power connector and blind cap, specifically showing another magnetic configuration that attracts the blind cap to the power connector.

Other embodiments may be implemented in other ways. For example, the magnets 930a, 930b may be disposed on an outer surface of the guide 928, such as depicted in FIG. 9C. In this embodiment, a third larger magnet, labeled as the magnet 930c, can cover an open end of the guide 928. In other embodiments, the magnets 930a, 930b and 930c may be replaced by a single large magnet 930d, such as shown in FIG. 9D.

Furthermore, although many embodiments described above reference magnetic attraction between a blind cap 908 and a plug 902 extending from a body of a stylus (whether such magnets are within the blind cap, the plug, or both), it may be appreciated that other embodiments can couple the blind cap to a stylus in a different manner consistent with embodiments described herein. For example, in other embodiments, magnetic attraction can be replaced and/or supplemented by an interference-fit between the blind cap and the plug. For example, one or more protrusions extending from an internal sidewall of the blind cap 908 can be set within one or more detents 902a, 902b defined by the plug. In other cases, the blind cap 908 can connect to the plug 902 by a threaded connection. In another embodiment, the blind cap 908 can connect to the plug 902 by a snap-fit connection.

Generally and broadly, FIGS. 10A-10H reference different embodiments of a power connector that can be concealed by a blind cap of a stylus such as described herein. These embodiments depict a blind cap 1000 that is configured to attach to and to conceal a plug 1002 of a stylus. The blind cap 1000 includes a body 1004 that defines an external surface and an internal volume of the blind cap 1000. In many examples, the body 1004 is formed from a polymer material, although this may not be required.

Figure 10A:
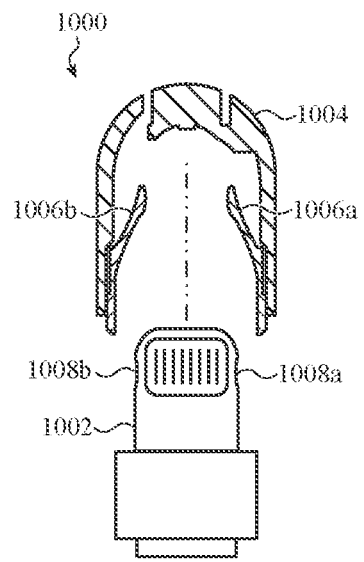
FIG. 10A depicts a cross-section of a power connector of a stylus and a blind cap for concealing the power connector when not in use, particularly showing a configuration of leaf springs within the blind cap that is configured to engage with detents of the power connector.
Figure 10B:
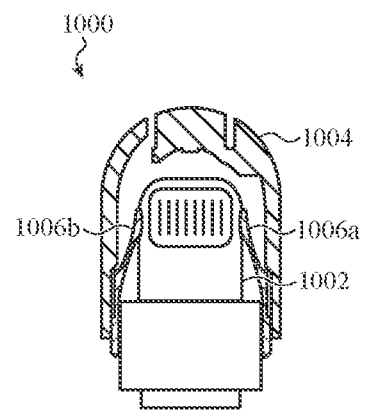
FIG. 10B depicts the cross-section of FIG. 10A, particularly showing the leaf springs of the blind cap engaged with the detents of the power connector.
Figure 10C:
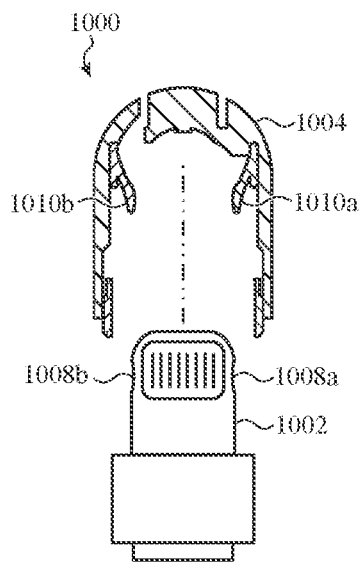
FIG. 10C depicts a cross-section of a power connector and a blind cap, particularly showing an alternative configuration of leaf springs within the blind cap.

In some embodiments, the body 1004 can be formed with one or more protrusions (not shown) that are configured to interface with features of the plug 1002 (e.g., detents). In other cases, the body 1004 can include one or more springs configured to interface with features of the plug 1002. Certain example embodiments depicting the body 1004 incorporating leaf springs are depicted in FIGS. 10A-10C and certain example embodiments depicting the body 1004 incorporating hoop springs are depicted in FIGS. 10D-10H. In still further embodiments, other configurations of springs may be used.

FIG. 10A depicts a cross-section of the plug 1002 of a stylus and a blind cap 1000 for concealing the plug 1002, particularly showing a configuration of leaf springs, labeled in the figure as the leaf springs 1006a, 1006b, within the body 1004 of the blind cap 1000. The leaf springs 1006a, 1006b extend from an interior surface of the body 1004 and are configured to engage with corresponding detents in the plug 1002, such as shown in FIG. 10B. The detents 1008a, 1008b can take any suitable shape.

In many embodiments, the leaf springs 1006a, 1006b are formed from metal. The leaf springs 1006a, 1006b can be insert-molded into the body 1004. In other cases, the leaf springs 1006a, 1006b can be inserted into the body 1004 during manufacturing of the blind cap 1000. In these examples, the leaf springs 1006a, 1006b may be permanently affixed to the interior of the body 1004.

The leaf springs 1006a, 1006b are depicted in FIGS. 10A-10B as extending from a ring that extends from the base of the body 1004, although this configuration is not required of all embodiments, for example, the leaf springs 1006a, 1006b can be a separate piece from the ring, such as depicted in FIG. 10C. In this embodiment, the leaf springs 1010a, 1010b extend downwardly to meet the detents 1008a, 1008b.

Figure 10D:
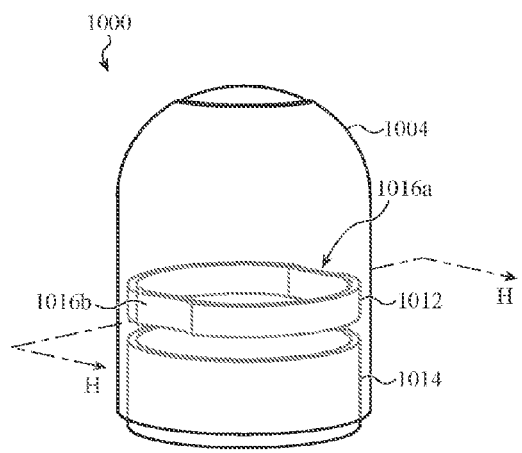
FIG. 10D depicts a blind cap for concealing a power connector of a stylus, particularly showing a hoop spring configuration within the blind cap that is configured to engage with detents of the power connector.
Figure 10E:
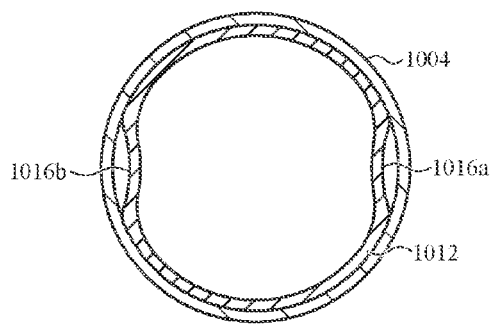
FIG. 10E depicts a cross-section of the blind cap of FIG. 10D taken through line H-H.

In other cases, other springs and/or spring types can be used to retain the blind cap 1000 to the plug 1002. For example, FIGS. 10D-10E depict a blind cap 1000 and a cross-section thereof. The body 1004 of the blind cap 1000 includes a circular hoop spring. The circular hoop spring is identified as the hoop spring 1012. In some embodiments, the hoop spring 1012 can be a portion of a cosmetic or functional ring (e.g., the ring 1014) that extends outwardly from the base of the body 1004 of the blind cap 1000. In other cases, such as shown in FIG. 10D, the hoop spring 1012 can be a separate element from the ring 1014.

Figure 10F:
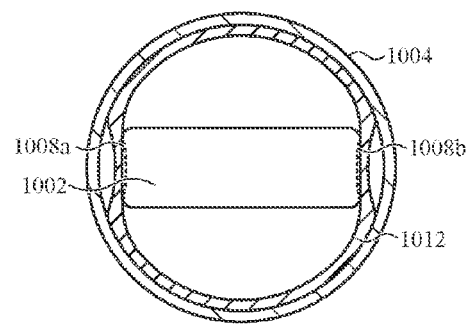
FIG. 10F depicts the cross-section of FIG. 10E, specifically showing the hoop spring engaged with detents of the power connector.

As depicted in FIGS. 10D-10E, the hoop spring 1012 includes two indentations, identified as the indentations 1016a, 1016b, that are configured to engage with the detents 1008a, 1008b, such as shown in FIG. 10F.

As with the leaf springs depicted in FIGS. 10A-10C, the hoop spring 1012 can be formed from metal. In some cases, the hoop spring 1012 can be insert-molded into the body 1004. In other cases, the hoop spring 1012 can be inserted into the body 1004 during manufacturing of the blind cap 1000. In these examples, the hoop spring 1012 may be permanently affixed to the interior of the body 1004.

Figure 10G:
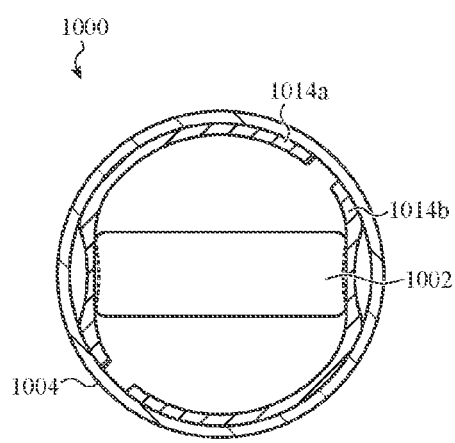
FIG. 10G depicts another example cross-section of a blind cap incorporating one or more hoop-springs that are configured to engage with detents of a power connector.
Figure 10H:
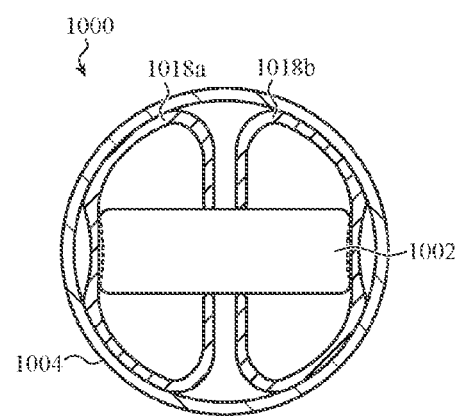
FIG. 10H depicts yet another example cross-section of a blind cap incorporating one or more hoop-springs that are configured to engage with detents of a power connector.

The hoop spring 1012 can be a portion of a ring 1014. In other cases, the hoop spring 1012 can be separated from the ring 1014. Further, although the hoop spring 1012 is depicted as a single continuous ring, such a configuration is not required of all embodiments. For example, the hoop spring 1012 can be broken into multiple parts, such as shown in FIG. 10G, labeled as the hoop spring parts 1014a, 1014b. In other cases, more than one hoop spring can be used, such as shown in FIG. 10H. In this embodiment, two hoop springs, identified as the hoop springs 1018a, 1018b, are included.

The foregoing description of the embodiments depicted in FIGS. 10A-10H and various alternatives and variations, are presented, generally, for purposes of explanation, and to facilitate a general understanding of various methods of attaching a blind cap to a stylus using an interference-fit technique. However, it will be apparent to one skilled in the art that some of the specific details presented herein may not be required in order to practice a particular described embodiment, or an equivalent thereof. For example, although the depicted embodiments show various spring configurations without magnetic elements, it may be appreciated that any of the embodiments depicted in FIGS. 10A-10H may incorporate one or more magnets such as shown in FIGS. 9A-9D in order to improve the attachment of the blind cap to the stylus body.

Many of the embodiments depicted and described herein generally reference a blind cap that conceals a power connector (e.g., plug) of a stylus when the power connector is not in use. As noted above, the power connector of a stylus may be used to recharge a battery within the stylus. Generally and broadly FIGS. 11A-11F depict various example embodiments of a power connector of a stylus receiving power from an external electronic device.

For example, FIG. 11A depicts an electronic device 1100. The electronic device 1100 incorporates a power port that can couple to a power connector of a stylus 1102. In some cases, such as noted above with respect to FIGS. 9A-9D, the power connector of the stylus 1102 may be flexible and may be configured to bend in response to a force F applied to the stylus 1102 when the stylus 1102 is connected to the electronic device 1100. For example, FIG. 11B depicts the stylus 1102 bending in response to a force F.

Figure 11C:
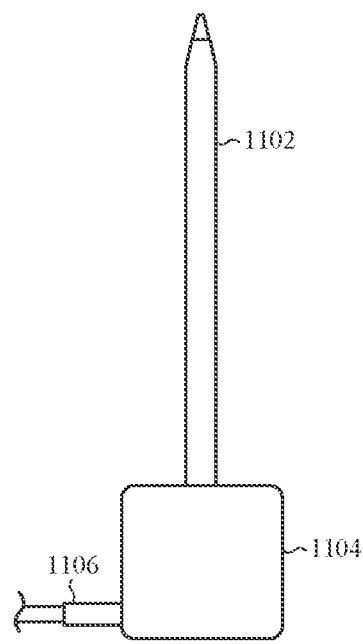
FIG. 11C depicts a stylus incorporating the power connector of FIG. 11A coupled to a charging stand.
Figure 11D:
FIG. 11D depicts a stylus incorporating the power connector of FIG. 11A coupled to a charging cable.

In other cases, the stylus 1102 can charge in another manner. For example, the stylus 1102 can couple to a dock 1104, such as shown in FIG. 11C. The dock 1104 can be coupled via a data or power cable 1106 to another electronic device or to an electrical outlet. In other examples, the stylus 1102 couples directly to the data or power cable 1106 via an adapter 1108, such as shown in FIG. 11D.

Figure 11E:
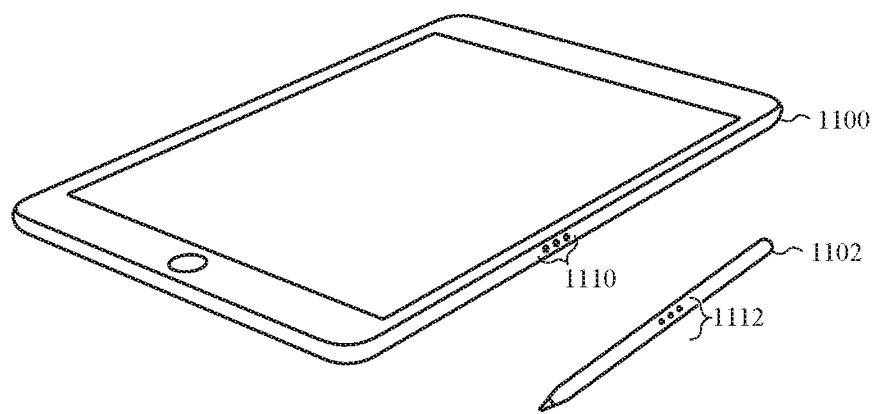
FIG. 11E depicts a stylus incorporating a power connector that is configured to electrically couple to an external surface of an electronic device.
Figure 11F:
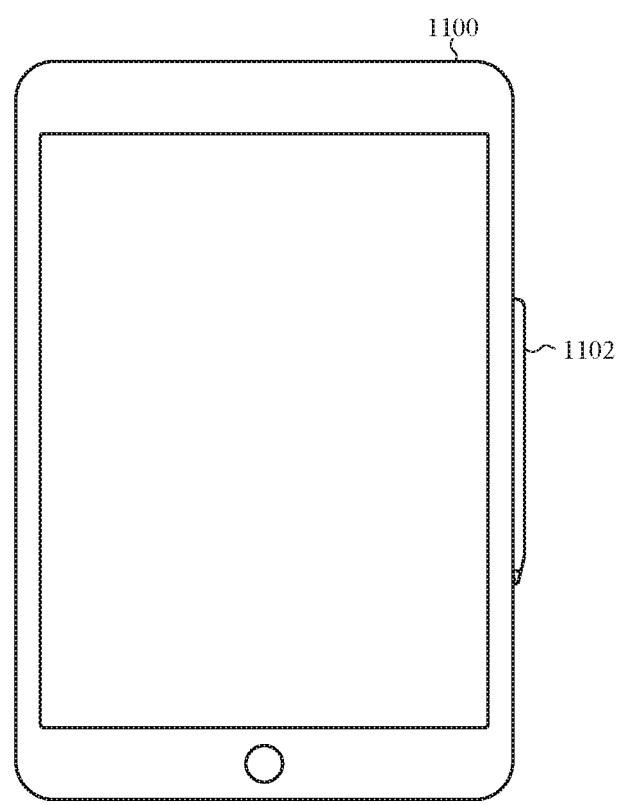
FIG. 11F depicts the stylus and electronic device of FIG. 11E in a mated configuration.

In still further embodiments, the stylus 1102 may not include a power connector such as described in other embodiments. In particular, the stylus 1102 may receive data and/or power from an electronic device via contacts disposed in the barrel of the stylus 1102, such as shown in FIGS. 11E-11F. In this embodiment, the electronic device 1100 can include one or more external electrical contacts, labeled in FIG. 11E as the contact group 1110. Similarly, the stylus 1102 includes one or more corresponding external electrical contacts, labeled in FIG. 11E as the contact group 1112.

The contact group 1110 is configured to interface with the contact group 1112 and facilitate data and/or power transactions between the stylus 1102 and the electronic device 1100. Accordingly, the contact group 1110 and the contact group 1112 typically have the same number of discrete contacts. In other embodiments, however, the contact group 1110 and the contact group 1112 may have a different number of contacts.

In some embodiments, the electronic device 1100 includes one or more magnets that are configured to attract the stylus 1102 to the electronic device 1100 in a manner such that the contact group 1110 interfaces (e.g., mates with) the contact group 1112, such as shown in FIG. 11F. In other examples, the stylus 1102 may also include magnets that are configured to attract the stylus 1102 to the electronic device 1100.

The foregoing description of the embodiments depicted in FIGS. 11A-11F and various alternatives and variations, are presented, generally, for purposes of explanation, and to facilitate a general understanding of various methods of charging an internal battery of a stylus. However, it will be apparent to one skilled in the art that some of the specific details presented herein may not be required in order to practice a particular described embodiment, or an equivalent thereof.

Further, although many embodiments described herein reference user input systems that incorporate a stylus and an electronic device that each include specific hardware, this disclosure is not limited to particular apparatuses or systems. To the contrary, it may be appreciated by one of skill in the art that the various elements disclosed herein may be modified in a number of suitable and implementation-specific ways. In other words, one of skill in the art may appreciate that many embodiments described herein relate to and generally reference methods of operating, controlling, configuring, calibrating, using, and/or manufacturing user input systems, styluses, electronic devices, and so on. As such, FIGS. 12-24 are provided to facilitate a general understanding of certain example methods described herein, although one may appreciated that the various operations described and/or illustrated with respect to these figures are not intended to be exhaustive in every case.

Figure 12:
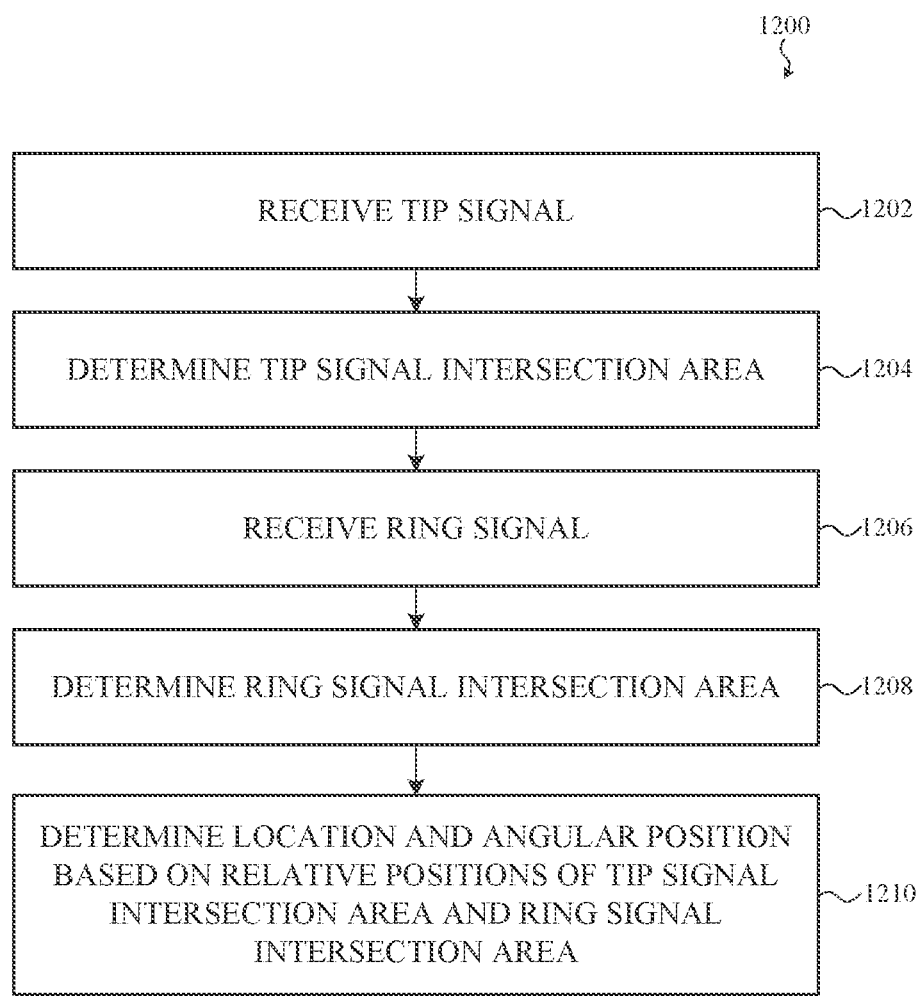
FIG. 12 is a flow chart depicting operations of a process of locating and estimating the angular position of a stylus touching an input surface of an electronic device.

FIG. 12 is a flow chart depicting operations of a process 1200 of locating and estimating the angular position of a stylus touching an input surface of an electronic device in accordance with embodiments described herein. The process 1200 can be performed by any suitable electronic device, such as, but not limited to, the electronic device 102 described in reference to FIGS. 1A-1D and/or the electronic device 202 described in reference to FIGS. 2A-2F.

Generally and broadly, the process initiates at operation 1202 in which a tip signal is received by a sensor layer of an electronic device. Next, at operation 1204, a tip signal intersection area is estimated. In many embodiments, the electronic device estimates the tip signal intersection area by estimating the location of each of several sensor nodes (such as capacitive sensor nodes) of the sensor layer that receive the tip signal at operation 1202.

Next, at operation 1206 a ring signal is received by the sensor layer of the electronic device. Next, at operation 1208, a ring signal intersection area is estimated. In many embodiments, the electronic device estimates the ring signal intersection area by estimating the location of each of several sensor nodes (such as capacitive sensor nodes) of the sensor layer that receive the ring signal at operation 1206.

Next, at operation 1210, the tip signal intersection area and the ring signal intersection area are used to locate the stylus on the input surface and to estimate the angular position of the stylus relative to the plane of the input surface. In many embodiments, the operation of locating the stylus on the input surface includes estimating a Cartesian coordinate relative to an origin point defined on the input surface. The operation of estimating the angular position of the stylus relative to the plane of the input surface includes a spherical coordinate set including an azimuthal angle and a polar angle, relative to a vector parallel to the plane of the input surface of the stylus and relative to a vector perpendicular (e.g., normal) to the plane of the input surface of the stylus, respectively.

Figure 13:
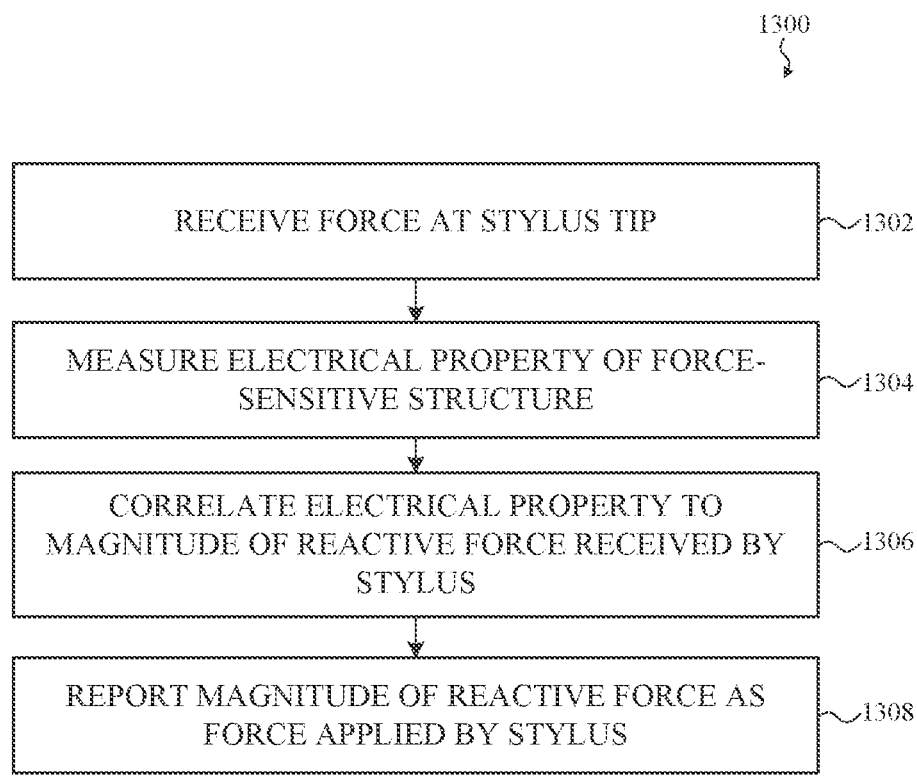
FIG. 13 is a flow chart depicting operations of a process of estimating a force applied by a stylus to an input surface of an electronic device.

FIG. 13 is a flow chart depicting operations of a process 1300 of estimating a force applied by a stylus to an input surface of an electronic device. The process 1300 can be performed by any suitable stylus, such as, but not limited to, the stylus 104 described in reference to FIGS. 1A-1D and/or the stylus 204 described in reference to FIGS. 2A-2F.

The process initiates at operation 1302 in which a reaction force is received at a tip (e.g., a nib) of the stylus. Next, at operation 1304, an electrical property of a force-sensitive structure mechanically coupled to the tip of the stylus is estimated. The electrical property can be resistance, capacitance, accumulated charge, inductance, or any other suitable electrical property.

Next, at operation 1306, the estimated electrical property is correlated to a magnitude of force, (e.g., reaction force) that is received by the tip of the stylus. The correlation operation can be performed using any number of suitable techniques. In some cases, the electrical property changes linearly with the force applied to the force-sensitive structure, whereas in other cases, the electrical property changes exponentially with the force applied to the force-sensitive structure.

Next, at operation 1308, the estimated magnitude of the reaction force is communicated (e.g., to an electronic device), as a magnitude of force applied by the stylus as a vector or scalar quantity using any suitable encoded or not-encoded format.

Figure 14:
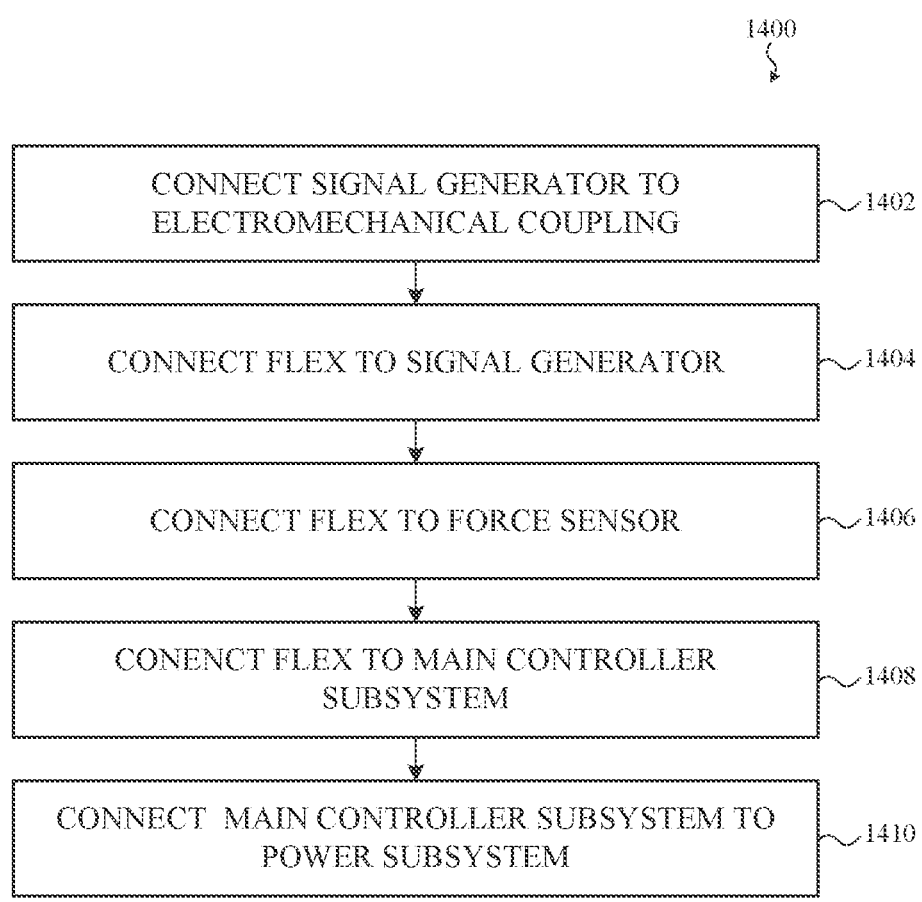
FIG. 14 is a flow chart depicting operations of a process of manufacturing a stylus described herein.

FIG. 14 is a flow chart depicting operations of a process 1400 of manufacturing a stylus such as described herein. The process initiates at operation 1402 in which a signal generator is connected to a coordination engine. The signal generator can be a control board, such as the control board 342 described with respect to the embodiment depicted in FIG. 3A.

Next, at operation 1404, a flexible circuit may be coupled to the signal generator. In some cases, the connection between the flexible circuit and the signal generator is permanent, whereas in others, the connection may be removable. For example, the flexible circuit can be soldered via hot bar to the signal generator. In other cases, a connector of the flexible circuit can be attached to a port of the signal generator. In still further cases, a port attached to the flexible circuit can be attached to a connector coupled to the signal generator.

Next, at operation 1406, the flexible circuit may be coupled to a strain-responsive element, such as the strain-sensitive electrode 338 described with respect to the embodiment depicted in FIG. 3A. In some cases, the flexible circuit may bend at an angle in order to connect to the strain-responsive element.

Next, at operation 1408, the flexible circuit may be coupled to a processing unit, such as the processing unit circuit board set 356 described with respect to the embodiment depicted in FIG. 3A. In some cases, the flexible circuit may bend at an angle in order to connect to the processing unit.

Next, at operation 1410, the processing unit may be coupled to a power subsystem, such as the power control board 388 described with respect to the embodiment depicted in FIG. 3A.

Figure 15:
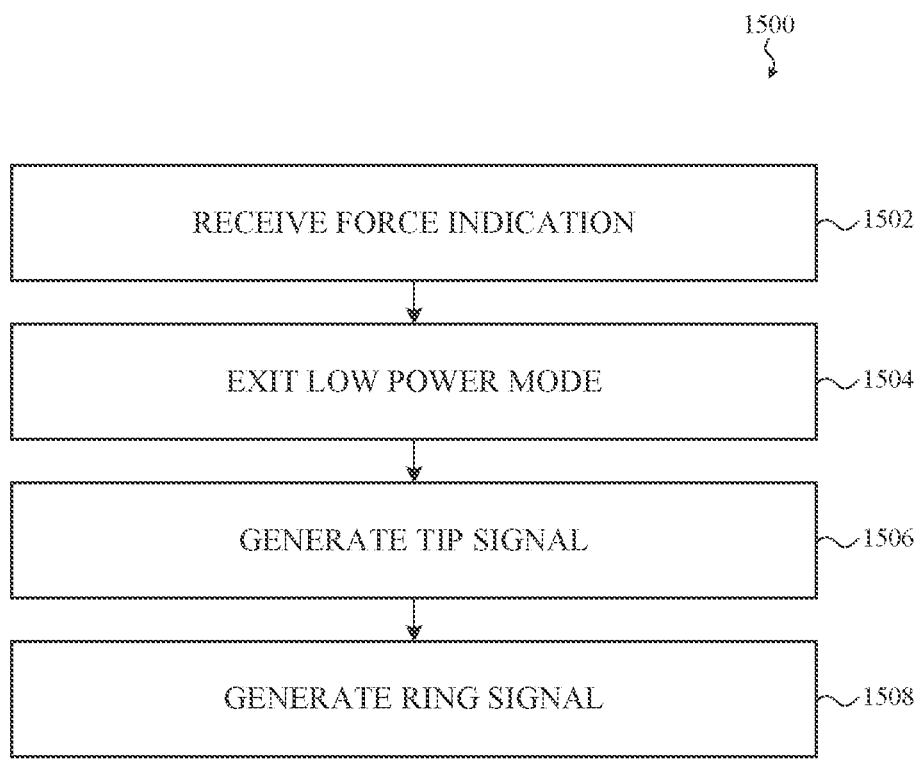
FIG. 15 is a flow chart depicting operations of a process of exiting a low power mode of a stylus.

FIG. 15 is a flow chart depicting operations of a process 1500 of exiting a low power mode of a stylus. The process 1500 can be performed by any suitable stylus, such as, but not limited to, the stylus 104 described in reference to FIGS. 1A-1D and/or the stylus 204 described in reference to FIGS. 2A-2F. The process initiates at operation 1502 in which a force indication is received by a force-sensitive structure within the stylus. In this example, the stylus is in a low power mode. The force indication can be a magnitude of force estimated, such as described with respect to the method depicted in FIG. 13. In other cases, the force indication may be a binary or otherwise coarse indication that a force has been received. Next, at operation 1504, the stylus exits the low power mode. Thereafter, at operations 1506 and 1508, the stylus may generate the tip signal and the ring signal, respectively.

Figure 16:
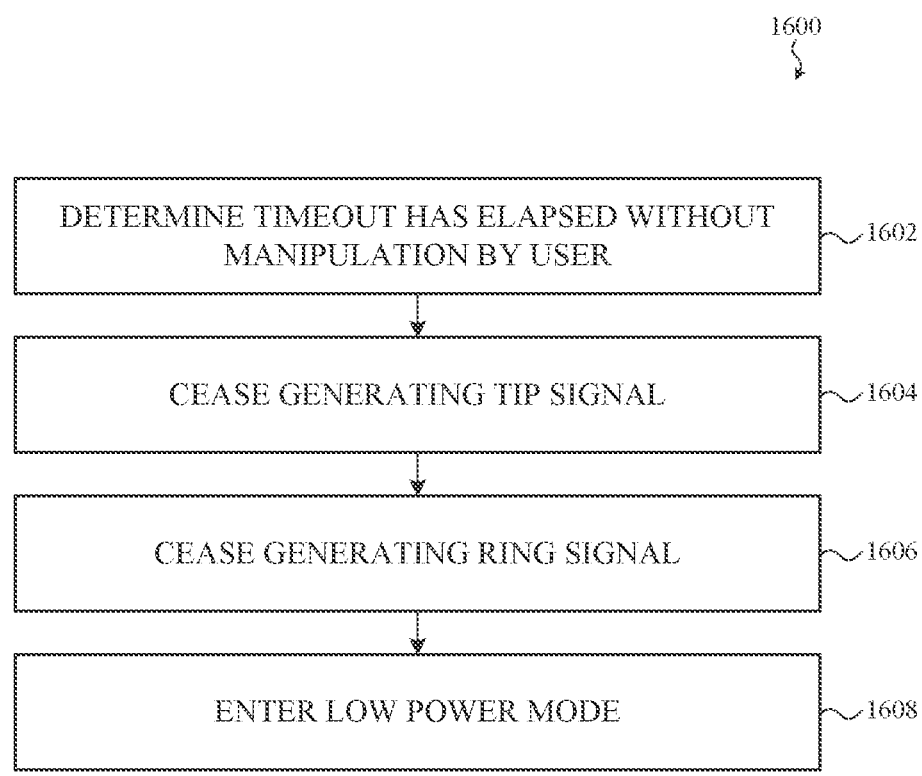
FIG. 16 is a flow chart depicting operations of a process of entering a low power mode of a stylus.

FIG. 16 is a flow chart depicting operations of a process 1600 of entering a low power mode of a stylus. The process 1600 can be performed by any suitable stylus, such as, but not limited to, the stylus 104 described in reference to FIGS. 1A-1D and/or the stylus 204 described in reference to FIGS. 2A-2F. The process initiates at operation 1602 in which the stylus estimates that the user has not manipulated the stylus for at least a certain period of time (e.g., timeout period). The stylus can make this estimation based on communication (or lack thereof) with an electronic device. In other cases, the stylus can make this estimation based on sensor data or sensor input obtained from a motion sensor within the stylus. The motion sensor can be an accelerometer, gyroscope, or any other suitable motion. In other cases, the stylus can estimate that the user has not manipulated the stylus by estimating that a force-sensitive structure within the stylus has not received a force.

After estimating that the timeout period has elapsed, the stylus can enter a low power mode. In this example, the stylus can cease generating a tip signal, such as shown at operation 1604. Additionally, the stylus can cease generating a ring signal, such as shown at operation 1606. Thereafter, at operation 1608, the stylus enters a low power mode. The low power mode may be a configuration of the stylus that consumes a lower amount of power than when the stylus is being actively manipulated by a user. In some examples, more than one low power mode is possible. For example, after a first timeout is reached, the stylus can enter a first low power mode. Thereafter, after a second timeout is reached, the stylus can enter a second low power mode.

In some cases, the low power mode or modes that are entered by the stylus can depend upon a current capacity of a battery of the stylus. In other cases, the stylus can enter one or more low power modes after direct communication from an electronic device. For example, an electronic device can send a signal to the stylus when the electronic device enters a program or application state that may not require or is not configured to accept input from the stylus. In one example, an electronic device with a touch screen may send such a signal to the stylus when keyboard input is requested from a user. In another case, the electronic device may send such a signal to the stylus when the user operating the electronic device switches from a graphic design application to a photo browsing application. In still further examples, the electronic device can send such a signal to the stylus upon the electronic device's estimation that a timeout period has elapsed.

Upon receiving such a signal from the electronic device, the stylus can enter the low power mode. In many embodiments the signal is sent from the electronic device to the stylus via a wireless communication interface, such as a Bluetooth interface, infrared interface, acoustic interface, or any other suitable wireless interface.

In other cases, the electronic device can send a signal to the stylus when the electronic device enters a low power mode. For example, the electronic device can send such a signal to the stylus when the user operating the electronic device causes the electronic device to power down or enter a standby state. In still further embodiments, the stylus can enter a low power mode after estimating that the orientation of the stylus is beyond a certain threshold value. For example, upon estimating that the stylus is lying flat on a surface (e.g., polar angle is zero), the stylus can enter a low power mode. In still further embodiments, the stylus can enter a low power mode after estimating that the stylus is connected to a power port and is receiving power, such as depicted in FIGS. 9D-9E.

Figure 17:
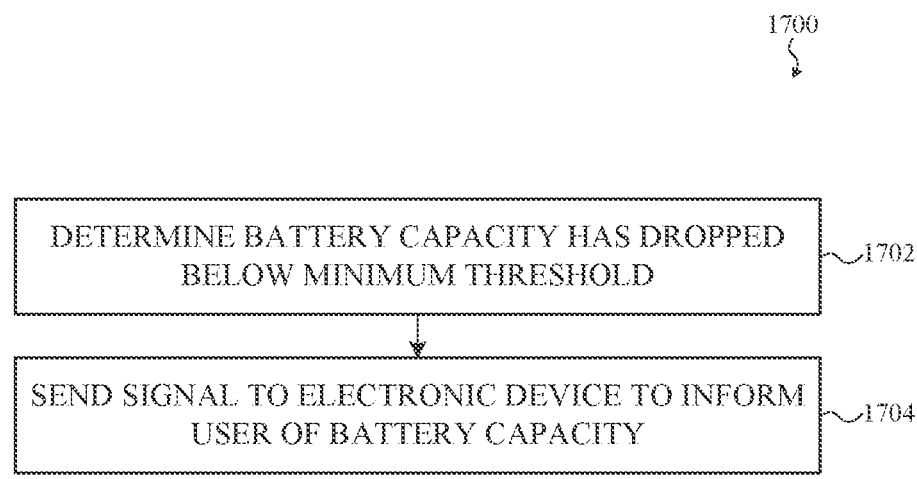
FIG. 17 is a flow chart depicting operations of a process of notifying a user to charge a stylus.

FIG. 17 is a flow chart depicting operations of a process 1700 of notifying a user to charge a stylus. The process 1700 can be performed by any suitable stylus, such as, but not limited to, the stylus 104 described in reference to FIGS. 1A-1D and/or the stylus 204 described in reference to FIGS. 2A-2F. The process initiates at operation 1702 in which the stylus estimates that a battery of the stylus has dropped below a certain minimum threshold. Next, at operation 1704, the stylus can communicate to an associated electronic device that the stylus is in need of charging.

Figure 18:
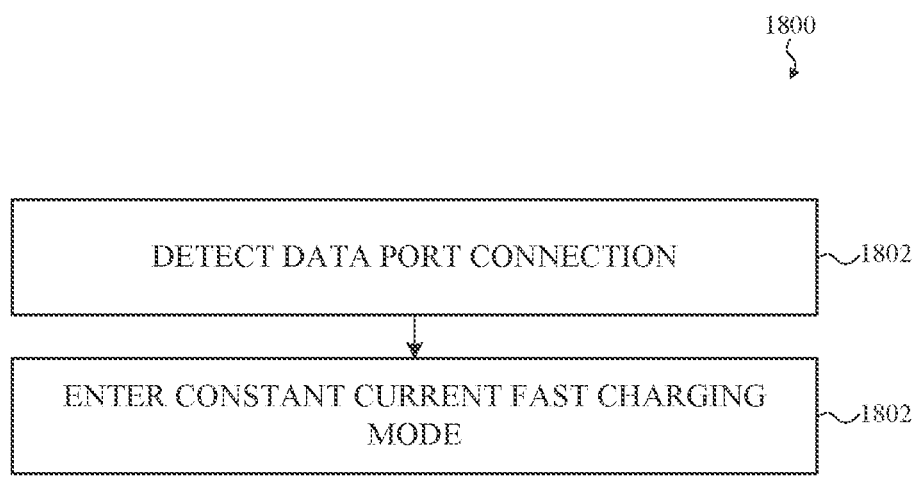
FIG. 18 is a flow chart depicting operations of a process of charging a stylus with an electronic device.

FIG. 18 is a flow chart depicting operations of a process 1800 of charging a stylus with an electronic device. The process 1800 can be performed by any suitable stylus, such as, but not limited to, the stylus 104 described in reference to FIGS. 1A-1D and/or the stylus 204 described in reference to FIGS. 2A-2F. The process initiates at operation 1802 in which the stylus estimates that the stylus has been plugged into a data port connector and is ready to receive power. Next, at operation 1804, the stylus can enter a constant current fast charging mode. In this example, a battery within the stylus can be rapidly charged.

In some embodiments, the stylus can illuminate an indicator in order to convey information related to the current charge of the battery. For example, the stylus can illuminate an indicator with a red or orange color when the battery is charging. Once the battery is charged, the stylus can illuminate the indicator with a green color. In other examples, the stylus can periodically adjust the brightness of the indicator. In other examples, the stylus can animate the indicator (e.g., increasing or decreasing the brightness thereof in a breathing pattern) to convey to a user that the stylus is charging.

Figure 19:
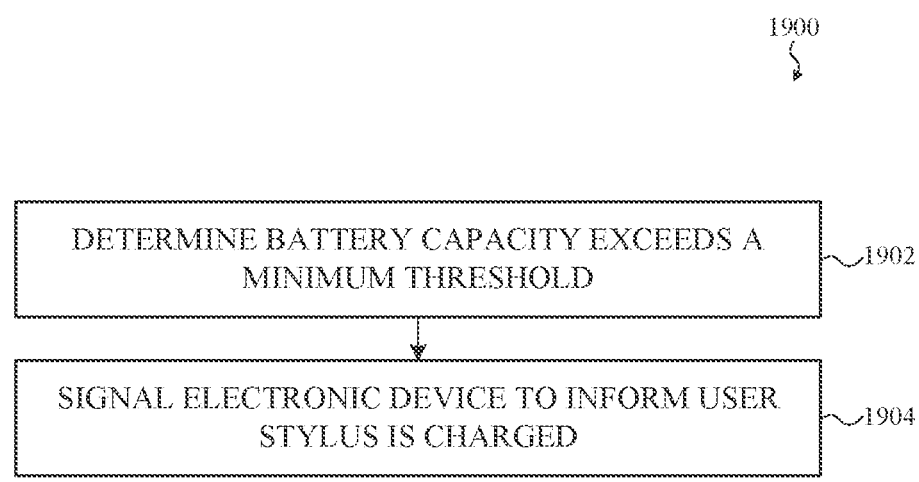
FIG. 19 is a flow chart depicting operations of a process of notifying a user that a stylus is charged.

FIG. 19 is a flow chart depicting operations of a process 1900 of notifying a user that a stylus is charged. The process 1900 can be performed by any suitable stylus, such as, but not limited to, the stylus 104 described in reference to FIGS. 1A-1D and/or the stylus 204 described in reference to FIGS. 2A-2F. The process initiates at operation 1902 in which the stylus estimates that the battery contained therein is fully or nearly fully charged. Next, at operation 1904, the stylus communicates to an electronic device that the stylus is charged using any suitable encoded or not-encoded format.

Figure 20:
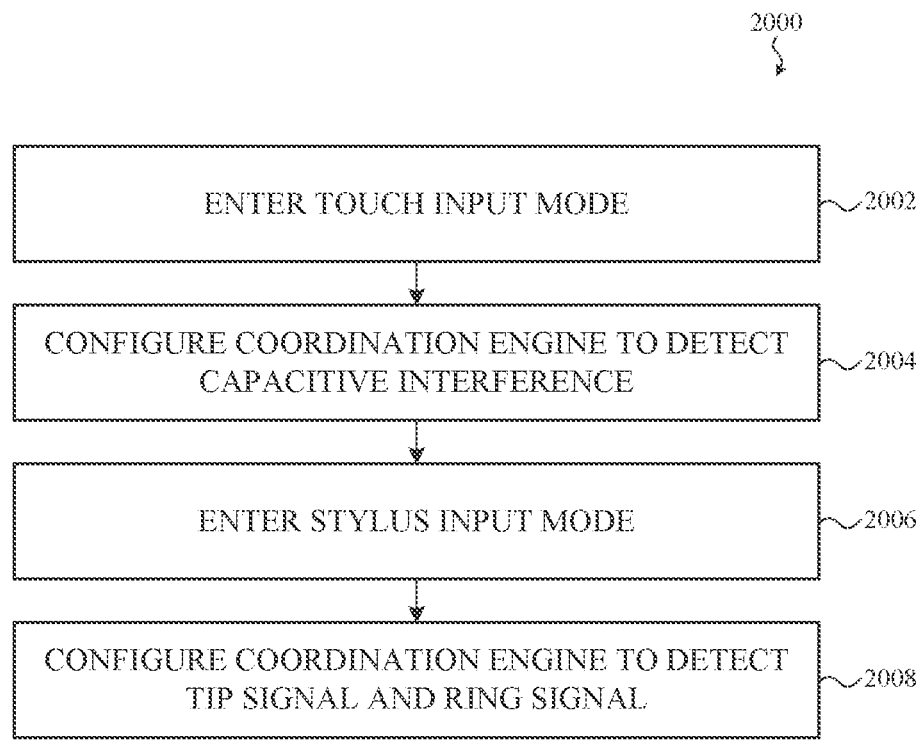
FIG. 20 is a flow chart depicting operations of a process of operating an electronic device in either a touch input mode or a stylus input mode.

FIG. 20 is a flow chart depicting operations of a process 2000 of operating an electronic device in either a touch input mode or a stylus input mode. The process 2000 can be performed by any suitable electronic device, such as, but not limited to, the electronic device 102 described in reference to FIGS. 1A-1D and/or the electronic device 202 described in reference to FIGS. 2A-2F.

The process initiates at operation 2002 in which the electronic device enters a touch input mode. When in the touch input mode, the electronic device may be configured to receive single touch or multi-touch input from a user. In order to receive such input, the electronic device can, at operation 2004, configure a coordination engine (such as the coordination engine 220 described in reference to FIGS. 2A-2F) to detect capacitive interference that results from a user touch.

Next, at operation 2006, the electronic device enters a stylus input mode. When in the stylus input mode, the electronic device may be configured to locate and estimate the angular position of one or more styluses. In order to receive such input, the electronic device can, at operation 2008, configure the coordination engine to detect a ring field signal and a tip field signal.

Figure 21:
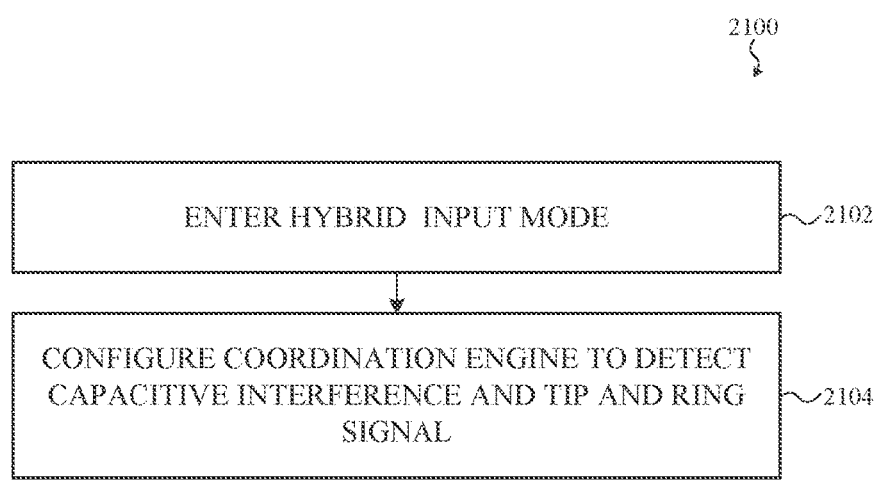
FIG. 21 is a flow chart depicting operations of a process of operating an electronic device in both a touch input mode and a stylus input mode.

FIG. 21 is a flow chart depicting operations of a process 2100 of operating an electronic device in both a touch input mode and a stylus input mode. The process 2100 can be performed by any suitable electronic device, such as, but not limited to, the electronic device 102 described in reference to FIGS. 1A-1D and/or the electronic device 202 described in reference to FIGS. 2A-2F. The process initiates at operation 2102 in which the electronic device enters a hybrid input mode. When in the hybrid input mode, the electronic device may be configured to locate and estimate the angular position of one or more styluses, in addition to receiving touch input (e.g., single touch or multi-touch) from a user. In order to receive such hybrid input, the electronic device can, at operation 2104, configure the coordination engine to detect a ring field signal and a tip field signal in addition to capacitive interference that results from a user touch.

Figure 22:
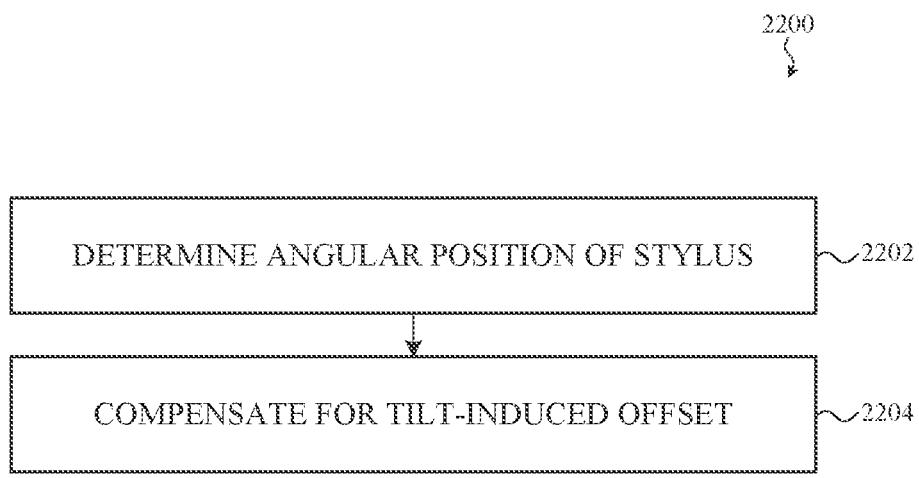
FIG. 22 is a flow chart depicting operations of a process of compensating for tilt-induced offset when locating a stylus on an input surface.

FIG. 22 is a flow chart depicting operations of a process 2200 of compensating for tilt-induced offset when locating a stylus on an input surface. The process 2200 can be performed by any suitable electronic device, such as, but not limited to, the electronic device 102 described in reference to FIGS. 1A-1D and/or the electronic device 202 described in reference to FIGS. 2A-2F.

The method depicted in FIG. 22 may be suitable for use in embodiments in which the input surface of the electronic device is separated by some distance from the sensor layer of the electronic device that detects the presence of a tip field and a ring field of a stylus such as described herein. As may be appreciated, the distance separating the input surface from the sensor layer may cause the tip field intersection area to shift based on the polar angle and/or the azimuthal angle of the stylus. This offset resulting from the distance between the input surface and the sensory layer is generally referred to as "tilt-induced offset."

The process initiates at operation 2202 in which the angular position of the stylus is estimated. Next, at operation 2204, the electronic device corrects the estimated location of the stylus based on the angular position of the stylus.

Figure 23:
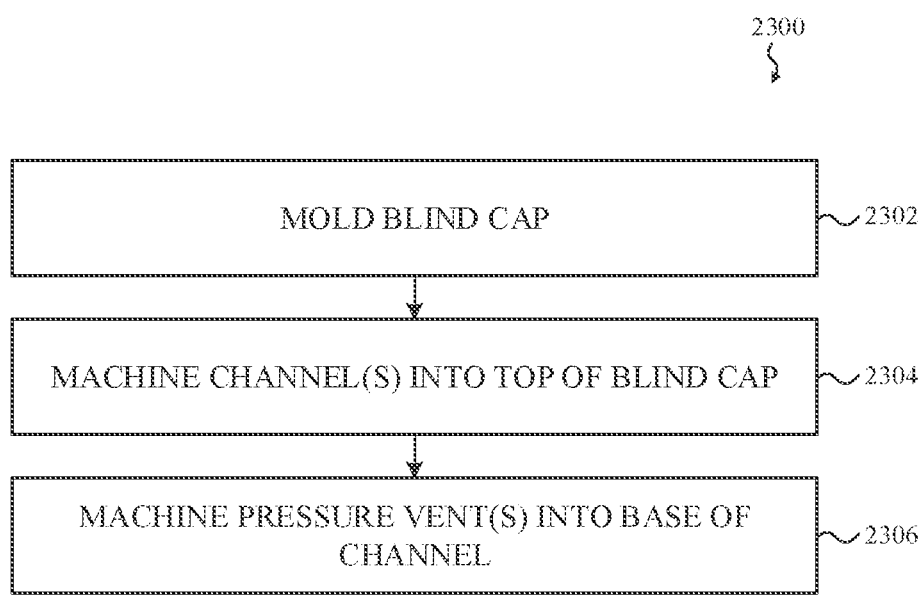
FIG. 23 is a flow chart depicting operations of a process of manufacturing a blind cap incorporating a pressure vent.

FIG. 23 is a flow chart depicting operations of a process of manufacturing a blind cap incorporating a pressure vent. The method 2300 begins at operation 2302 in which a blind cap is molded. The blind cap can be molded using any suitable process, such as, but not limited to, injection molding, transfer molding, blow molding, and so on. In many embodiments, the blind cap may be molded with internal features. For example, in one embodiment, a series of spokes may be molded into an interior top surface of the blind cap. The spokes may be radially distributed around the longitudinal axis of the blind cap.

Next, at operation 2304, the blind cap may be machined. In particular, one or more channels can be machined into a top portion of the blind cap. In one embodiment, the channel has a generally circular shape, although this is not required. In many embodiments, the channel is formed to a depth that at least partially forms an aperture through the blind cap that connects the internal volume of the blind cap to the exterior. For example, if the blind cap were molded with a series of internal spokes, the channel may be formed to expose the space between those spokes, while retaining the spokes in place.

Next, at operation 2306, one or more pressure vents may be machined into the base of the channel formed at operation 2304. In some cases, machining of pressure vents may not be required.

Figure 24:
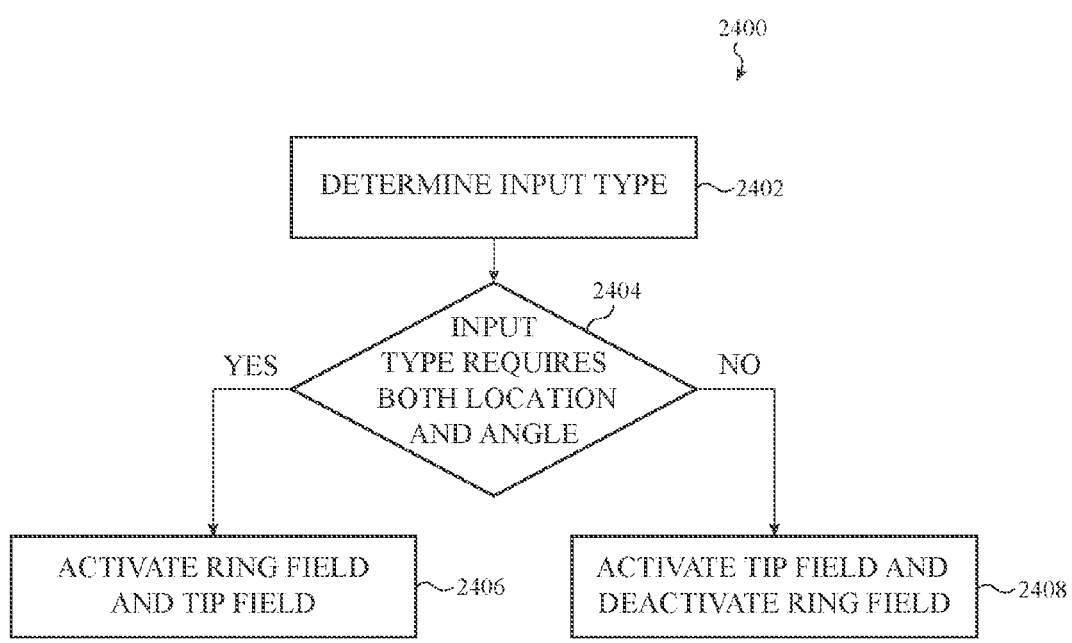
FIG. 24 is a flow chart depicting operations of a process of operating a user input system in more than one mode.

FIG. 24 is a flow chart depicting operations of a process of operating a user input system in more than one mode. The method may be performed by a stylus such as described herein or an electronic device such as described herein. The method, generally and broadly, relates to power savings in a stylus that may be achieved by selectively deactivating features of the stylus that are not specifically required given a particular operational state of the stylus at a particular time. In one specific example, a stylus may be operable in a mode that does not require the angular position of the stylus to be determined, such as when using the stylus to select user interface elements on a display. When in such an operational mode, the ring field of the electronic device may be deactivated to save power within the stylus.

In other cases, power savings in the stylus may be achieved by selectively deactivating features of the stylus that are not specifically required given a particular input requirement of an electronic device at a particular time. In one specific example, an electronic device may be operable in a mode that does not require the angular position of a stylus to be determined, such as when the electronic device is configured to receive only position information (e.g., drawing a line of constant thickness). When in such an operational mode, the ring field of the electronic device may be deactivated to save power within the stylus. FIG. 24 depicts such a method.

The method 2400 begins at operation 2402 in which an input type is determined. An input type may be related to an operational state of the electronic device. For example, an electronic device may be operable in a mode that interprets location and angular position information obtained from a stylus as input from a simulated pencil. In this example, the location of the stylus may correspond to a path of a simulated pencil line or stroke and the angular position information may correspond to the width and/or shading qualities of that pencil line or stroke. This mode may be referred to as "pencil input mode."

In another example, an electronic device may be operable in a mode that interprets only the location information from a stylus as input from a simulated pen. In this example, the location of the stylus corresponds to a path of the simulated pen; angular position information does not affect the width or quality of the line in any manner. This mode may be referred to as a "pen input mode."

In yet another example, an electronic device may be operable in a mode that interprets only the location information from a stylus as input from a user's finger. In this example, the location of the stylus corresponds to a touch input; angular position information does not affect the touch input. This mode may be referred to as a "touch input mode."

In further embodiments, the electronic device may be operable in a number of additional modes including, but not limited to, fountain pen input mode, highlighter input mode, charcoal input mode, palate knife input mode, brush input mode, chisel input mode, user interface selection input mode, gaming input mode, joystick input mode, and so on. Some of these input modes may require both location and angular position information while others only require location information.

The input mode of the electronic device may correspond to an input type of the stylus. The stylus may be operable to provide two types of input: location-only input and location and angular position input.

Accordingly, at operation 2402, the method 2400 determines what input type is required or requested at a particular time. Next at operation 2404, the stylus may determine whether the determined input type requires both location information and angular position information. If both are required, the method 2400 continues to operation 2406 at which the stylus activates both the ring field and the tip field. In the alternative that only location information is required, the method 2400 continues to operation 2408 at which the stylus activates only the tip field, deactivating the ring field.

One may appreciate that although many embodiments are disclosed above, that the operations and steps presented with respect to methods and techniques described herein are meant as exemplary and accordingly are not exhaustive. One may further appreciate that an alternate step order or fewer or additional steps may be implemented in particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

What is claimed is:

1. A stylus comprising:
a body comprising:
  a barrel;
  a tip end defining an opening;
  a nib positioned adjacent the opening of the tip end, the nib comprising a tip field generator;
  a force sensor disposed within the body adjacent the tip end and coupled to the barrel;
  a rigid signal conduit comprising:
    a dielectric material:
    a tip signal line disposed within the dielectric material and operatively connected to the tip field generator;
    a ring signal line disposed within the dielectric material and isolated from the tip signal line;
    a ring field generator disposed on an exterior surface of the dielectric material and operatively connected to the ring signal line;
  a tubular shield comprising:
    a hollow portion extending toward the opening of the tip end and mechanically coupled to the nib; and
    a tray portion mechanically coupled to the force sensor.

2. The stylus of claim 1, further comprising a control board coupled to the tip signal line, the ring signal line, and the force sensor.

3. The stylus of claim 2, wherein the control board is coupled to the tray portion of the tubular shield.

4. The stylus of claim 2, wherein the control board is configured to:
apply a tip signal to the tip field generator via the tip signal line; and
apply a ring signal to the ring field generator via the ring signal line.

5. The stylus of claim 2, wherein the control board is configured to receive an electrical signal from the force sensor that corresponds to an amount of reactive force experienced by the force sensor.

6. The stylus of claim 2, wherein:
the control board is a secondary control board; and
the stylus further comprises a primary control board disposed within the barrel and mechanically coupled to the barrel.

7. The stylus of claim 6, wherein the primary control board comprises:
a first circuit board; and
a second circuit board folded over the first circuit board.

8. The stylus of claim 7, wherein the first circuit board and the second circuit board are separated by a standoff.

9. The stylus of claim 8, wherein the standoff is surface mounted to at least one of the first circuit board or the second circuit board.

10. The stylus of claim 6, wherein the primary control board comprises a wireless interface configured to wirelessly transact data with an electronic device.

11. A stylus comprising:
a body comprising a tapered end and defining a longitudinal axis;
a force-sensitive structure disposed within, and coupled to, the body adjacent to the tapered end, the force-sensitive structure configured to translate along the longitudinal axis;
a removable tip positioned adjacent to the tapered end and supported by the force-sensitive structure, the removable tip configured to translate along the longitudinal axis;
a first electric field generator within the removable tip configured to generate a first electric field modulated with a first modulation;
a second electric field generator within the body and aligned with the first electric field generator, the second electric field generator configured to generate a second electric field modulated with a second modulations;
a dielectric material;
a first signal line disposed within the dielectric material and operatively connected to the first electric field generator;
a second signal line disposed within the dielectric material and operatively connected to the second electric field generator; and
a tubular shield connecting the force-sensitive structure to the removable tip, the tubular shield surrounding the dielectric material.

12. The stylus of claim 11, wherein the first electric field generator is substantially angularly symmetric about the longitudinal axis.

13. The stylus of claim 12, wherein the second electric field generator is substantially angularly symmetric about the longitudinal axis.

14. The stylus of claim 13, wherein the second electric field envelops the first electric field.

15. The stylus of claim 11, wherein the first modulation is different from the second modulation.

16. The stylus of claim 11, wherein the force-sensitive structure comprises a force sensor configured to measure a force exerted by the removable tip on an object.

17. A stylus comprising:
a body comprising a tapered end and defining a longitudinal axis;
a force-sensitive structure disposed within, and coupled to, the body adjacent to the tapered end, the force-sensitive structure configured to translate along the longitudinal axis;
a removable tip positioned adjacent to the tapered end and supported by the force-sensitive structure, the removable tip configured to translate along the longitudinal axis;
a first electric field generator within the removable tip configured to generate a first electric field modulated with a first modulation; and
a second electric field generator within the body and aligned with the first electric field generator, the second electric field generator configured to generate a second electric field modulated with a second modulation, wherein the removable tip comprises a threaded section configured to rotatably engage with a corresponding threaded section associated with the force-sensitive structure.

18. An input system comprising:
an electronic device comprising:
an array of electric field sensors; and
a first wireless element; and
a stylus comprising:
a body defining a longitudinal axis and comprising a tip end;
a translatable structure coupled to the body adjacent to the tip end, the translatable structure configured to elastically translate along the longitudinal axis and comprising a force sensor;
a second wireless element in communication with the force sensor and the first wireless element;
a tip positioned adjacent to the tip end and supported by the translatable structure;
a first electric field generator within the tip configured to generate a first electric field;
a second electric field generator extending between the first electric field generator and the translatable structure and configured to generate a second electric field;
a first signal line operatively connected to the first electric field generator;
a second signal line operatively connected to the second electric field generator; and
a tubular shield connecting the translatable structure to the tip, the tubular shield surrounding the first signal line and the second signal line;
wherein the array of electric field sensors is configured to detect the first electric field and the second electric field.

19. The stylus of claim 18, wherein the electronic device comprises a display and the array of electric field sensors is distributed relative to the display.

20. The stylus of claim 18, wherein the second wireless element is configured to send a signal to the first wireless element, the signal corresponding to data generated by the force sensor.

* * * * *

UNITED STATES PATENT AND TRADEMARK OFFICE
CERTIFICATE OF CORRECTION

PATENT NO. : 10,025,404 B2
APPLICATION NO. : 15/259861
DATED : July 17, 2018
INVENTOR(S) : Aidan N. Zimmerman et al.

Page 1 of 1

It is certified that error appears in the above-identified patent and that said Letters Patent is hereby corrected as shown below:

In the Claims

Column 96, Line 57, "modulations;" should read --modulation;--.

Signed and Sealed this
Thirteenth Day of November, 2018

Andrei Iancu
*Director of the United States Patent and Trademark Office*